(12) United States Patent
Goscha et al.

(10) Patent No.: US 9,305,765 B2
(45) Date of Patent: *Apr. 5, 2016

(54) HIGH FREQUENCY INDUCTION LIGHTING

(71) Applicant: Lucidity Lights, Inc., Cambridge, MA (US)

(72) Inventors: John R. Goscha, Boston, MA (US); Victor D. Roberts, Burnt Hills, NY (US); Juan Manuel Rivas-Davila, Ann Arbor, MI (US); Luke Christopher Raymond, Ann Arbor, MI (US)

(73) Assignee: Lucidity Lights, Inc., Cambridge, MA (US)

( * ) Notice: Subject to any disclaimer, the term of this patent is extended or adjusted under 35 U.S.C. 154(b) by 182 days.

This patent is subject to a terminal disclaimer.

(21) Appl. No.: 14/039,066

(22) Filed: Sep. 27, 2013

(65) Prior Publication Data

US 2014/0145596 A1 May 29, 2014

Related U.S. Application Data

(63) Continuation-in-part of application No. 14/030,758, filed on Sep. 18, 2013, which is a continuation-in-part of application No. 14/016,363, filed on Sep. 3, 2013, which is a continuation-in-part of application No.

(Continued)

(51) Int. Cl.
*H05B 41/28* (2006.01)
*H01J 65/04* (2006.01)

(Continued)

(52) U.S. Cl.
CPC ............. *H01J 65/048* (2013.01); *H01J 61/56* (2013.01); *H05B 41/2806* (2013.01); *H05B 41/38* (2013.01); *Y02B 20/19* (2013.01); *Y02B 20/22* (2013.01)

(58) Field of Classification Search
CPC ...................................... H01Q 1/26; H01J 7/44
See application file for complete search history.

(56) References Cited

U.S. PATENT DOCUMENTS

| 3,521,120 A | 7/1970 | Anderson |
| 4,010,400 A | 3/1977 | Hollister |

(Continued)

FOREIGN PATENT DOCUMENTS

| EP | 1705691 A1 | 9/2006 |
| EP | 2421335 A1 | 2/2012 |

(Continued)

OTHER PUBLICATIONS

ANSI, "American National Standard—for electric lamps, A,G,PS, and Similar Shapes with E26 Medium Screw Bases", ANSI C78.20-2003, 2003, 48 pages.

(Continued)

*Primary Examiner* — Hai L Nguyen
(74) *Attorney, Agent, or Firm* — GTC Law Group PC & Affiliates

(57) ABSTRACT

An induction RF fluorescent lamp, comprising a bulbous vitreous portion filled with a working gas mixture, a power coupler comprising at least one winding of an electrical conductor for receiving an alternating voltage, and an electronic ballast providing appropriate voltage and current to the power coupler and operating at a frequency greater than 5 MHz wherein the electronic ballast comprises an EMI filter, an AC-to-DC converter, a DC bus, an input choke inductor and a DC-to-AC inverter.

11 Claims, 34 Drawing Sheets

Related U.S. Application Data

13/968,766, filed on Aug. 16, 2013, which is a continuation-in-part of application No. 13/957,846, filed on Aug. 2, 2013, which is a continuation-in-part of application No. 13/837,034, filed on Mar. 15, 2013, which is a continuation-in-part of application No. 13/684,660, filed on Nov. 26, 2012, now Pat. No. 8,872,426, and a continuation-in-part of application No. 13/684,664, filed on Nov. 26, 2012, now abandoned, and a continuation-in-part of application No. 13/684,665, filed on Nov. 26, 2012, now Pat. No. 8,698,413.

(60) Provisional application No. 61/874,401, filed on Sep. 6, 2013.

(51) Int. Cl.
*H01J 61/56* (2006.01)
*H05B 41/38* (2006.01)

(56) References Cited

U.S. PATENT DOCUMENTS

| | | |
|---|---|---|
| 4,219,760 A | 8/1980 | Ferro |
| 4,266,167 A | 5/1981 | Proud et al. |
| 4,427,921 A | 1/1984 | Proud et al. |
| 4,559,478 A | 12/1985 | Fuller et al. |
| 4,568,859 A | 2/1986 | Houkes et al. |
| 4,710,678 A | 12/1987 | Houkes et al. |
| 4,727,294 A | 2/1988 | Houkes et al. |
| 4,977,354 A | 12/1990 | Bergervoet et al. |
| 5,200,672 A | 4/1993 | Sheynberg et al. |
| 5,239,238 A | 8/1993 | Bergervoet et al. |
| 5,325,018 A | 6/1994 | El-Hamamsy |
| 5,387,850 A | 2/1995 | Bray et al. |
| 5,404,082 A | 4/1995 | Hernandez et al. |
| 5,412,280 A | 5/1995 | Scott et al. |
| 5,434,482 A | 7/1995 | Borowiec et al. |
| 5,446,350 A | 8/1995 | El-Hamamsy et al. |
| 5,461,284 A | 10/1995 | Roberts et al. |
| 5,465,028 A | 11/1995 | Antonis et al. |
| 5,561,351 A | 10/1996 | Vrionis et al. |
| 5,598,069 A | 1/1997 | Van et al. |
| 5,604,411 A | 2/1997 | Venkitasubrahmanian et al. |
| 5,621,266 A | 4/1997 | Popov et al. |
| 5,650,694 A | 7/1997 | Jayaraman et al. |
| 5,783,912 A | 7/1998 | Cocoma et al. |
| 5,789,855 A | 8/1998 | Forsdyke et al. |
| 5,796,214 A | 8/1998 | Nerone |
| 5,808,414 A | 9/1998 | Wharmby et al. |
| 5,825,130 A | 10/1998 | Nerone et al. |
| 5,834,905 A | 11/1998 | Godyak et al. |
| 5,841,229 A | 11/1998 | Borowiec et al. |
| 5,866,991 A | 2/1999 | Farkas et al. |
| 5,872,429 A | 2/1999 | Xia et al. |
| 5,886,472 A | 3/1999 | Alexandrovich et al. |
| 5,952,792 A | 9/1999 | Borowiec et al. |
| 5,994,848 A | 11/1999 | Janczak |
| 6,005,355 A | 12/1999 | Siao |
| 6,081,070 A | 6/2000 | Popov et al. |
| 6,084,359 A | 7/2000 | Hetzel et al. |
| 6,181,079 B1 | 1/2001 | Chang et al. |
| D443,703 S | 6/2001 | Sood |
| 6,288,490 B1 | 9/2001 | Popov |
| 6,313,587 B1 | 11/2001 | MacLennan et al. |
| 6,348,767 B1 | 2/2002 | Chen et al. |
| 6,392,366 B1 | 5/2002 | Nerone |
| 6,433,493 B1 | 8/2002 | Ilyes et al. |
| 6,522,084 B1 | 2/2003 | Miyazaki et al. |
| 6,762,550 B2 | 7/2004 | Itaya et al. |
| D506,840 S | 6/2005 | Ven et al. |
| 7,049,763 B2 | 5/2006 | Hochi et al. |
| D528,674 S | 9/2006 | Gonzalez |
| 7,119,486 B2 | 10/2006 | Godyak et al. |
| 7,180,230 B2 | 2/2007 | Godyak et al. |
| D538,953 S | 3/2007 | Mama |
| D540,961 S | 4/2007 | Hrubowchak et al. |
| 7,205,723 B2 | 4/2007 | Kurachi et al. |
| D550,864 S | 9/2007 | Hernandez, Jr. et al. |
| 7,459,856 B1 | 12/2008 | Wursching et al. |
| 7,753,558 B2 | 7/2010 | Ribarich |
| 7,772,783 B2 * | 8/2010 | Makimura et al. ............ 315/248 |
| 7,812,544 B2 | 10/2010 | Morales et al. |
| 7,822,514 B1 | 10/2010 | Erickson |
| D626,667 S | 11/2010 | Jonsson |
| D627,087 S | 11/2010 | Jonsson et al. |
| D645,993 S | 9/2011 | Wang |
| 8,035,318 B2 | 10/2011 | Bobel |
| 8,212,492 B2 | 7/2012 | Lam et al. |
| 8,698,413 B1 | 4/2014 | Godyak et al. |
| 8,872,426 B2 | 10/2014 | Alexandrov et al. |
| 8,901,842 B2 | 12/2014 | Roberts |
| 8,941,304 B2 | 1/2015 | Goscha et al. |
| 8,975,829 B2 | 3/2015 | Roberts et al. |
| 2002/0036472 A1 | 3/2002 | Kurachi et al. |
| 2003/0107332 A1 | 6/2003 | Newman, Jr. et al. |
| 2004/0263093 A1 | 12/2004 | Matsubayashi et al. |
| 2005/0057186 A1 | 3/2005 | Kurachi et al. |
| 2005/0122057 A1 | 6/2005 | Chen et al. |
| 2005/0280344 A1 | 12/2005 | Godyak et al. |
| 2006/0071584 A1 | 4/2006 | Kurachi et al. |
| 2007/0063656 A1 | 3/2007 | Wursching et al. |
| 2009/0322237 A1 | 12/2009 | Bobel |
| 2010/0008086 A1 | 1/2010 | Broitzman et al. |
| 2010/0225240 A1 | 9/2010 | Shearer et al. |
| 2011/0074277 A1 | 3/2011 | Speer et al. |
| 2011/0080104 A1 | 4/2011 | Gray et al. |
| 2012/0146525 A1 | 6/2012 | Hui et al. |
| 2012/0235597 A1 | 9/2012 | Nerone |
| 2012/0286689 A1 | 11/2012 | Newman, Jr. et al. |
| 2013/0033177 A1 | 2/2013 | Rooijackers et al. |
| 2013/0113362 A1 | 5/2013 | Gyulasi et al. |
| 2014/0145591 A1 | 5/2014 | Godyak et al. |
| 2014/0145592 A1 | 5/2014 | Goscha et al. |
| 2014/0145593 A1 | 5/2014 | Goscha et al. |
| 2014/0145594 A1 | 5/2014 | Goscha et al. |
| 2014/0145595 A1 | 5/2014 | Goscha et al. |
| 2014/0145597 A1 | 5/2014 | Goscha et al. |
| 2014/0145598 A1 | 5/2014 | Goscha et al. |
| 2014/0145599 A1 | 5/2014 | Goscha et al. |
| 2014/0145600 A1 | 5/2014 | Goscha et al. |
| 2014/0145601 A1 | 5/2014 | Goscha et al. |
| 2014/0145602 A1 | 5/2014 | Goscha et al. |
| 2014/0145603 A1 | 5/2014 | Goscha et al. |
| 2014/0145604 A1 | 5/2014 | Goscha |
| 2014/0145605 A1 | 5/2014 | Goscha et al. |
| 2014/0145606 A1 | 5/2014 | Goscha et al. |
| 2014/0145607 A1 | 5/2014 | Goscha et al. |
| 2014/0145608 A1 | 5/2014 | Goscha et al. |
| 2014/0145609 A1 | 5/2014 | Godyak et al. |
| 2014/0145613 A1 | 5/2014 | Alexandrov et al. |
| 2014/0145614 A1 | 5/2014 | Alexandrov |
| 2014/0145615 A1 | 5/2014 | Goscha et al. |
| 2014/0145616 A1 | 5/2014 | Goscha et al. |
| 2014/0145617 A1 | 5/2014 | Goscha et al. |
| 2014/0145618 A1 | 5/2014 | Goscha et al. |
| 2014/0145619 A1 | 5/2014 | Goscha et al. |
| 2014/0145620 A1 | 5/2014 | Goscha et al. |
| 2014/0145621 A1 | 5/2014 | Goscha et al. |
| 2014/0145637 A1 | 5/2014 | Goscha et al. |
| 2014/0320004 A1 | 10/2014 | Roberts |
| 2014/0320005 A1 | 10/2014 | Roberts et al. |
| 2014/0320008 A1 | 10/2014 | Goscha et al. |
| 2014/0320009 A1 | 10/2014 | Goscha et al. |
| 2014/0368109 A1 | 12/2014 | Goscha et al. |
| 2014/0375203 A1 | 12/2014 | Goscha et al. |

FOREIGN PATENT DOCUMENTS

| | | |
|---|---|---|
| JP | 2006054054 A | 2/2006 |
| JP | 2009104981 A | 5/2009 |

(56) References Cited

FOREIGN PATENT DOCUMENTS

JP          1442658         4/2012
WO      2014082039 A1     5/2014

OTHER PUBLICATIONS

ANSI, "American National Standard—for electric lamps, PAR and R Shapes", ANSI C78.21-2003, 2003, 48 pages.

Nerone, Louis R., "A Novel Ballast for Electrodeless Fluorescent Lamps", Conference Record of the 2000 IEEE Industry Applications Conference, vol. 5, 2000, pp. 3330-3337.

M9711465-0001, "DE Design Application No. M9711465-0001, titled "Fluorescent lamp", filed Dec. 11, 1997", Toshiba Lightec KK, and as shown on p. 3457 in the German Design Gazette that issued on Sep. 10, 1998, 5 pages.

PCT/US2013/071709, "International Application Serial No. PCT/US2013/071709, International Search Report and Written Opinion mailed Mar. 26, 2014", Lucidity Lights, Inc., 22 pages.

"GE 82137-5 60-Watt Reveal with Halogen Long Life A19 Light Bulb", Amazon.com, http://www.amazon.com/gp/product/images/B00328GSVM/ref=dp_image_z_0?ie=UTF8&n=228013&s=hi, (accessed Aug. 26, 2014), 1 page.

Lucido, "Only 229 Days Left for 100 Watt Light Bulbs", http://www.chicagonow.com/getting-real/2011/05/only-229-days-left-for-100-watt-light-bulbs/, May 17, 2011, 3 Pages.

PCT/US2013/071709, "International Application Serial No. PCT/US2013/054173, International Preliminary Report on Patentability and Written Opinion mailed Jun. 4, 2015", Lucidity Lights, Inc., 19 Pages.

Victoria, "Those funny looking light bulbs", Posted in: Changing Habits, Recycling, Sustainable Building, http://smartlifeways.com/those-funny-looking-light-bulbs/, Sep. 30, 2009, 2 Pages.

\* cited by examiner

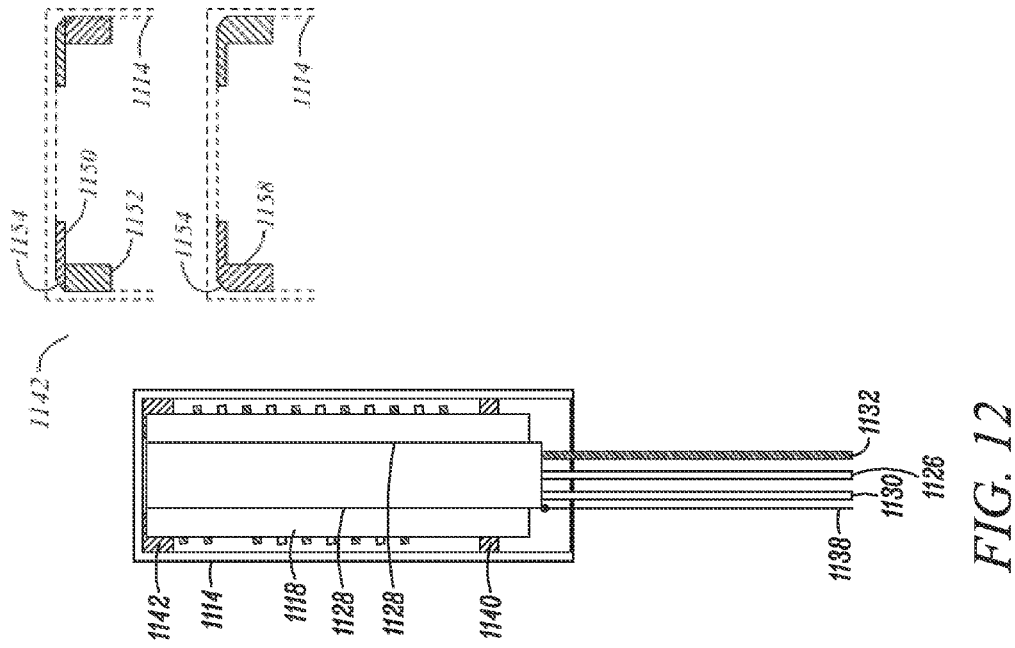
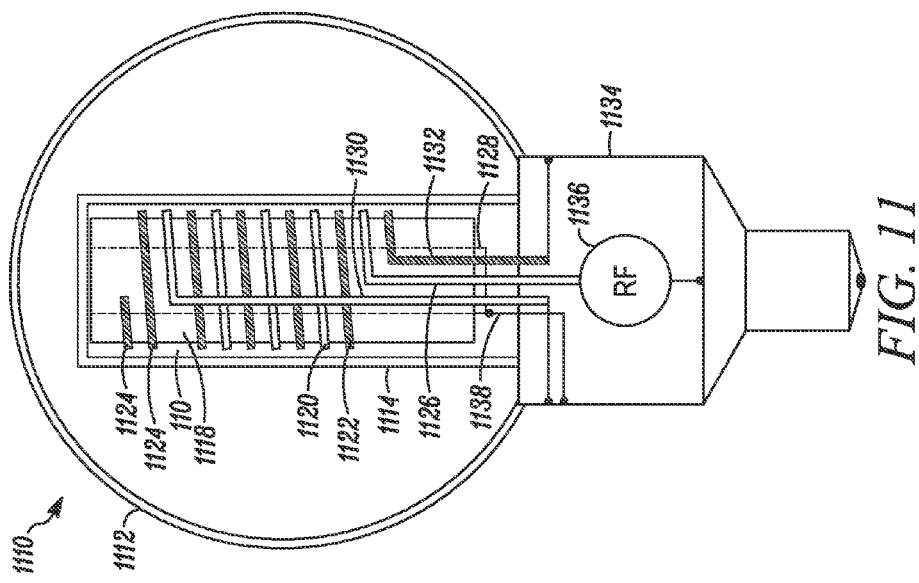
FIG. 12
FIG. 11

HIGH FREQUENCY INDUCTION LIGHTING

CROSS-REFERENCE TO RELATED APPLICATIONS

This application is a continuation-in-part of the following U.S. patent application, which is hereby incorporated by reference in its entirety: U.S. patent application Ser. No. 14/030,758, filed Sep. 18, 2013.

The application Ser. No. 14/030,758 is a continuation-in-part of the following U.S. patent application, which is hereby incorporated by reference in its entirety: U.S. patent application Ser. No. 14/016,363, filed Sep. 3, 2013.

The application Ser. No. 14/016,363 is a continuation-in-part of the following U.S. patent application, which is hereby incorporated by reference in its entirety: U.S. patent application Ser. No. 13/968,766, filed Aug. 16, 2013.

The application Ser. No. 13/968,766 is a continuation-in-part of the following U.S. patent application, which is hereby incorporated by reference in its entirety: U.S. patent application Ser. No. 13/957,846, filed Aug. 2, 2013.

The application Ser. No. 13/957,846 is a continuation-in-part of the following U.S. patent application, which is hereby incorporated by reference in its entirety: U.S. patent application Ser. No. 13/837,034 filed Mar. 15, 2013.

The application Ser. No. 13/837,034 is a continuation-in-part of the following U.S. patent applications, each of which is hereby incorporated by reference in its entirety: U.S. patent application Ser. No. 13/684,660 filed Nov. 26, 2012, now U.S. Pat. No. 8,872,426 B2 issued on Oct. 28, 2014, U.S. patent application Ser. No. 13/684,664 filed Nov. 26, 2012, and Ser. No. 13/684,665 filed Nov. 26, 2012, now U.S. Pat. No. 8,698,413 B1 issued on Apr. 15, 2014.

This application claims priority to the following provisional U.S. patent application, which is hereby incorporated by reference in its entirety: provisional U.S. patent application 61/874,401 filed Sep. 6, 2013.

BACKGROUND

1. Field

The present invention generally relates to induction RF fluorescent light bulbs, and more specifically to reduction of electromagnetic interference from an induction RF fluorescent light bulb with a ferromagnetic core.

2. Description of Related Art

Discharge lamps create light by exciting an electrical discharge in a gas and using that discharge to create visible light in various ways. In the case of fluorescent lamps the gas is typically a mixture of argon, krypton and/or neon, plus a small amount of mercury. Other types of discharge lamps may use other gasses. The gas is contained in a partially evacuated envelope, typically transparent or translucent, typically called a bulb or arc tube depending upon the type of lamp.

In conventional discharge lamps electrically conductive electrodes mounted inside the bulb or arc tube along with the gas provide the electric field used to drive the discharge.

Use of electrodes can create certain problems. First, the discharge is typically designed to have a relatively high voltage in order to minimize losses at the electrodes. In the case of fluorescent lamps, this may lead to long, thin lamp structures, which function well for lighting office ceilings, but are not always a good fit for replacing conventional incandescent lamps. Fluorescent lamps designed to replace incandescent lamps, known as compact fluorescent lamps, or CFLs, are typically constructed by bending the long, thin tube, such as into multiple parallel tubes or into a spiral, which is now the most common form of CFLs. A plastic cover shaped like a conventional incandescent lamp is sometimes placed over the bent tubes to provide a more attractive shape, but these covers absorb light, making the lamp less efficient. Bent and spiral tube lamps also have wasted space between the tubes, making them larger than necessary. The use of a cover increases the size further.

The use of electrodes can create problems other than shape and size. Electrodes can wear out if the lamp is turned on and off many times, as is typical in a residential bathroom and many other applications. The life of the electrodes can also be reduced if the lamp is dimmed, because the electrodes are preferably operated in a specific temperature range and operation at different power levels can cause operation outside the preferred ranges, such as when operating at lower power, which can allow the electrodes to cool below the specified temperature range.

In addition, the long thin shape selected, because it is adapted to allow use of electrodes, tends to require time for mercury vapor to diffuse from one part of the tube to another, leading to the long warm-up times typically associated with many compact fluorescent lamps.

Finally, the electrodes are normally designed to be chemically compatible with the gas used in the lamp. While this is not usually a concern with typical fluorescent lamps, it can be a problem with other types of discharge lamps.

One way to avoid the problems caused by electrodes is to make a lamp that does not use electrodes, a so-called electrodeless lamp. In an electrodeless lamp, the discharge may be driven by, for example, 1) an electric field created by electrodes mounted outside the bulb or arc tube; 2) an electric field created by a very high frequency electromagnetic field, usually in combination with a resonant cavity, or 3) an electric field created by a high frequency magnetic field without the use of a resonant cavity. This latter lamp is called an induction-coupled electrodeless lamp, or just "induction lamp."

In an induction lamp, a high frequency magnetic field is typically used to create the electric field in the lamp, eliminating the need for electrodes. This electric field then powers the discharge.

Since induction lamps do not require use of electrodes, they do not need to be built into long thin tubes. In fact, a ball-shaped bulb, such as the bulb used for conventional incandescent lamps, is a preferred shape for an induction lamp. In addition, since induction lamps do not use electrodes, they can be turned on and off frequently without substantial adverse impact on loss of life. The absence of electrodes also means that induction lamps can be dimmed without reducing lamp life. Finally, the ball-shaped lamp envelope allows rapid diffusion of mercury vapor from one part of the lamp to another. This means that the warm-up time of induction lamps is typically much faster than the warm-up time of most conventional compact fluorescent lamps.

Induction lamps fall into two general categories, those that use a "closed" magnetic core, usually in the shape of a torus, and those that use an "open" magnetic core, usually in the shape of a rod. Air core induction lamps fall into this latter category. Closed core lamps are usually operated at frequencies generally above 50 kHz, while open core lamps usually require operating frequencies of 1 MHz and above for efficient operation. The lower operating frequency of closed core induction lamps makes them attractive; however, the bulb design required to accommodate the closed core makes them generally unsuitable for replacing standard in incandescent lamps. Open core induction lamps, while requiring higher operating frequencies, allow the design of lamps that have the same shape and size as common household incandescent lamps. This disclosure is primarily is addressed to the open core category of induction lamps.

In spite of their obvious advantages, there are very few open core induction lamps on the market today. One reason for the lack of commercially successful products is the cost of the high frequency ballast. Conventional fluorescent lamps, including CFLs, can be operated at frequencies from 25 kHz to 100 kHz, a frequency range where low cost ballast technology was developed in the 1990s, and closed core induction lamps can be operated at frequencies from 50 kHz to 250 kHz, for which the ballasts are only slightly more expensive. However, open core induction lamps typically require operating frequencies of 1 MHz or higher. The United States Federal Communications Commission (FCC) has established a "lamp band" between 2.51 MHz and 3.0 MHz that has relaxed limits on the emission of radio frequency energy that may interfere with radio communication services. Cost effective open core induction lamps may preferably have an operating frequency of at least 2.51 MHz.

The lack of commercially successful open core induction lamps may be traced to the absence of a low cost ballast that can operate in the 2.51 MHz to 3.0 MHz band while meeting all the requirements of the FCC; that is small enough to fit into a lamp; that has a ballast housing that is the same size and shape as a conventional incandescent lamp; and that can be dimmed on conventional TRIAC dimmers found in homes in certain major markets, such as the U.S. The present disclosure addresses one or more of these issues. Therefore a need exists for improved induction lamps, especially in residential applications.

SUMMARY

In accordance with exemplary and non-limiting embodiments, systems and methods for the configuration and operation of an electrodeless lamp, also referred to as an induction lamp, are provided.

The present disclosure describes an induction RF fluorescent lamp comprising a lamp envelope filled with a gas mixture at less than typical atmospheric pressure, a power coupler having at least one winding, composed of one or more turns of an electrical conductor, and an electronic ballast providing appropriate voltage and current to the power coupler. The lamp envelope may include a re-entrant cavity, where the lamp envelope with re-entrant cavity is at least partially covered on a partial vacuum side with phosphor. The power coupler may be located on the non-vacuum side of the re-entrant cavity where the at least one winding of an electrical conductor receives an alternating voltage and current from the electronic ballast to generate an alternating magnetic field and thereby inducing an alternating electric field within the lamp envelope. The electronic ballast converts main frequency voltage and current to a high frequency voltage and current and provides it to the power coupler, the electronic ballast comprising an EMI filter, an AC-to-DC bridge converter, a DC bus, and a DC-to-AC inverter.

In embodiments, the induction RF fluorescent lamp may be able to replace an ordinary incandescent light bulb, both in its ability to screw into a standard incandescent light bulb socket and to have the general look of the ordinary incandescent light bulb, but with all of the advantages of an induction lamp, as described herein. As such, the induction RF fluorescent lamp may comprise a bulbous vitreous portion of the induction RF fluorescent lamp that is luminous when AC power is provided, the bulbous vitreous portion comprising a vitreous envelope with a re-entrant cavity covered on a partial vacuum side with phosphor and filled with a working gas mixture, and a power coupler on the non-vacuum side of the re-entrant cavity comprising at least one winding of an electrical conductor (e.g., such as wound around a ferromagnetic core or air core structure), the bulbous vitreous portion having an exterior surface being one of transparent and translucent; a screw base for electrically connecting the induction RF fluorescent lamp into an AC power electrical socket for an ordinary incandescent light bulb; and a tapering portion comprising an electronic ballast that converts an input AC power frequency voltage and current to a power coupler high frequency voltage and current, wherein the induction RF fluorescent lamp tapers from the bulbous vitreous portion to the screw base such that the bulbous vitreous portion, the tapering portion, and the screw base taken together provide an exterior appearance similar to an ordinary incandescent bulb. The tapering portion may connect and structurally taper from the bulbous vitreous portion to the screw base, the tapering portion may reside within the body of the induction RF fluorescent lamp where the bulbous vitreous portion extends down to the screw base, the taping portion may be an extension of the bulbous vitreous portion, and the like. In embodiments, the bulbous vitreous portion of the induction RF fluorescent lamp may have an appearance similar to an ordinary incandescent bulb when it is not illuminated due to the similar outward appearance of the bulbous vitreous portion and the tapering portion. The bulbous vitreous portion may have an outward appearance that is white when not illuminated, such as due to the phosphor coating, a frosted glass, a diffusing material on the glass, and the like. The bulbous vitreous portion may be made from glass, or any other material used in the lighting arts. The tapering portion may be a plastic material, a vitreous material, or any other like material that is able to accommodate the electronics. The bulbous vitreous portion and the tapering portion may be made from the same material, such as glass, glass coated material, a material coated to look like glass, and the like. The bulbous vitreous portion and the tapering portion may be one component. The electrical conductor of the power coupler may be wound around a ferrite core. The screw base may be a standard E26 Edison screw base. The induction RF fluorescent lamp may approximate the shape and size of an ordinary A19 incandescent bulb. Dimensionally, the bulbous portion may form a partial sphere of diameter approximating the dimension of an ordinary A19 incandescent bulb, such as approximately 60.3 mm (referencing A19's maximum width as 19 times ⅛ inch), plus or minus a tolerance, such as +/−3 mm, +/−2 mm, +/−1 mm, and the like. The tapered portion may have a neck of a maximum diameter where the tapering concave shape of the neck meets the spherical bulbous upper portion that is less than the diameter of the sphere as in an ordinary incandescent bulb, such as approximately 45 mm millimeters plus or minus a tolerance, such as +/−3 mm, +/−2 mm, +/−1 mm, and the like. The tapered portion may have a concave neck tapering from this point into a standard E26 Edison screw base, and the bulbous portion may sit within the neck of the lower portion such that there is a seamless connection provided there between.

In embodiments, the induction RF fluorescent lamp may be able to replace an ordinary reflector-type incandescent light bulb, both in its ability to screw into a standard incandescent light bulb socket and to have the general look of the ordinary reflector-type incandescent light bulb, but with all of the advantages of an induction lamp, as described herein. As such, the induction RF fluorescent lamp may comprise a bulbous portion with a vitreous illumination-end portion, such as approximately planar, and a non illumination-end portion having a reflecting surface for reflecting radiation produced within the envelope out through the vitreous illumination-end portion, the inner surface of the vitreous illumination-end portion coated with phosphor for converting radiation produced within the bulbous portion to visible light. The induction RF fluorescent lamp may also comprise a lower portion that is non-luminous and has a form of an approximately vertical rise from the screw base to the bulbous portion, wherein the bulbous portion, the lower portion, and the screw base taken together provide an exterior appearance similar to an ordinary reflecting incandescent bulb. In embodiments, the bulbous portion may be made from glass and the lower portion is a plastic material. The bulbous portion and the lower portion may be made from the same material, such as glass. The bulbous portion and the lower portion may be one component. The lower portion may be a vitreous material. The screw base may be standard screw base, such as an E26 Edison screw base, and the like. The induction RF fluorescent lamp may approximate the shape and size of an ordinary BR30 incandescent bulb. The bulbous portion may have a dimension at the widest point of diameter 95.3 millimeters plus-or-minus 1-3 millimeters and the like, and the lower portion have a neck with maximum diameter of 43.1 millimeters plus-or-minus 1-3 millimeters and the like.

In embodiments, the induction RF fluorescent lamp may be comprise a dimming facility that enables the induction RF fluorescent lamp to be dimmable from an external control dimming device, such as where the external dimming control device is an external TRIAC dimming device. The dimming facility may utilize frequency-mode dimming to implement dimming of the induction RF fluorescent lamp, where frequency-mode dimming adjusts the operating frequency of the induction lamp away from an optimal operating frequency for operation of the electronic ballast in response to an input from the external dimming control device. The dimming facility may utilize amplitude-mode dimming to implement dimming of the induction RF fluorescent lamp, where amplitude-mode dimming adjusts the amplitude of a voltage associated with the power being delivered to the induction lamp in response to an input from the external dimming control device. The dimming facility may utilize burst-mode dimming to implement dimming of the induction RF fluorescent lamp, where burst-mode dimming periodically interrupts the high frequency voltage and current to the power coupler in order to reduce the power being delivered to the power coupler. In embodiments, a burst-mode dimming facility may dim the induction RF fluorescent lamp as a function of a dimming signal received from an external dimming device. The dimming signal may be from a TRIAC-based external dimming device, and the burst-mode dimming facility senses the firing angle of the TRIAC-based external dimming device from the dimming signal. The burst-mode dimming facility may dim the induction RF florescent lamp as a function of an adjustable user control interface on the induction RF fluorescent light bulb. The burst-mode dimming facility may dim the induction RF fluorescent lamp through a wireless remote control device. The burst-mode dimming facility may be used to adjust the operating power point for a new induction RF fluorescent light bulb, where the adjustment is made from an initial operating power point that is higher than a target operating point down to the target operating power point. The burst-mode dimming facility may be used to adjust the operating power point for the induction RF fluorescent lamp from a fast turn-on elevated operating power point down to an operational operating power point in order to increase the rate at which the induction RF fluorescent lamp reaches an operational illumination level. The periodic interruptions may be synchronized with the operating frequency of the DC-to-AC inverter. The power coupler high frequency $f_O$ and the frequency at which the periodic interruptions is provided $f_M$, where $f_O$ may be greater than $f_M$, such as $f_O$ being greater than ten times $f_M$, such that at least ten cycles of $f_O$ will occur during each on-period of $f_M$. The off-period of $f_M$ may be shorter than the time required for the electron density of the discharge of the induction RF fluorescent lamp to decrease below a threshold level necessary to provide sufficient discharge conductivity, such as where the threshold level of density is at least 20% of the electron density at the start of the cut-off period.

In embodiments, the induction RF fluorescent lamp may comprise a dimming device load control facility enabling the induction RF fluorescent lamp to provide for electrical loads required for the proper operation of an external control dimming device, the dimming device load control facility controlling a switched electrical load switched in and out of connectivity within the electronic ballast to provide a load for the external dimming device. The dimming device load control facility may detect an external dimming device type for the external dimming control device and automatically adjust the control of the switched electrical load based on the detected device type, such as a leading-edge type external dimming device, a trailing-edge type external dimming device, a smart type external dimming device, and the like. The use of the dimming device load control facility may reduce flicker in the lamp. The dimming device load control facility may use integrated circuit electronics in the control of the switched electrical load, where the integrated circuit electronics comprise a microcontroller. The integrated circuit electronics may comprise a single package with a combination of analog and digital integrated control circuits, such as where the combination reduces power consumption and noise. The switched electrical load may be switched out of the circuit during on-time intervals of the external dimming device and switched into the circuit during off-time intervals of the external dimming device. The switched electrical load is switched into the circuit when the presence of an external dimming device is sensed.

In embodiments, the induction RF fluorescent lamp may comprise a power coupler (such as with a ferromagnetic core) and conductive material in contact with the power coupler to reduce extraneous electromagnetic radiation emanating from the power coupler. The conductive material may be inserted inside the power coupler, such as into an axial cavity within the ferromagnetic core. The conductive material may be segmented. The conductive material may be located between the electrical conductor and a ferromagnetic core. The conductive material may be in contact with a ferromagnetic core and additionally wrapped around the side of the electrical conductor that is opposite the side of the electrical conductor that faces the ferromagnetic core. The wrapped portion of the conductive material may be in the form of a strip of shielding conductive material that extends axially along the power coupler. The conductive material may be a sheet of conductive material. The conductive material may be a mesh of conductive material. The conductive material may be a thin conductor, wherein the thin conductor may be a wire, a strip of conductive material, and the like. The conductive material may be grounded to the RF ground in the electronic ballast. The induction RF fluorescent lamp may comprise a shielding conductive material at least partially encasing the electronic ballast to reduce electromagnetic radiation from emanating from the electronic ballast, such as the shielding conductive material being a mesh of conductive material, a sheet of conductive material, conductive paint and the like. The shielding may be in contact with a support material to maintain dimensional integrity.

In embodiments, the induction RF fluorescent lamp envelope may comprise structures within the lamp envelope that promote rapid luminous development during the turn-on phase of the induction RF fluorescent lamp. Structures may include a first metallic structure comprising mercury, the first metallic structure mounted within the lamp envelope in such a location and orientation with respect to the induced electric field so as to maximize absorption of power from the electric field and induced discharge during a turn-on phase of the induction RF fluorescent lamp in order to rapidly heat and vaporize the mercury to promote rapid luminous development during the turn-on phase of the induction RF fluorescent lamp, wherein the first metallic structure received mercury condensation from at least a first power on to form a mercury amalgam. The first metallic structure may be radially positioned in the range of 1-12 mm from the re-entrant cavity and within the lamp envelope. The first metallic structure may be substantially flat along one plane and may be folded, constrained along that plane. The first metallic structure may be positioned in the burner envelope such that the normal to its surface is between 0 and 90 degrees relative to a normal to the surface of the re-entrant cavity. The first metallic structure may be a sheet or a metallic mesh comprised of cut metal that has been expanded, woven wires, punched metal and the like. The metal of first metallic structure may be one of steel, stainless steel, nickel, titanium, molybdenum, tantalum and the like. The mesh may be plated with Indium or other material that forms an amalgam with mercury. Structures may include a second metallic structure, the second metallic structure mounted within the lamp envelope in such a location with respect to the induced electric field so as to facilitate electrical breakdown of the fluorescing gas mixture during the turn-on phase of the induction RF fluorescent lamp in order to promote rapid luminous development during the turn-on phase of the induction RF fluorescent lamp. The second metallic feature may comprise at least one pointed feature to facilitate electrical breakdown, and may be a wire, sheet, mesh or the like. A mesh may be one of cut metal that has been expanded, woven wires, punched metal and the like. The second metallic feature may be mounted to the surface of the re-entrant cavity, the first metallic structure, or the like. The second metallic structure may be a conductive metal that does not react with mercury such as nickel, molybdenum, steel, stainless steel and the like. The second metallic structure may not comprise Indium.

In embodiments, the induction RF fluorescent lamp may comprise a high frequency electronic ballast operating at a frequency greater than 2, comprising an EMI filter, an AC-to-DC converter, a DC bus, an input choke inductor and a DC-to-AC inverter. The DC-to-AC inverter may comprise a series-connected inductor and capacitor pair connected in parallel with the two output terminals of a switching transistor, such as where the series-connected inductor and capacitor pair regulates the peak voltage across the switching transistor. The input choke inductor may be located between the DC bus and the switching transistor of the DC-to-AC inverter and have a value approximately inversely proportional to the product of the square of the operating frequency of the electronic balance and the capacitance of the switching transistor. The components of the DC-to-AC inverter may be selected to achieve low impedance at the 2nd harmonic of the operating frequency and relatively higher impedance at the fundamental frequency of operation at the output of the switching transistor when said transistor is in its off state. The components of the DC-to-AC inverter may further be selected to achieve, at the output of the switching transistor in its off state, a capacitive impedance at the 3rd harmonic of the operating frequency that has a magnitude between the magnitude of the impedance at the fundamental frequency and the magnitude of the impedance at the 2nd harmonic of the operating frequency. The inductive components of the DC-to-AC inverter may use non-ferromagnetic components. The power coupler may further comprise an air core or a ferromagnetic core. The DC-to-AC inverter may operate at frequencies above 2 MHz such as at frequency of approximately 2.75 MHz. In embodiments the DC-to-AC inverter may operate above 5 MHz such as at a frequency of approximately 6.8 MHz, 13.6 MHz, 27.1 MHz, 40.7 MHz, and the like.

In embodiments, the induction RF fluorescent lamp may comprise and control processor based electronic ballast, such as where the control processor is sized to facilitate packing the electronic ballast components within the volume of the induction RF fluorescent lamp such that the induction RF fluorescent lamp provides exterior dimensions similar to that of an ordinary incandescent bulb. The control processor may comprise a digital control processor, an analog processor, and the like. The control processor may comprise an integrated circuit, an application-specific integrated circuit, a microcontroller, and the like. The control processor may provide at least one control function associated with the operation of the electronic ballast, such as control of a startup condition, the selection of an operating mode, a dimming function, a color temperature, a user interface, a remote control interface, a network interface (e.g., a wired or wireless network interface), a thermal management function, and the like.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 11 depicts an exemplary embodiment cross-section view of an RF induction lamp.

FIG. 12 depicts an exemplary embodiment cross-section view of a coupler with the inserted grounded shell.

While described in connection with certain exemplary and non-limiting embodiments, other exemplary embodiments would be understood by one of ordinary skill in the art and are encompassed herein. It is therefore understood that, as used herein, all references to an "embodiment" or "embodiments" refer to an exemplary and non-limiting embodiment or embodiments, respectively.

DETAILED DESCRIPTION

An induction-driven electrodeless discharge lamp, hereafter referred to synonymously as an induction lamp, an electrodeless lamp, or an electrodeless fluorescent lamp, excites a gas within a lamp envelope through an electric field created by a time-varying magnetic field rather than through electrically conductive connections (such as electrodes) that physically protrude into the envelope. Since the electrodes are a limiting factor in the life of a lamp, eliminating them potentially extends the life that may be expected from the light source. In addition, because there are no metallic electrodes within the envelope, the burner design may employ high efficiency materials that would otherwise react with the electrodes, such as bromine, chlorine, iodine, and the like, and mixtures thereof, such as sodium iodide and cerium chloride. Embodiments described herein disclose an inductor mounted inside a re-entrant cavity protruding upward within the burner envelope, where the inductor is at least one coil, which may be wound around a core of magnetizable material suitable for operation at the frequency of the time-varying magnetic field, such as ferrite or iron powder, to form the power coupler that creates the time-varying magnetic field that generates the time-varying electric field in the lamp's interior. The power coupler receives electrical power from a high-frequency power supply, known as a ballast, which in embodiments is integrated within the base of the induction lamp. The ballast in turn receives electrical power through a standard base, such as an Edison Screw Base (E39, E26, E17 or E12 base), a GU-24 base, and the like, from the AC mains. The form factor for the induction lamp may take a form similar to a standard incandescent light bulb, (A19 shape) or an incandescent reflector lamp, such as an R30 or BR30, thus allowing it to be used as a replacement for incandescent light bulbs.

Figure 1:
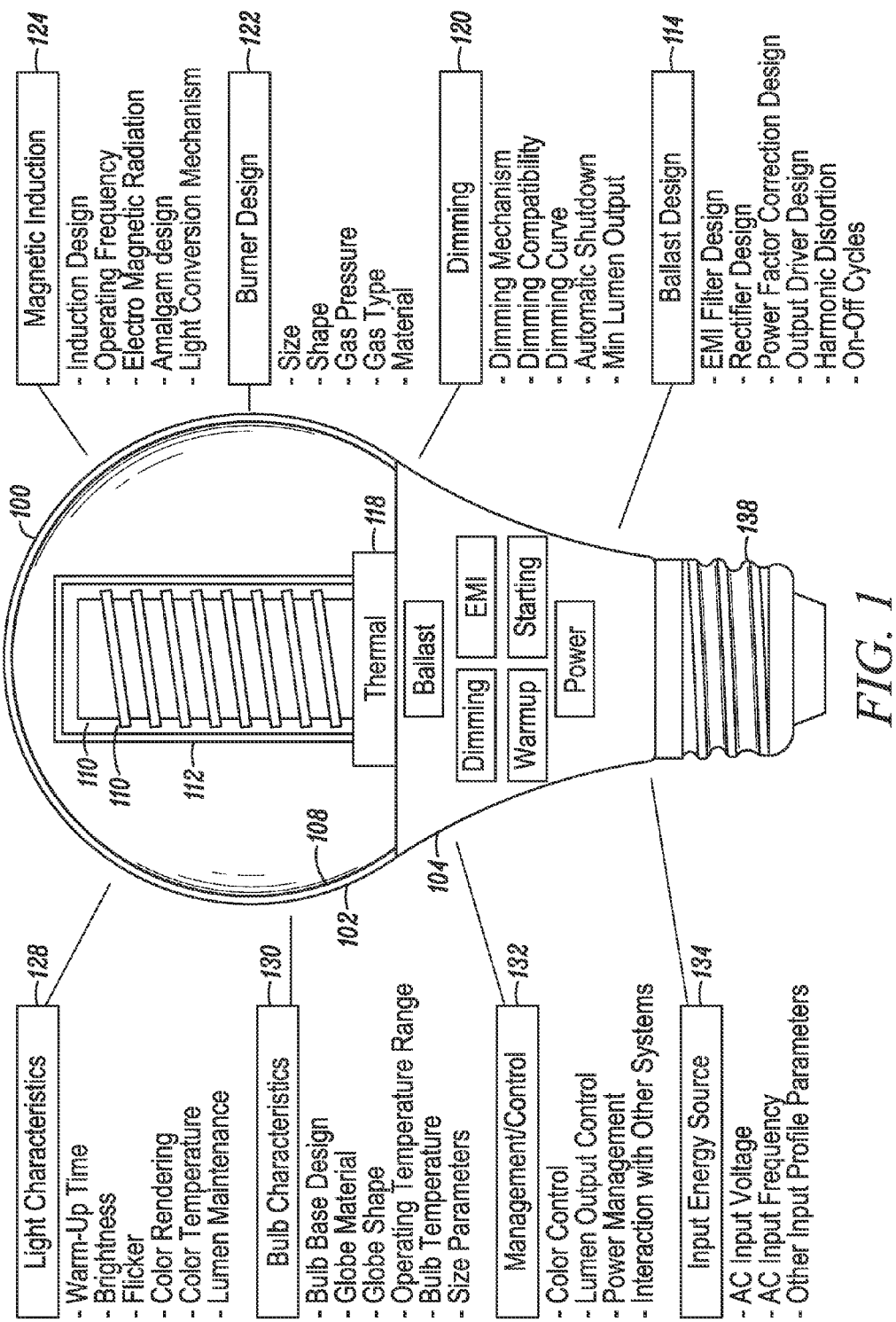
FIG. 1 depicts a high-level functional block diagram of an embodiment of the induction lamp.

Referring to FIG. 1, an embodiment of an induction lamp 100 is illustrated, having an 'upper' light providing portion 102 (i.e., the light delivery end, understanding that the lamp may be mounted in any orientation per the lamp socket position), a 'lower' electronics portion 104 (i.e. the opposite of the light delivery end), and an electrical-mechanical base connection (e.g. an Edison base), where the proportions and shape of the upper and lower portions of the induction lamp are illustrative, and not meant to be limiting in any way. In embodiments, the upper portion may include the burner envelope 108 with an induction power coupler 110 (comprising winding(s), and optionally a core as described herein) inserted up into a re-entrant cavity 112, where the induction power coupler creates the time-varying magnetic field that, in turn, creates the time-varying electric field within the burner envelop. The burner envelope contains an amalgam that provides mercury vapor. The mercury atoms in the vapor are then both ionized and excited by the time-varying electric field. The excited mercury atoms emit small amounts of visible light plus much larger amounts of ultraviolet energy that is then converted into visible light by a phosphor coating on the inside of the burner envelope, thus the induction lamp provides light to the outside environment.

In embodiments, the external appearance of the upper portion with respect to its optical properties may be similar to traditional phosphor-based lighting devices, where the glass is substantially white due to the phosphor coating on the inside of the envelope. The external appearance of the lower portion with respect to its optical properties may be made to be substantially similar to the upper portion in order to minimize the differences in the appearance of the upper and lower portions, thus minimizing the overall visual differences between the external appearance of the disclosed induction lamp bulb and that of a traditional incandescent bulb, such as having external materials that are similar to the external materials of the upper bulbous portion (e.g. vitreous or vitreous-coated materials).

In embodiments, the induction lamp may be structured with an upper bulbous portion, an electronics portion in the neck or tapered portion of the bulb, a screw base (e.g. Edison base), and the like, where the electronics portion may either show externally as a separate lower portion, such as with the upper portion seated within the neck of the lower portion, or the lower portion may be completely encased within an extended upper portion. That is, the bulbous portion may extend down over the electronics portion as a vitreous envelope all the way to the screw base. In this way, the induction lamp may look nearly identical to an ordinary incandescent light bulb, at least when the induction light bulb is turned on and illuminating, and optionally designed to look the same when illuminated due to an optical design to illuminate down the neck of the induction bulb that is around the electronics portion.

Figure 12A:
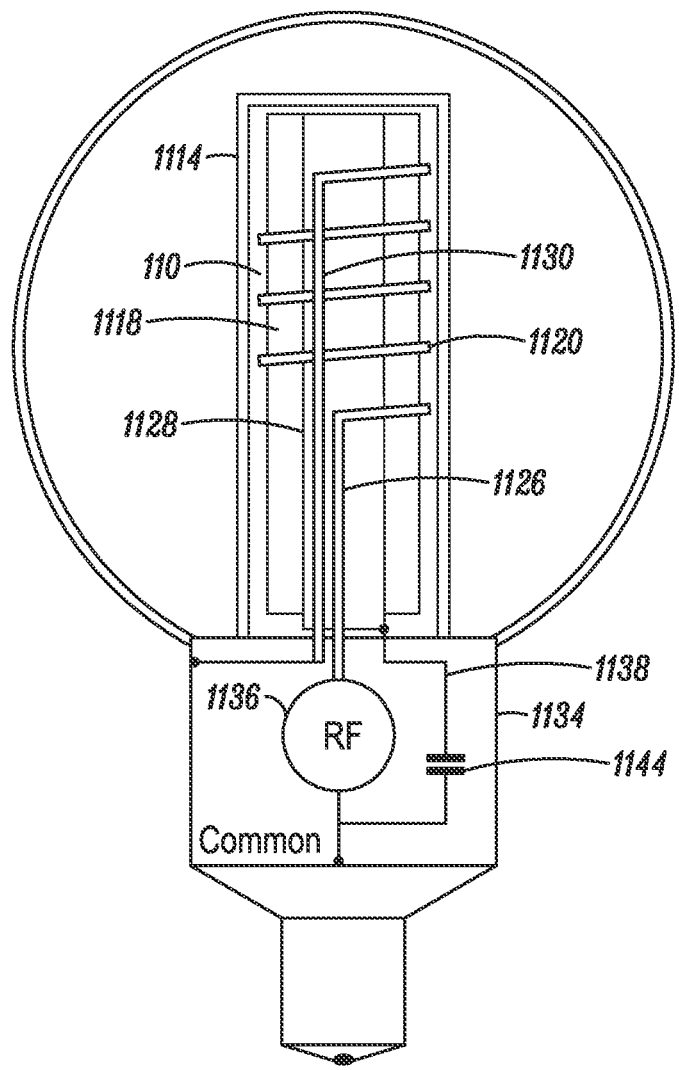
FIG. 12A depicts an exemplary embodiment of a capacitor acting to provide electrical isolation from a ferrite core coupler.
Figure 12B:
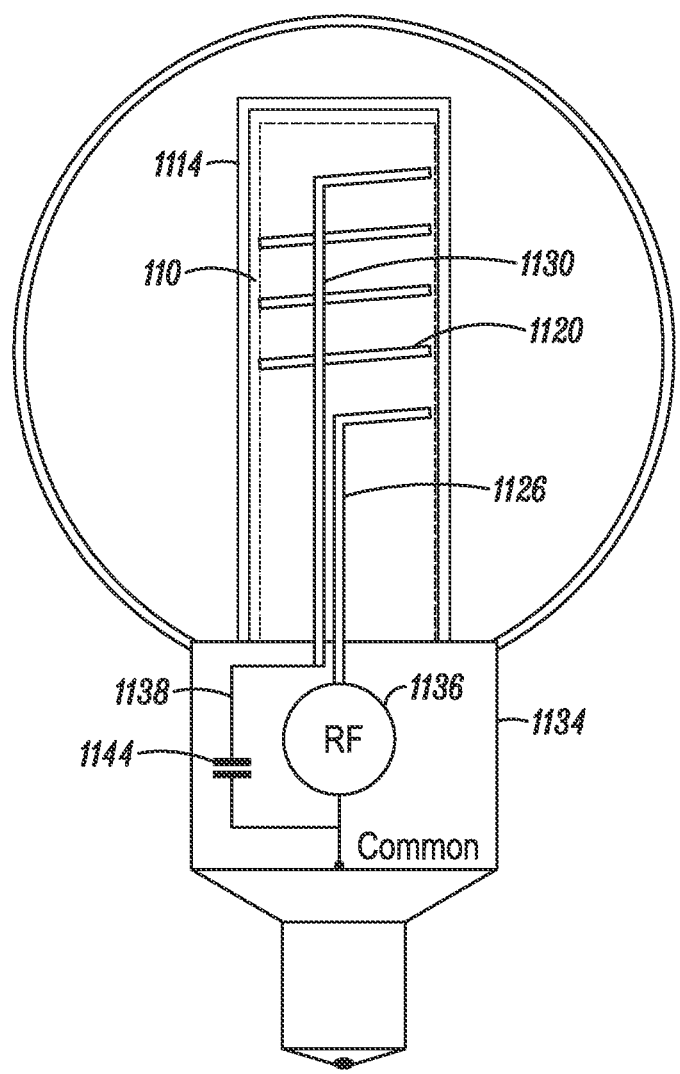
FIG. 12B depicts an exemplary embodiment of a capacitor acting to provide electrical isolation from an air-core coupler

Although FIG. 1, as well as FIGS. 11-12B, shows the electronics (e.g., the ballast) located in the lower portion 104 below the power coupler inside the re-entrant cavity, this is meant to be illustrative, and not limiting, where the electronics may be of a size that fits in a reduced portion of the neck of the bulb, located wholly inside the screw base 138, located inside the reentrant cavity 112, and the like.

Figure 1A:
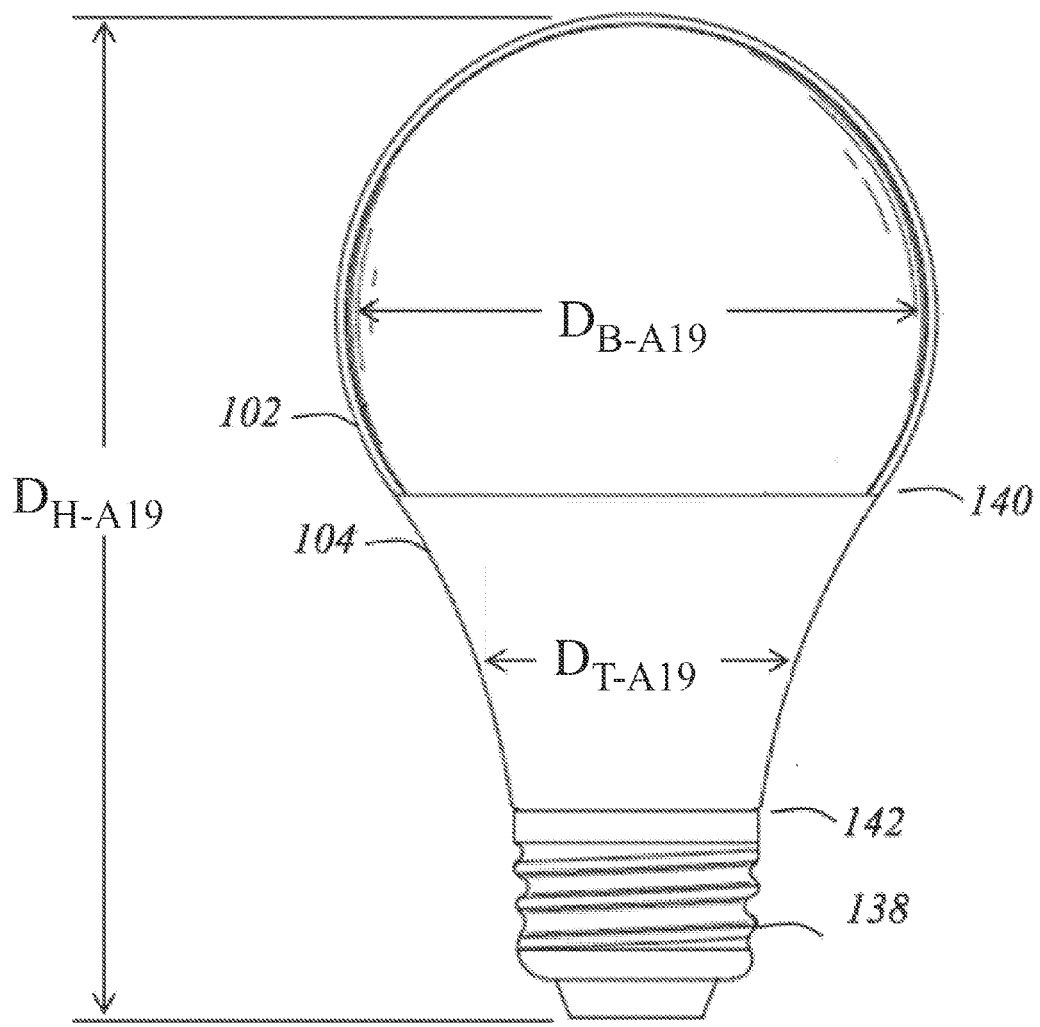
FIG. 1A depicts embodiment dimensionality for an induction lamp.

Referring to FIG. 1A, the induction lamp may have the approximate shape and dimensions of an ordinary incandescent bulb, with a dimension $D_B$ at the widest point of the bulbous portion 102 being within the NEMA ANSI standards for electric lamps, which sets forth the physical and electrical characteristics of the group of incandescent lamps that have A, G, PS and similar bulb shapes with E26 medium screw bases. The NEMA ANSI C78.20-2003 standard for electric lamps is incorporated herein in its entirety. Although the standard provides the outer most bounds for the specified lamps, the common dimensions for said specified bulbs may be substantially within these ranges. Thus the dimensionality of the induction lamp may be approximately equivalent to those of the ordinary incandescent bulb as manufactured as opposed to the maximum dimensions as specified in the standard, thereby effectively providing a replacement for an ordinary incandescent bulb that matches the user's expectation of the profile and size of an ordinary incandescent bulb.

In an example, and per said referenced NEMA ANSI standard, the maximum for the dimension $D_{B-A19}$ at the widest point of the bulbous portion 102 of an A19 bulb is set out to be in the range 68 to 69.5 millimeters. However, in a typical 60 W incandescent A19 bulb $D_{B-A19}$ is approximately 60.3 mm (or approximately 2⅜ inches, where 'A19' refers to an 'A' profile width $D_{B-A19}$ of 19 times ⅛ inch). Similarly, the overall length $D_{H-A19}$ of an A19 bulb from the bottom of the screw portion to the top of the bulbous portion is specified in the NEMA ANSI standard to be in the range between 100 to 112.7 millimeters for different length versions of the A19 form factor, but the typical 60 W incandescent A19 bulb is approximately 108 millimeters.

In embodiments, the lower portion 104 may take the form of a concave tapering neck that has a maximum tapering diameter $D_{T-A19}$ substantially less than $D_{B-A19}$ into which the upper portion 102 may be seated, such as at an upper-lower interface point 140. The upper-lower interface point 140 may have a maximum diameter where the tapering concave shape of the neck meets the spherical bulbous upper portion 102 that is less than the diameter of the sphere as in an ordinary incandescent bulb, such as approximately 45 mm millimeters plus or minus a tolerance, such as +/−3 mm, +/−2 mm, +/−1 mm, and the like. From the upper-lower interface point 140 the neck may taper in a concave form to the lower-cap interface point 142 at the top of the screw mount 138, such as similar to a typical incandescent bulb. In embodiments, the taper may be such that there is less than a thirty degree angle between the surface of the lower portion 104 that runs from interface point 142 to 140 and a central axis running through the lamp from the screw mount 138 to the top of the bulbous portion 102. The bulbous portion 102 may be constructed such that it forms a partial sphere having a radius that is one-half of $D_{B-A19}$. This may result in the bulbous portion being seated in the neck of the lower portion 104 so that more than a hemisphere of the partial sphere sits above the neck of the lower portion 104. In embodiments, the upper portion 102 and lower portion 104 may be connected in a manner that makes their separation indistinguishable to the viewer, such as by using appropriate overlay or coating materials, or by fashioning a seamless connection between the two portions.

Figure 1B:
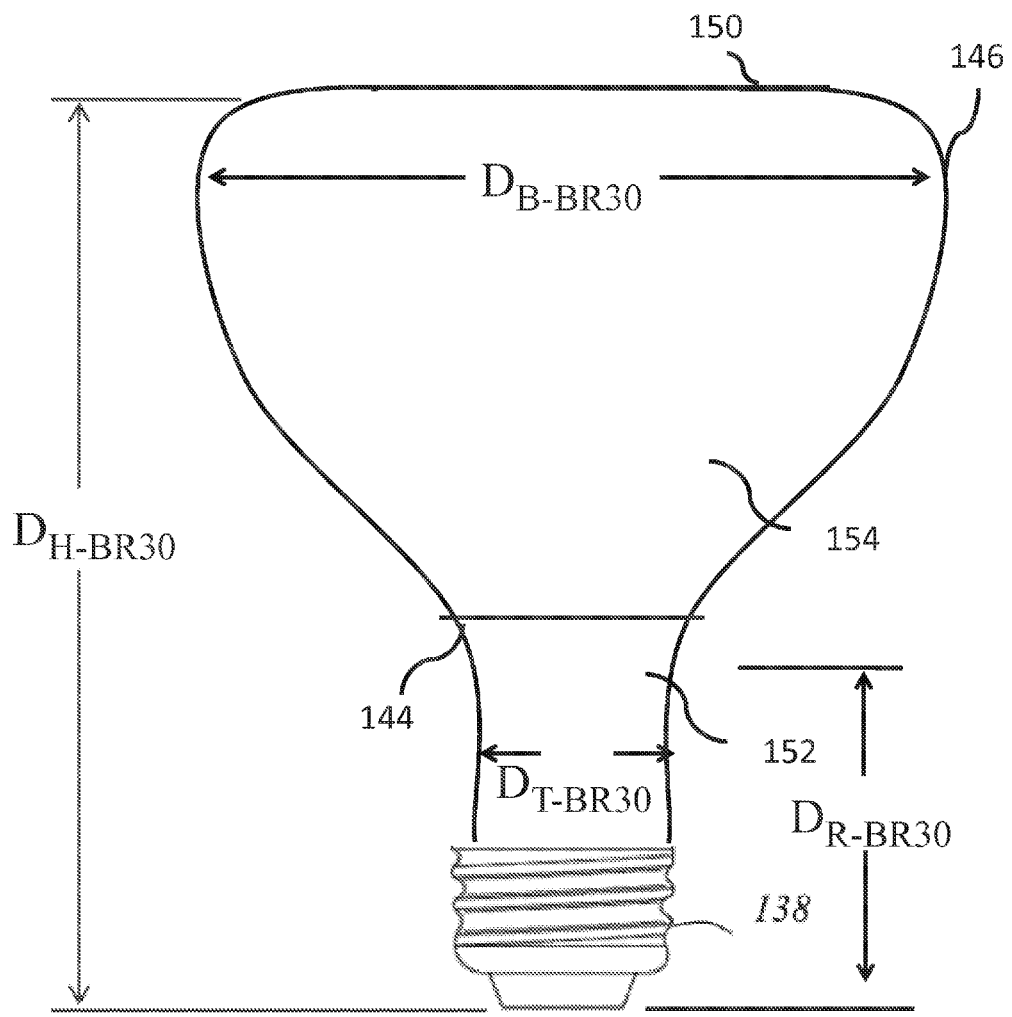
FIG. 1B depicts embodiment dimensionality for an induction lamp.

Referring to FIG. 1B, the induction lamp may have the approximate shape and dimensions of an ordinary incandescent bulged reflector bulb, with a dimension $D_{B-BR30}$ at the widest point of the bulbous portion 146 being within the NEMA ANSI standards for electric lamps, which sets forth the physical and electrical characteristics of the group of bulk reflector lamps that have BR and similar bulb shapes with E26 medium screw bases. The NEMA ANSI C78.21-2003 standard for electric lamps is incorporated herein in its entirety. Although the standard provides the outer most bounds for the specified lamps, the common dimensions for said specified bulbs may be substantially within these ranges. Thus the dimensionality of the induction bulged reflector lamp may be approximately equivalent to those of the ordinary bulged reflector bulb as manufactured as opposed to the maximum dimensions as specified in the standard, thereby effectively providing a replacement for an ordinary bulged reflective bulb that matches the user's expectation of the profile and size of an ordinary bulged reflective bulb.

In an example, and per said referenced NEMA ANSI standard, the maximum for the dimension $D_{B-BR30}$ at the widest point of the bulbous portion 146 of BR30 bulb is 108.5 millimeters. However, in a typical 65 W incandescent BR30 bulb $D_{B-BR30}$ is approximately 95.3 mm (or approximately 3¾ inches, where 'BR30' refers to an 'BR' profile width $D_{B-BR30}$ of 30 times ⅛ inch). Similarly, the overall length $D_{H-BR30}$ of a BR30 bulb from the bottom of the screw portion to the top of the bulbous portion is specified in the NEMA ANSI standard to be in the range between 123.8 to 136.5 millimeters for different length versions of the BR30 form factor, but the typical 65 W incandescent BR30 bulb is approximately 129.5-136.5 millimeters (5.13-5.375 inches).

In embodiments, the lower portion 152 may take the form of an approximately vertical rise from the base, $D_{R-BR30}$, to a minimum height of 46.7 millimeters, which is substantially less than the minimum overall bulb height of 123.8 millimeters. The lower portion 104 may have a maximum diameter $D_{T-BR30}$ of 43.1 millimeters plus or minus a tolerance, such as +/−3 mm, +/−2 mm, +/−1 mm, and the like. From the upper-lower interface point 144 the bulb may angle up and outward at approximately 54° from the normal to the central axis running through the lamp from the screw mount 138 to the top of the bulbous portion 150 where the sides round radially toward the center of the bulb. At the top of the bulbous portion 150 the lamp is approximately planar. In embodiments, the upper portion 154 and lower portion 152 may be connected in a manner that makes their separation indistinguishable to the viewer, such as by using appropriate overlay or coating materials, or by fashioning a seamless connection between the two portions.

In embodiments, the electronics to operate the lamp are designed and packaged in such a way that they may be fully contained within the lamp, within the confines of a standard lamp base such as an E26 medium screw base, within the bottom portion 104 152 of the lamp bulb, within a re-entrant cavity, and the like. Techniques may include selection of components, including the migration of inductive components to those without ferromagnetic cores, selection of circuit board technology including flexible and printed circuit boards, the use of IC mounting techniques such as flip chip, also known as controlled collapse chip connection, wire bonding, and the like.

In embodiments, the induction lamp may be made to approximate the shape and dimensions for any standard bulb, such that it is better accommodated by lighting fixtures designed for the standard bulb, as well as being generally more familiar to the public, and thus more acceptable as a replacement bulb for commonly used incandescent bulbs. As such, despite the range tolerances provided in the NEMA ANSI standards, the induction lamp may be of a shape that is similar to an ordinary incandescent lamp, such as would be familiar to a member of the public, but with the possibility that a segment exists between the upper bulbous portion 102 and the lower electronics portion 104 as described herein.

In embodiments, other dimensional aspects of the induction lamp may be determined by the selection of a profile and size of the induction bulb to that of a typical incandescent bulb, such as an A19 bulb, a BR30 bulb and the like. For instance, the dimensions of the re-entrant cavity 112 and/or the power coupler 110 may be at least in part determined by the shape and/or size of the bulbous portion 102 of the induction lamp, where the shape of the power coupler 110 as accommodated in the re-entrant cavity 112 determines where the resultant field strength is maximized within the envelope. It may be ideal to have the strength maximized in the plane of the maximum dimension of $D_B$, such as in the centermost portion of the volume between the re-entrant cavity and the outer wall of the envelope. In this regard, the shape and positioning of the power coupler 110, and the re-entrant cavity 112 it resides in, may include dimensional attributes that improve lamp performance within the dimensional constraints of a typical incandescent bulb.

In embodiments, the induction lamp may include other aspects that contribute to acceptance and compatibility with existing incandescent lighting, such as with dimming compatibility to existing external circuitry (e.g. dimming switches that employ TRIAC or MOSFET switches) and lighting characteristics similar to an incandescent lamp (e.g. brightness level, low flicker, matching color rendering, matching color temperature, and the like). In this way, the induction lamp will substantially resemble a traditional incandescent light bulb, increasing the sense of familiarity of the new induction lamp with the public through association with the incandescent lamp, and thus helping to gain acceptance and greater use for replacement of incandescent light sources.

The induction lamp described in embodiments herein may provide for improved capabilities associated with the design, operation, and fabrication of an induction lamp, including in association with the ballast 114, thermal design 118, dimming 120, burner 122, magnetic induction 124, lighting characteristics 128, bulb characteristics 130, management and control 132, input energy 134, and the like. The ballast, as located in the lower portion of the induction lamp, is the high-frequency power supply that takes mains AC as provided through the base 138, and creates the high-frequency electrical power delivered to the power coupler located in the re-entrant cavity in the upper portion. Improved capabilities associated with the ballast design may include dimming facilities, EMI filter, a rectifier, a power factor correction facility, output driver, circuitry with reduced harmonic distortion, a power savings mode with on-off cycles, lamp start-up, lamp warm-up, power management, and the like. Improved capabilities may provide for a design that provides a compatible thermal environment, such as through a static thermal design, through dynamic power management, and the like.

Improved capabilities associated with the dimming design may include a dimming mechanism, dimming compatibility, a compatible dimming performance relative to a dimming curve, an automatic shutdown circuit, a minimum lumen output, and the like. Dimming capabilities may include methods for dimming and/or TRIAC trigger and holding currents, including frequency dimming, frequency dimming and handshake with TRIAC firing angle, circuits without a traditional smoothing capacitor and with an auxiliary power supply, burst mode dimming, multiple-capacitor off-cycle valley filling circuit, frequency slewing, auto shut-off dimming circuit, current pass-through, utilization of bipolar transistor, holding current pulsed resistor, charge pump, buck or boost converter, and the like.

Improved capabilities associated with the burner design may include aspects related to the size, shape, gas pressure, gas type, phosphor type, materials, EMI reduction via core and/or coupler shielding, methods to reduce light output run-up time, improved lumen maintenance through improved burner processing, use of protective coatings on burner surfaces or improved materials for fabricating the burner envelope and reentrant cavity, and the like.

Improved capabilities associated with the magnetic induction design may include the operating frequency range, electro-magnetic radiation management, reduced electro-magnetic interference utilizing active and passive magnetic induction windings, improved axial alignment through radial spacers, or a grounded shell inserted to the ferromagnetic core, internal transparent conductive coatings, external transparent conductive coating with insulating overcoat, electrical field shield between the coupler and the re-entrant cavity, and the like.

Improved light characteristics provided may include warm-up time, brightness, luminous flux (lumens), flicker, color rendering index, color temperature, lumen maintenance, incandescent-like lighting in a magnetic induction electrodeless lamp, high red rendering index lighting, increased R9, and the like.

Improved lamp characteristics provided may include a bulb base design, globe material, globe shape operating temperature range, bulb temperature, size parameters, instant on electrodeless lamp for residential applications, electrodeless lamp for frequent on/off and motion detector applications, and the like.

Improved capabilities associated with the management and control may include color control, lumen output control, power management, susceptibility to line voltage changes, component variations and/or temperature changes, interaction with other systems, remote control operation (e.g. activation, deactivation, dimming, color rendering), and the like.

Improved capabilities associated with the input source may include AC input voltage, AC input frequency, and other input profile parameters.

Ballast

The ballast is a special power supply that converts power line voltage and current to the voltage and current required to operate the burner. In the U.S. the ballast generally operates from a 120 Volt, 60 Hz AC power line, but the ballast could be designed to operate from AC power lines with different voltages and/or frequencies, or from DC power lines with a range of voltages. Ballasts that are designed for induction-driven electrodeless discharge lamps convert the power line voltage and current into voltage and current with a frequency in the range of 50 kHz to 50 GHz, depending upon the design of the lamp. For the type of induction lamps described in the present disclosure, the ballast output frequency is generally in the 1 MHz to 30 MHz region.

The ballast provides a number of functions in addition to the basic frequency, voltage and current conversion functions. The other key functions include: a) providing a means to generate the high voltages necessary to start the discharge; b) limiting the current that can be delivered to the discharge, and c) reducing the power delivered to the discharge to reduce the light produced when commanded to do so by a user-operated control, i.e., a dimmer.

The conversion from power line voltages and currents to the voltages and currents used to operate the discharge are usually accomplished in a two-step process. In the first step, the power line voltage and current is converted into DC voltage, usually by means of a full wave bridge rectifier and optionally an energy storage capacitor (e.g. an electrolytic storage capacitor to smooth ripple after the rectifier stage). In the second step, the DC power created by the bridge rectifier is converted into high frequency AC power at the desired frequency by means of an inverter. The most common inverter used in discharge lamp ballasts is a half-bridge inverter. Half-bridge inverters are composed of two switches, usually semiconductor switches, connected in series across the DC power bus. The output terminals of the half-bridge inverter are 1) the junction between the two switches, and 2) either side of the DC power bus for the inverter. The half-bridge inverter may be driven by feedback from the matching network described herein or a separate drive circuit. The former is called a "self-oscillating half-bridge inverter" while the latter would be called a "driven half-bridge inverter."

In addition to half-bridge inverters, the inverter can be configured as a push-pull circuit using two switches, or as a flyback or Class E or other such converter using a single switch.

The switch or switches used for the inverter can be composed of bi-polar transistors, Field Effect Transistors (FETs), or other types of semiconductor switching elements such as TRIACs or Insulated Gate Bi-Polar Transistors (IGBTs), or they can even be composed of vacuum tubes. Ballasts designed for induction lamps generally employ FETs in the inverter.

The output voltage of a half-bridge inverter is typically composed of both DC and AC components. Therefore, at least one DC blocking capacitor is typically connected in series with the induction lamp load when it is connected to the half-bridge inverter. Additionally a matching network is connected between the output of the half-bridge inverter and the induction-driven lamp load. The matching network provides at least the following four functions: 1) convert the input impedance of the coupler described herein to an impedance that can be efficiently driven by the half-bridge inverter, 2) provide a resonant circuit that can be used to generate the high voltages necessary to initiate the discharge in the burner, 3) provide the current-limiting function that is required by the fact that the discharge has what is known as "negative incremental impedance" which would cause it to draw high levels of current from the half-bridge inverter if that current was not limited by some means, and 4) filter the waveform of the half-bridge inverter, which is generally a square wave, to extract the sine wave at the fundamental frequency of the half-bridge inverter. This last step is necessary to reduce generation by the coupler and burner of electromagnetic radiation at harmonics of the fundamental drive frequency of the half-bridge inverter.

The matching network is typically composed of a resonant circuit that is used to generate high voltage to start the discharge in the burner and then provides the current limiting function after the discharge has been initiated. This resonant circuit is often designed as a series resonant L-C circuit with the lamp connected across the resonant capacitor. However, other configurations are possible. The coupler used with induction lamps is inductive, so the matching network for an induction lamp could be a series C-L with the discharge "connected" across the inductor by virtue of the inductive coupling inherent in such lamps. However, better performance is often achieved with an L-C-L circuit that uses the inductance of the coupler in addition to a separate inductor and capacitor. Other matching networks that employ additional inductors and/or capacitors are known in the art.

Since the half-bridge inverter is operating at a frequency substantially above the power line frequency, it is also generally equipped with what is known as an "EMI filter" where it is connected to the power line. The EMI filter is designed to reduce the level of high frequency noise that the half-bridge inverter injects into the AC power line. To achieve this function, the EMI filter is generally designed as a low pass filter with a cut-off frequency below the operating frequency of the inverter.

Figure 24:
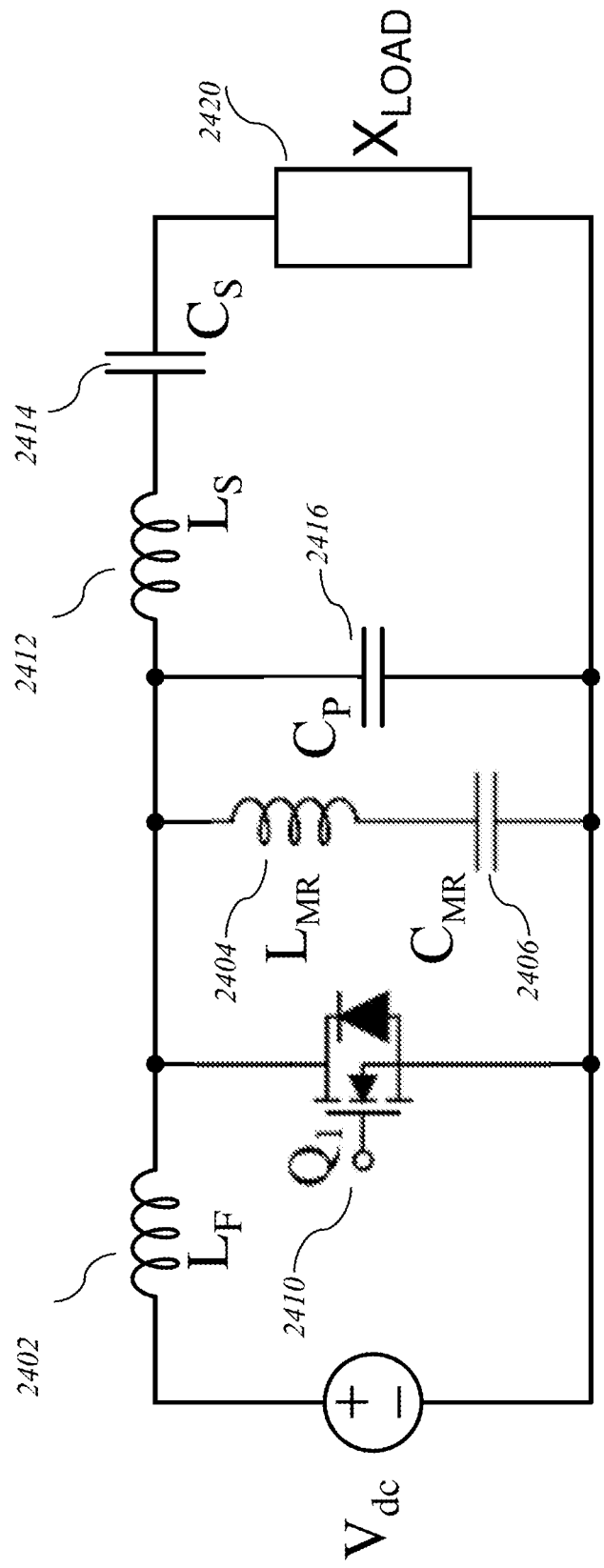
FIG. 24 shows an example of a high frequency DC-to-AC inverter circuit.

In some embodiments, the induction RF fluorescent lamp may operate at higher frequencies, above 2 MHz. These frequencies are achieved using a modified Class E circuit, an example of which is shown in FIG. 24. Class E oscillators and inverters have a maximum theoretical efficiency of 100%, but practical circuits may be limited to an efficiency of 90% to 95% due to losses in the various inductors and capacitors used in the resonant output circuits.

This invention comprises modifications to a Class E circuit. An extra circuit leg, comprising a series-connected inductor, $L_{MR}$, 2404 and capacitor, $C_{MR}$, 2406, is connected in parallel with the two output terminals of a switching transistor, $Q_1$, 2410. Additionally, a starting value for the input choke inductor, $L_F$, 2402, located between the power supply 2412 and the active switch, $Q_1$, 2410, may be calculated using the following formula:

$$L_F = \frac{1}{9\pi^2 f_s^2 C_F}$$

where $f_s$ represents the operating frequency and $C_F$ is the device capacitance of the active switch, $Q_1$, 2410. The above formula represents an initial or starting value for $L_F$ and is not intended to be limiting. The value of the input choke inductor, $L_F$, 2402 of this invention represents a significant reduction in the value of the input choke inductor relative to that of a typical Class E circuit input choke inductor which typically requires a ferromagnetic core. The reduction in the value of this component may result in the elimination of all ferromagnetic materials from the DC to AC converter section.

The modified Class E circuit of the invention uses a resonant sub-circuit to reduce the peak voltage across the active switch, $Q_1$, 2410 allowing the use of a higher performance switch such as MOSFET or similar device. With a correct tuning of the resonant sub-circuit, the peak voltage at the active switch, $Q_1$, 2410 may be reduced relative to a typical Class E circuit by approximately 40%. This allows the use of a lower voltage rated MOSFET and the like. As this is a single transistor circuit, the synchronization issues of a multiple transistor circuit, such as the half bridge inverter and the like, are eliminated. The components of the modified Class E circuit: inductor, $L_{MR}$, 2404, capacitor, $C_{MR}$, 2406, inductor, $L_S$, 2412, capacitor, $C_S$, 2414, and capacitor, $C_P$, 2416 are selected to achieve low impedance at the 2nd harmonic of the switching frequency and relatively higher inductive impedance at the output of the inverter, the terminals of the active switch, $Q_1$, 2410 in its off state, at the fundamental frequency of operation; and a capacitive impedance at the 3rd harmonic of the operating frequency at the same pair of nodes. The impedance at the fundamental frequency is larger than the impedance at the 3rd harmonic.

Figure 25:
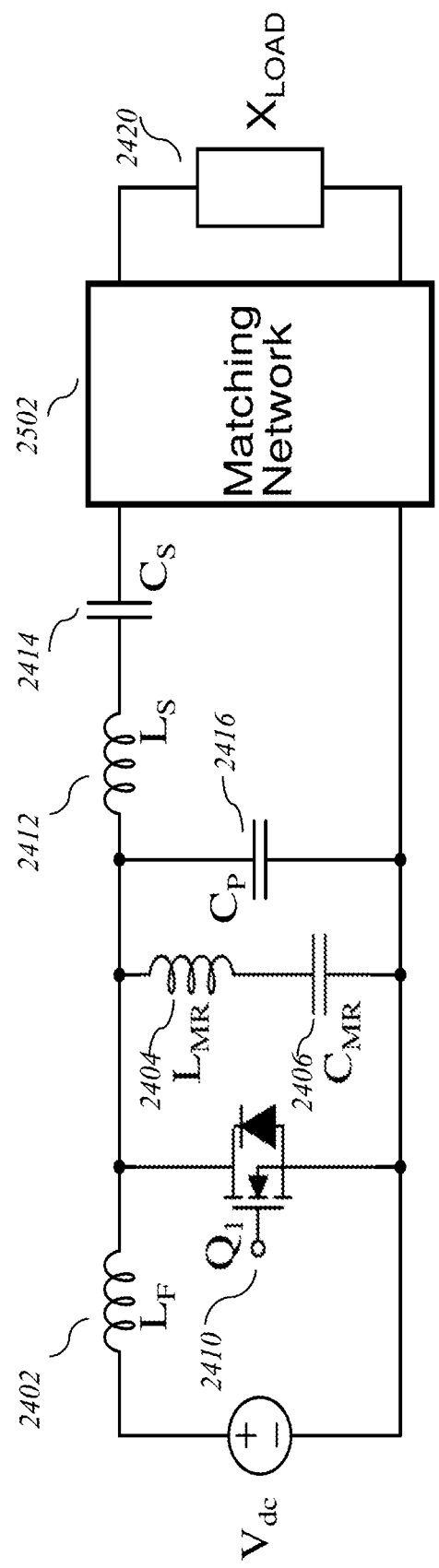
FIG. 25 shows an example of a DC-to-AC inverter with a matching network.
Figure 26:
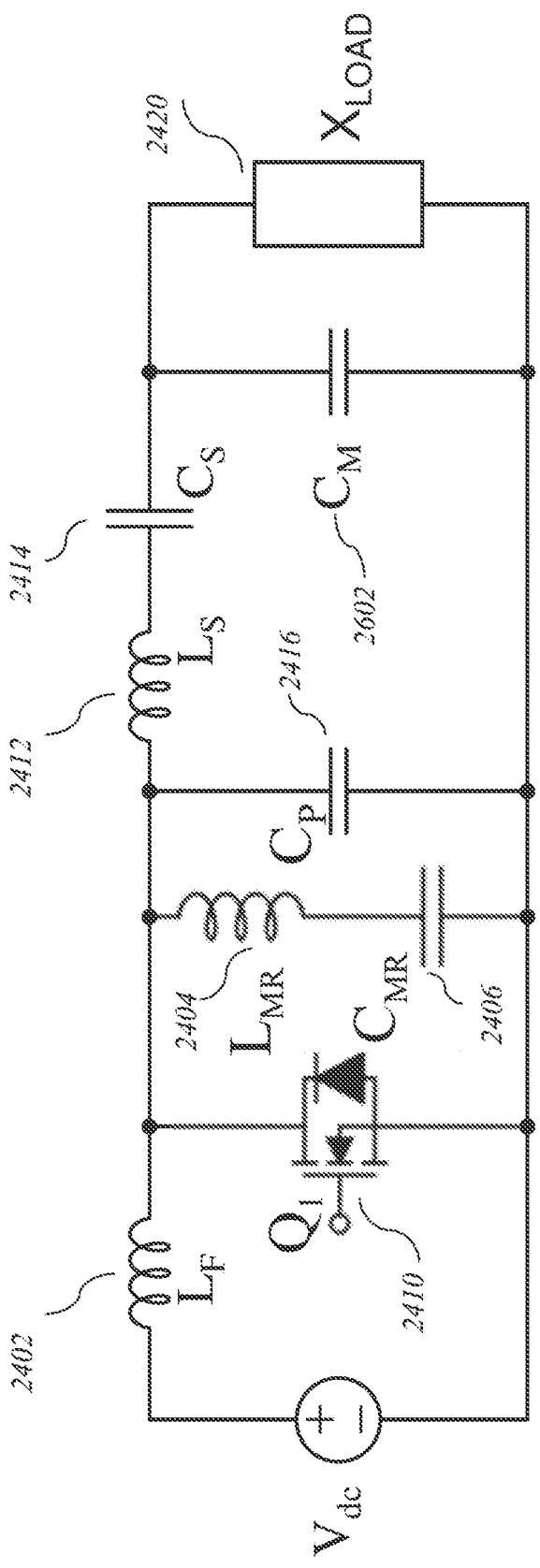
FIG. 26 shows an example of a DC-to-AC inverter with a matching network.
Figure 27:
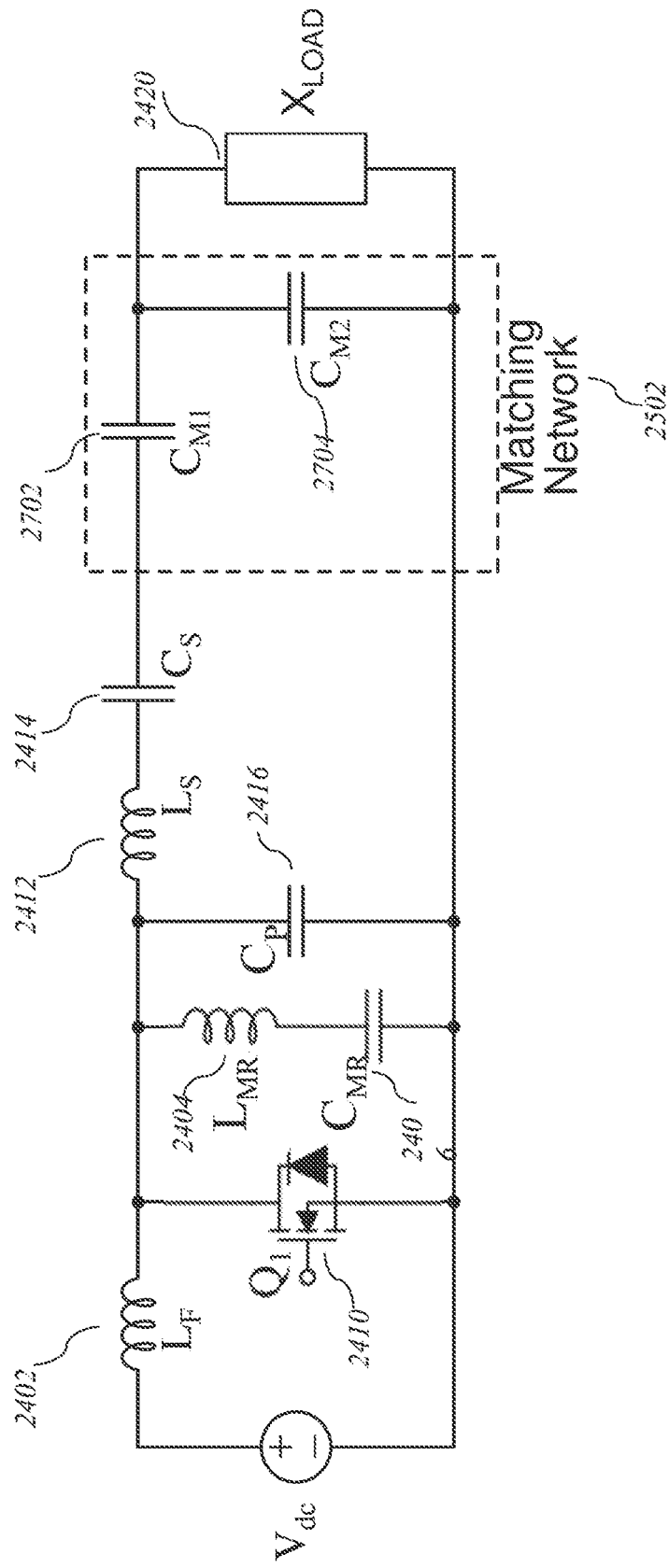
FIG. 27 shows an example of a DC-to-AC inverter with a matching network.
Figure 28:
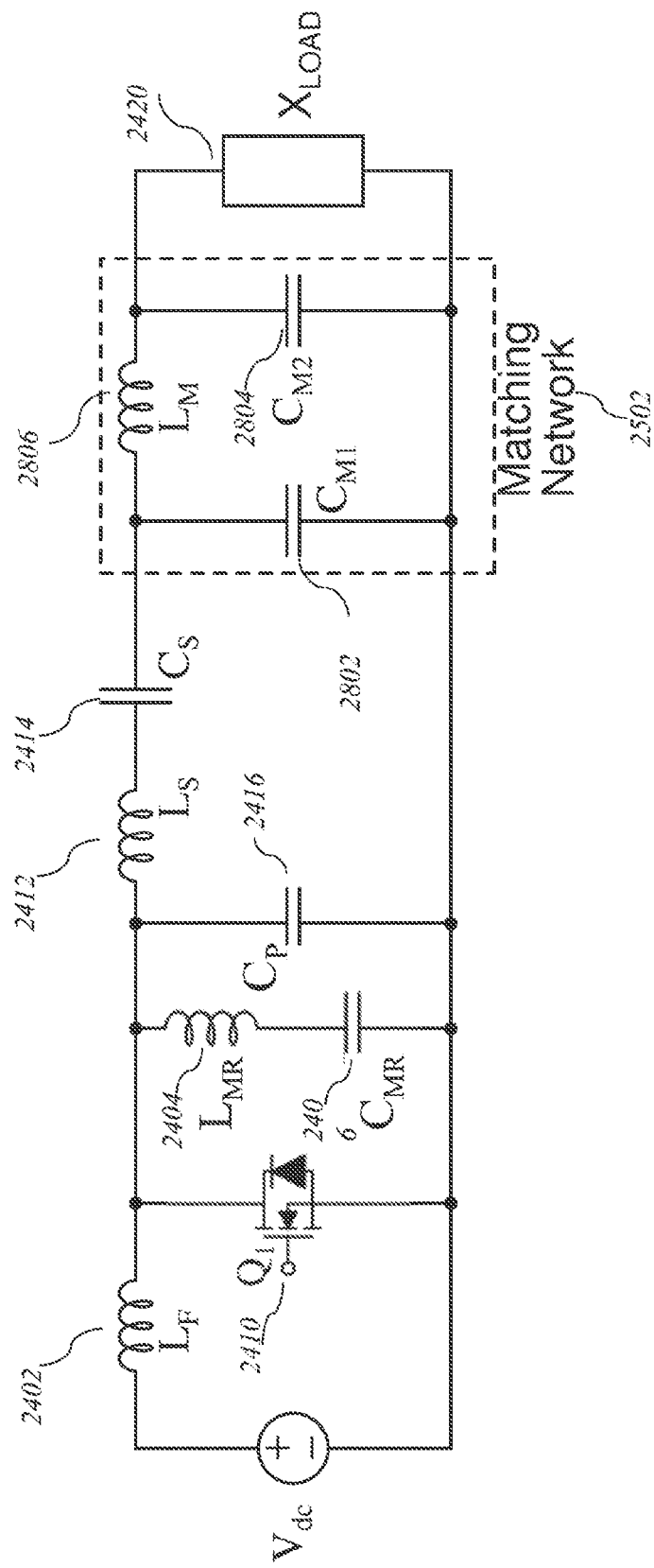
FIG. 28 shows an example of a DC-to-AC inverter with a matching network.

In some embodiments, as shown in FIG. 25, there is a matching network 2502 between the modified Class E circuit of the invention and the circuit load 2420, which is the power coupler for the induction lamp. There are a variety of circuits which may comprise the matching network 2502. FIG. 26 illustrates one example of a matching network 2502 comprising a capacitor, $C_M$, 2602. FIG. 27 illustrates another example of a matching network 2502 comprising two capacitors, $C_{M1}$ 2702 and $C_{M2}$ 2704. FIG. 28 illustrates yet another example of a matching network 2502 comprising two capacitors, $C_{M1}$ 2802 and $C_{M2}$ 2804, and an inductor, $L_M$, 2806. These examples are meant to be illustrative of matching networks 2502 and should not be considered limiting.

At these higher frequencies, the ballast circuit may operate more efficiently as the power level is increased. For instance, the combination of higher efficiency at higher power and increased operating frequencies may facilitate operating the lamp at higher power levels for shorter intervals of time, facilitating dimming.

At higher operating frequencies it may be possible to avoid using ferromagnetic materials for the coupler core and instead use a material that has a magnetic permeability essentially the same as that of free space, and an electrical conductivity of zero, or close to zero. One type of material that satisfies these conditions is plastic, but one skilled in the art will appreciate other materials that meet this characteristic and suitable for this application. Couplers wound on rods or tubes that satisfy the stated conditions are typically referred to as 'air-core couplers' or 'air-core coils'. An air-core coil may also be fabricated without the use of any rod-like or tubular coil form if the wire is sufficiently stiff or if the wire is supported by an external structure. The use of an air-core coil may enable the printing of the coupler windings on the air side of the re-entrant cavity, enable the removal of the reentrant cavity and placement of the air coil directly in the bulb with electrical feedthroughs to the outside, and the like.

The use of an air-core coil rather than a coil wound on a ferromagnetic core may result in cost and weight savings. Additionally, an air-core coil may be less temperature sensitive than a coil that uses a ferrite core. Magnetic materials have a temperature limitation above which their magnetic characteristics are severely affected. Conversion to an air-core coil eliminates the need to control the core temperature to preserve magnetic performance as a design limitation.

In some embodiments, the fundamental frequency may be selected from one of a set of frequencies, known as the industrial, scientific and medical (ISM) radio bands. Devices emitting electromagnetic radiation in these bands are not subject to the typical FCC restrictions on the strength of such emissions, so these bands are especially useful for devices, such as induction lamps, that use radio frequency energy for non-communication purposes.

Figure 29:
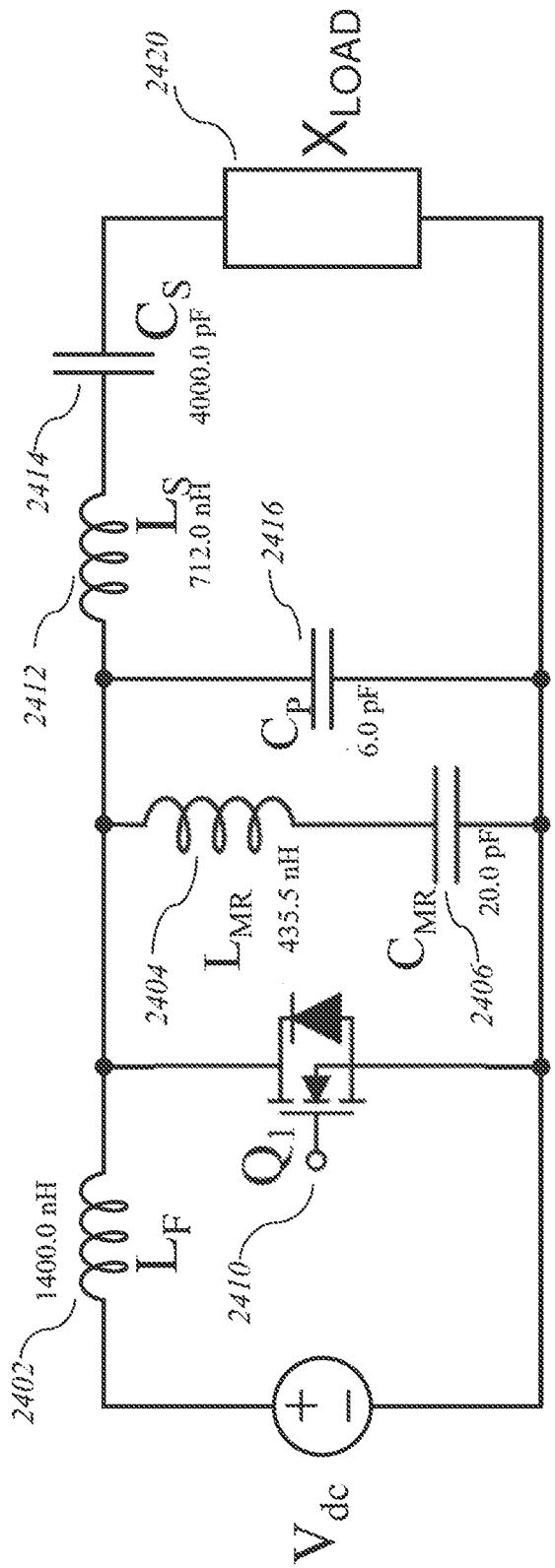
FIG. 29 shows an example of a DC-to-AC inverter with a matching network.

In one embodiment, the fundamental operating frequency is 27.12 MHz. There is an ISM band centered at 27.12 MHz and having a bandwidth of 326 KHz allowing for greater operating latitude for both the primary operating frequency and side band emissions. FIG. 29 shows a DC-to-AC inverter circuit designed for operation at approximately 27 MHz. The increased latitude at this operating frequency may allow for the frequency to be generated using a less precise and less costly ceramic resonator, or similar device, rather than a quartz crystal. In one embodiment, the fundamental operating frequency is 40.7 MHz. There is an ISM band centered at 40.680 MHz and having a bandwidth of 40 KHz. In one embodiment, the fundamental operating frequency is approximately 13.6 MHz. There is an ISM band centered at 13.560 MHz and having a bandwidth of 14 KHz. In one embodiment, the fundamental operating frequency is approximately 6.8 MHz. There is an ISM band centered at 6.8 MHz and having a bandwidth of 30 KHz. In one embodiment, the fundamental operating frequency is between 2.5 and 3 MHz.

Ballasts that employ the basic AC-to-DC converter stage described herein, consisting of a full wave bridge rectifier and an energy storage capacitor, will usually draw current from the AC power line only near the peak of the AC voltage waveform. This leads to what is known as "low power factor" and "high total harmonic distortion." Low power factor and high harmonic distortion are not serious issues for many consumer applications, but would create problems in commercial and industrial applications. Low power factor is also undesirable in consumer applications if the ballast is to be used on a circuit controlled by a TRIAC-based incandescent lamp dimmer.

The TRIACs used in conventional lamp dimmers expect the lamp load to draw current during all parts of the power line cycle. This current is used by the dimmer to charge the TRIAC firing circuits at the start of the each power line half-cycle, and to maintain the TRIAC in the "on" state until the voltage drops to zero before changing polarity every half-cycle. A conventional low power factor circuit draws current only during a small part of the power line cycle; the part of the cycle when the power line voltage is near its peak value. TRIAC-based dimmers therefore do not work properly when driving ordinary low power factor ballasts.

Ballasts can be modified in at least the following five ways to make them compatible with TRIAC-based dimmers:

In embodiments, a special "active power factor correction" circuit can be added to the ballast. This is typically a separate power conversion stage such as a buck or boost converter that is designed to draw current from the AC power line over essentially the full AC cycle. The current drawn generally has a sinusoidal wave shape.

In embodiments, a "charge pump" circuit can be used to feed some of the energy from the output of the ballast back to the input, and use this energy to draw small amounts of current from the AC power line at the frequency of the high frequency inverter. Charge pump circuits can create a sinusoidal input current, like that produced by an active power factor correction stage, or they can draw smaller currents that are not high enough to create a sinusoidal current input but are still high enough to provide TRIAC trigger and holding current.

In embodiments, the single energy storage capacitor may be replaced with two or more energy storage capacitors connected in such a way that they charge in series but discharge in parallel. These so-called "passive valley fill" circuits will draw current over a greater portion of the AC cycle than a single power line frequency energy storage capacitor, leading to improved power factor and lower total harmonic distortion.

In embodiments, the energy storage capacitor can be removed completely, or separated from the output of the full wave bridge rectifier, so that the circuit naturally draws power over most of the AC cycle. This type of circuit may benefit from the addition of an auxiliary power supply that can provide enough power keep the lamp operating when the power line voltage drops to a low value as it changes polarity twice each cycle.

In embodiments, an impedance element, such as a resistor or capacitor can be connected to the output of the full wave bridge so that some current is drawn from the AC power line over the full AC cycle, even when the remainder of the ballast is using power stored in the energy storage capacitor and not drawing current from the AC power line. Further, the impedance element can be switched in and out of the circuit at a frequency higher than the power line frequency, or have its value adjusted by a control circuit so as to provide the required current load, while minimizing power loss.

In embodiments, a dimming device load control facility may enable the induction RF fluorescent lamp to provide for electrical loads required for the proper operation of an external control dimming device, the dimming device load control facility controlling an electrical load or impedance element that may be switched in and out of connectivity within the electronic ballast to provide a load for the external dimming device. The electrical load or impedance element is switched out of the circuit during on-time intervals of the external dimming device and switched into the circuit during off-time intervals of the external dimming device.

The dimming device load control facility may comprise processor-based management and control facilities, such as with a microcontroller, a digital processor, embedded processor, microprocessor, digital logic, and the like. The methods and systems described herein may be deployed in part or in whole through a machine that executes computer software, program codes, and/or instructions on a processor, and implemented as a method on the machine, as a system or apparatus as part of or in relation to the machine, or as a computer program product embodied in a computer readable medium executing on one or more of the machines. The processor may be at least in part implemented in conjunction with or in communication with a server, client, network infrastructure (e.g. the Internet), mobile computing platform, stationary computing platform, cellular network infrastructure and associated mobile devices (e.g. cellular phone), or other computing platform. The integrated circuit electronics may comprise a single package with a combination of analog and digital integrated control circuits.

The microcontroller or the like may determine the operational state of the induction RF lamp, running, start-up, or off, by monitoring operational characteristics of the induction RF lamp including transformer voltage, coupler voltage, coupler current, and the like. Transformations may be done on the collected operational characteristics and they may be compared against set parameters, previously stored values of the operational characteristics, ratios of current to previous values and the like.

In embodiments, the dimming device load control facility may detect the presence of an external dimming control device and switch in a load. In embodiments, the dimming device load control facility may detect the type of external dimming control device such as leading-edge type, trailing-edge type, smart type, and the like, and automatically adjust the control of the switched electrical load based on the detected device type. Control adjustments may comprise where in the AC power cycle the induction load is switched in and out of the electrical circuit. The switching of electrical load based on the detected external dimming control device type may be optimized to improve induction RF lamp performance such as reducing flicker in the lamp, reducing power consumption and noise and the like.

Burner

The burner is constructed of a transparent or translucent vitreous material formed in the shape of the desired light-emitting element. For the type of induction lamp described herein, an open cylindrical cavity, often referred to as a reentrant cavity, penetrates one side of the outer jacket of the burner. The inner surface of the burner and the surface on the partial vacuum side of the reentrant cavity are typically coated with at least one material, called 'phosphor' in the lamp industry, that converts ultraviolet energy into visible light. The coating may Aluminum Oxide, $Al_2O_3$, phosphor, mixed Aluminum Oxide, $Al_2O_3$ and phosphor, and the like. The partial vacuum surface of the reentrant cavity may first be coated with a reflective material, such as magnesium oxide (MgO) or the like, before the phosphor is applied. Such reflective material reduces the amount of light lost to the air side of the reentrant cavity and thus increases the burner efficacy.

The partial vacuum surfaces of the burner may be optionally coated with an initial thin, transparent or translucent barrier layer, commonly Alon (fine particulate Aluminum Oxide, $Al_2O_3$), or "pre-coat" which may reduce chemical interactions between the phosphor and the glass, the mercury (Hg) and the glass, and may help adhesion of the phosphor to the glass. The burner is evacuated and then filled with a rare gas, such as Neon, Argon or Krypton generally at a pressure of 13 Pascal to 250 Pascal. The outer bulb and reentrant cavity are generally made from glass, such as soda lime glass or borosilicate glass.

The performance of the burner is a function of the dimensions of the outer bulb used to form the burner, the dimensions of the reentrant cavity, the type of rare gas fill, the pressure of the rare gas fill, the pressure of the mercury vapor (which, as is described below, is a function of the amalgam composition and the amalgam temperature), the quality of the phosphor, the thickness and particle size of the phosphor coating, the process used to burn the binder out of the phosphor, and the quality of the exhaust process.

In addition to the rare gas described above, a small amount of mercury is added to the burner before it is sealed. Often times, in order to extend the ambient temperature range of operation of an induction lamp, a mercury amalgam is used instead of pure mercury. While this allows the lamp to operate at elevated ambient temperatures (for example in hot fixtures), at room temperatures or lower ambient temperatures it may take a longer time to obtain the full light output due to the very low mercury pressure before the lamp warms up to operating temperature. This is referred to as 'run-up time', and a long run-up time (e.g., 30 seconds or longer) is not desired, especially in residential applications. The mercury is commonly combined with other metals, such as bismuth, tin, indium or lead to form an amalgam. For example the main amalgam composition may range from 10% by weight of indium to 98% by weight of indium. The composition of the primary mercury amalgam will influence the mercury vapor pressure during steady state operation; therefore, the choice of composition of mercury amalgam may be influenced by a desire to optimize the mercury vapor pressure and corresponding light output at the steady state operating temperatures of the burner The mercury or mercury amalgam is typically placed in at least two locations in the burner. For instance, a 'main' amalgam may be placed in the sealed end of the exhaust tube. A second amalgam may be placed in bulbous envelope such as on top of the re-entrant cavity, at the base of the bulb or the like. Either of the main and secondary amalgams, or both, may be encapsulated in glass or other material during the preparation and evacuation of the burner cavity to minimize the loss of mercury during manufacturing. The encapsulation may be breached using a laser, mechanical perforation, radio-frequency heating system or other device after the burner cavity has been sealed enabling mercury vaporized during subsequent heating to diffuse into the burner cavity.

Flag

In embodiments, one or more flags, comprising a material with which mercury may create an amalgam, are positioned in the main part of the burner cavity. After an initial run-time, the burner is turned off and some of the mercury vapor released into the burner cavity during operation will settle on the inside surfaces of the burner cavity, migrate back to a main or secondary initial amalgam, settle on one or more flags and the like. The vapor that condenses on the one or more flags may create an amalgam, while the remaining mercury in the burner will either migrate back to a main or secondary amalgam or eventually find its way to one or more flags, further enriching the flag amalgam with mercury. The mercury in the flag amalgam may be released more quickly during subsequent lamp starts than the mercury in the main amalgam, thereby shortening the run-up time considerably. The discharge created by the induced electric field will ideally heat the flag, releasing the amalgamated mercury on the flag before the temperature of the main amalgam, located below the power coupler, or a secondary amalgam located above the coupler is sufficiently heated to vaporize the mercury at that location.

Figure 22A:
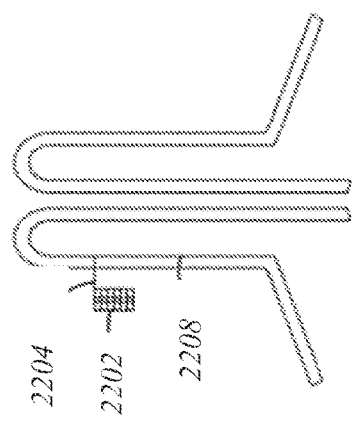
FIG. 22A shows a method of attaching the flag.
Figure 22B:
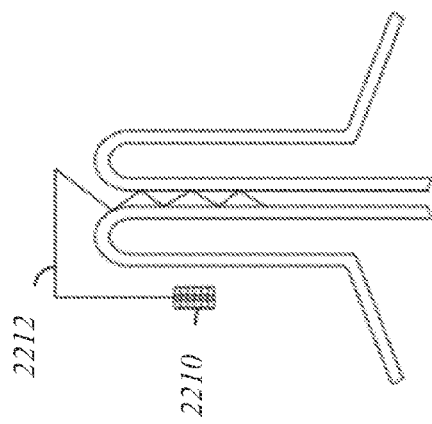
FIG. 22B shows a method of attaching the flag.

In embodiments, the flag may be attached to the bulb in several different ways, such as shown in FIGS. 22A and 22B. FIG. 22A shows a flag 2202 with a pin 2204 that is embedded into the cavity wall 2208. FIG. 22B shows a flag 2210 with a pin 2212 that is mechanically placed in the lamp without the need for an additional seal.

However, placement of the flag in the main part of the burner cavity alone still may not provide satisfactory performance for residential applications, where consumer studies have indicated that the end user typically requires at least 70-80% of the final light output in less than one second. This can be described as a relative light output (RLO) of 70-80%. The present disclosure describes a new flag design, with size, configuration, and materials combination so as to yield a significantly shorter time frame with respect to a goal of a 70-80% RLO (as compared to the final steady state value). In embodiments, the flag configuration may comprise the number of flags, radial distance of the flag or flags from the surface of the reentrant cavity, vertical position of the flag or flags along the length of the reentrant cavity, orientation of the flag or flags relative to the reentrant cavity, the length, width and thickness of the flag, the material used to fabricate the flag, the shape of the reentrant cavity, and the like. The flag configuration may be optimized to provide short run-up time while maintaining high efficiency during steady state operation.

In embodiments, the induction lamp described herein may provide for a rapid build-up of luminosity during the starting of the lamp. The flag may be positioned within the lamp envelope so as to maximize lamp maintenance. The flag may be positioned inside the lamp envelope so as to enable a minimum cost and practical placement for manufacturing of the lamp with high-speed equipment. The induction lamp described herein may provide for a very large number of multiple lamp starts, such as many tens of thousands, without suffering poor maintenance or drop in RLO at a specific time after start.

Figure 22C:
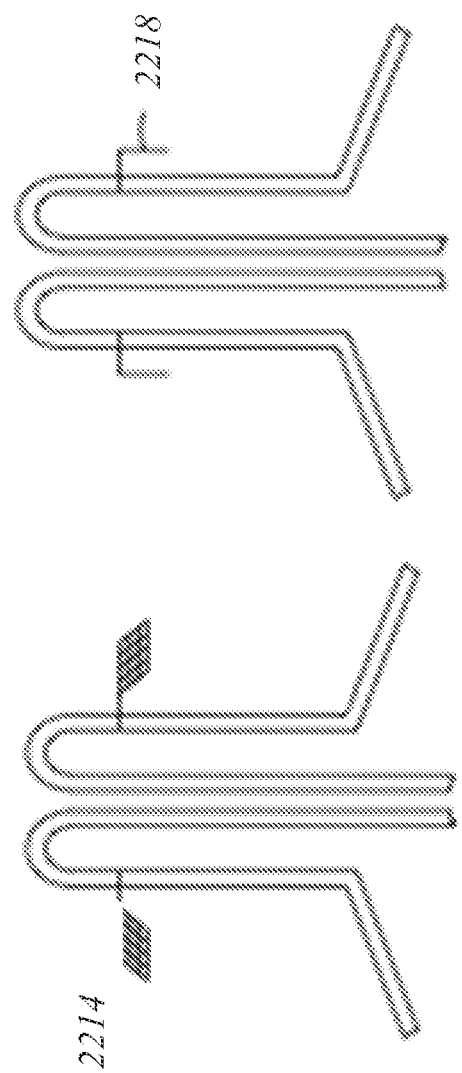
FIG. 22C shows two flag orientations.

The induction power coupler creates a time-varying magnetic field that, in turn, creates a first time-varying electric field within the burner envelope. The time-varying magnetic field is aligned parallel to the cavity axis and the first component of the time-varying electric field is aligned perpendicular to the time-varying magnetic field and encircles that field. Electrical breakdown of the burner gas occurs in the presence of the established electric field and a time varying current is established in the direction of the electric field. Within this field may be placed a first metallic object, flag, which is substantially flat along a plane and having a normal perpendicular to the plane. The orientation of the flag relative to the cavity axis, and thus the flag's orientation relative to the time-varying electric field and current, determines the effective surface area of the flag perpendicular to the time-varying induced electric field. The flag may be positioned so the normal of the surface of the flag is directed radially, toward the coupler (or "parallel" to the cavity axis). In this position, the normal of the surface of the flag is oriented at an angle of 0 degrees relative to the normal of the surface of the re-entrant cavity. Alternately the flag may be positioned so that the normal of the surface of the flag is directed in the azimuthal direction (or "perpendicular" to the re-entrant cavity axis). In this position, the normal of the surface of the flag is oriented at an angle of 90 degrees relative to the normal of the surface of the re-entrant cavity. In other embodiments, the flag may be oriented at some angle between these orientations. FIG. 22C shows these two different orientations for placing the flag with respect to the axis of the cavity, with the flag 2214 mounted "perpendicular" to the vertical axis of the cavity with the normal of the surface of the flag oriented at an angle of 90 degrees relative to the normal of the surface of the re-entrant cavity and the flag 2218 mounted "parallel" to the cavity axis (wherein the structure of the flag 2218 is not seen in the view because the normal of the flag is in the plane of the drawing sheet). The flag 2218 is mounted such that the normal of the surface of the flag is oriented at an angle of 0 degrees relative to the normal of the surface of the re-entrant cavity. Note also that the illustrated representation of the structure of the flags 2214 2218 are one of a plurality of possible structural configurations, and are not meant to be limiting in any way.

In preferred embodiments, the flag is oriented such that the angle of the normal of the surface of the flag relative to the normal of the surface of the re-entrant cavity approaches 90 degrees. In embodiments, the flag 2214, with its "perpendicular" orientation to the cavity axis and larger surface area perpendicular to the time-varying electric field, may enable increased interaction with the current driven by the time-varying induced electric field. This in turn may facilitate faster heating of the flag element and faster introduction of mercury vapor into the burner envelope, thus reducing warm-up time.

Figure 22D:
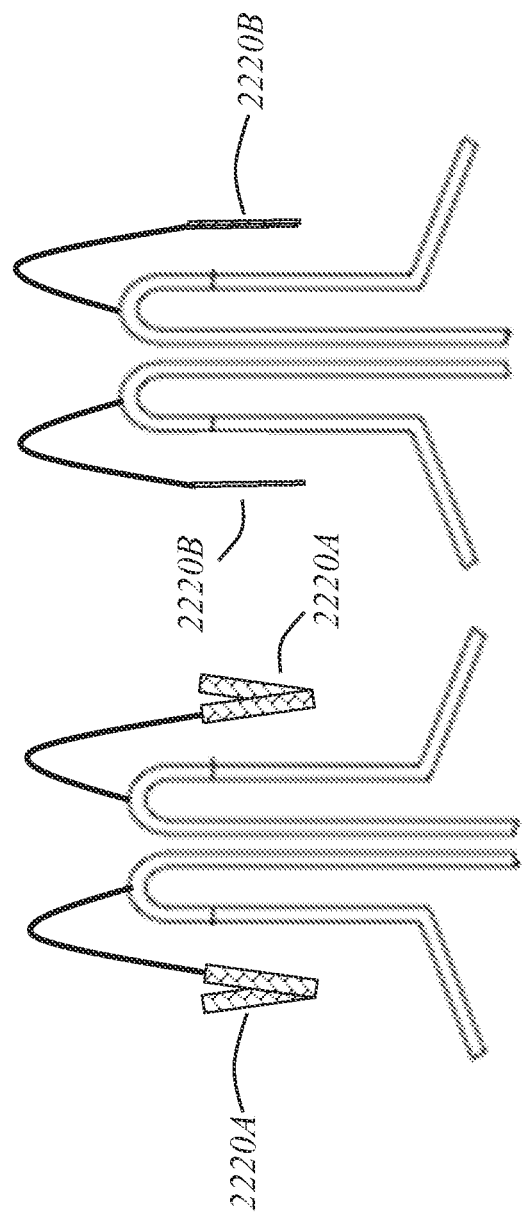
FIG. 22D shows a folded flag in two different orientations.

In some embodiments the first flag 2220 material may be a solid piece of metal. In other embodiments, a metal mesh may be used for the first flag 2220 to provide multiple sharp edges that may act as field enhancement points. In embodiments, a mesh material may also be used in place of a solid material to reduce the mass of the first flag 2220, which may lead to more rapid warm-up. The mesh may comprise a cut metal that has been expanded, woven wires, punched metal and the like. The metal of flag, mesh or solid, may comprise steel, stainless steel, nickel, titanium, molybdenum, tantalum and the like. The metal of the first flag 2220 may be plated with Indium or the like to facilitate the formation of an amalgam with the mercury. The first flag 2220 may be substantially flat along a plane. In embodiments, the surface area of the flag with respect to the time-varying electric field may be increased by folding the flag material into two or more sections, such as aligned parallel to one another in close proximity or constrained along the plane. An example of this is shown in FIG. 22D. Folded flag 2220A is positioned with a perpendicular orientation to the cavity axis and, in contrast, folded flag 2220B is positioned with a parallel orientation to the cavity axis.

Figure 23:
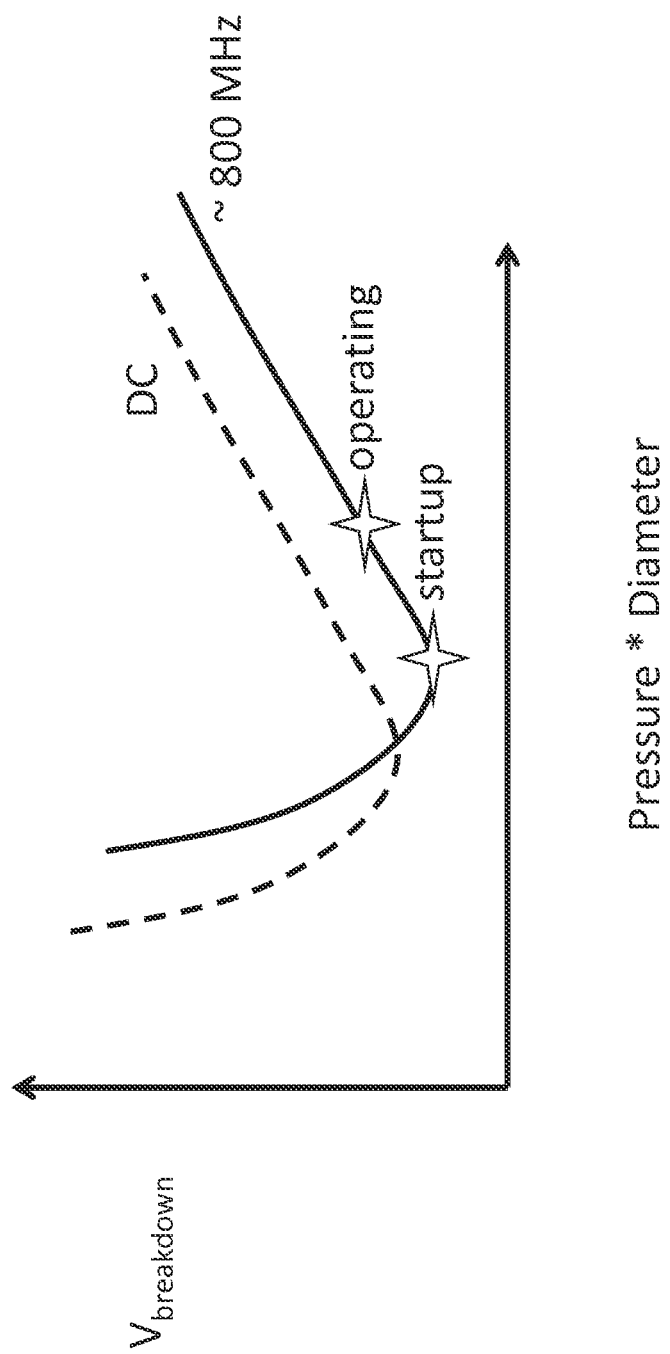
FIG. 23 shows a Paschen-like curve.

In embodiments, the one or more first flags 2220 may be positioned between 0 and 12 mm radially outward from the surface of the re-entrant cavity and between the re-entrant cavity and the outer wall of the envelope. In preferred embodiments the one or more first flags 2220 may be positioned between 2 and 5 mm from the re-entrant cavity and between the re-entrant cavity and the outer wall of the envelope. The position of the flag within the main part of the burner cavity affects the energy being absorbed by the flag structure. For instance, the magnitude of the time-varying electric field falls off with distance from the axis of the coupler. The distance of the flag to the coupler also correlates to breakdown voltage. The relationship of breakdown voltage to the product of gas pressure and distance between the electrodes appears to be similar to a Paschen-like curve, an example of which is shown in FIG. 23. At a single pressure, a Paschen-like curve describing breakdown voltage is a function of distance alone for a mono-component gas, such as a rare gas. At a single distance, the Paschen-like curve describing breakdown voltage is a function of pressure alone. When both the distance and pressure are changed, a Paschen-like curve describing breakdown voltage is a function of the product of the distance and the pressure. It may be desirable to co-optimize the distance of the flag from the coupler together with the pressure within the burner envelope in such a way that the breakdown voltage is low at both start-up, when the gas in the burner is predominantly rare gas, and during steady state operation, when the pressure within the burner is slightly higher and due to the small admixture of mercury vapor pressure. In general, the shape of the Paschen-like curve remains similar as mercury is added to the rare gas filling, but the magnitude of breakdown voltage is lowered and the minimum shifts to a different value of the product of gas pressure and distance.

If the rare gas used is Argon, the starting voltage will be much lower due to the well known Penning effect, in which the ionization of the mercury is greatly enhanced by collisions with Argon metastable atoms. The Penning effect will dominate in many Mercury-Argon discharges and may be the main driver for flag placement in burners with Mercury and Argon, where it may be preferable to place the flag in the center of the burner space, such as mid-way between the reentrant cavity and the outer wall of the bulb.

In a preferred embodiment where the rare gas is a mix of mercury and krypton, the breakdown voltage may approach a minimum at an optimum product of distance and gas pressure. As the product of flag location (distance from the re-entrant cavity) and gas pressure goes below optimum, voltage needed to initiate the arc in the plasma increases dramatically. Alternately, as the product of radial distance of the flag from the coupler and gas pressure increases beyond the optimum, the voltage required to initiate the arc in the plasma beings to increase slowly. At room temperature start-up, the mercury pressure inside the burner cavity will be lower than at steady-state operation. The pressure inside the burner cavity begins to rise as the mercury amalgam on the flag is heated and mercury released. Subsequently, the amalgam positioned below the coupler may be heated and additional mercury vapor released into the burner cavity. At the lower initial pressure, it may be desirable to position the flag at an increased distance from the coupler to achieve a low breakdown voltage near a Paschen-like minimum. However, a flag located at the greater distance from the power coupler may have reduced interaction with the time-varying current, leading to slow heating of the flag and the release of the mercury from the flag amalgam which would translate into a slower warm-up. It is therefore advantageous to consider the inclusion of multiple flags, each of which is tasked with a definite purpose.

Figure 22E:
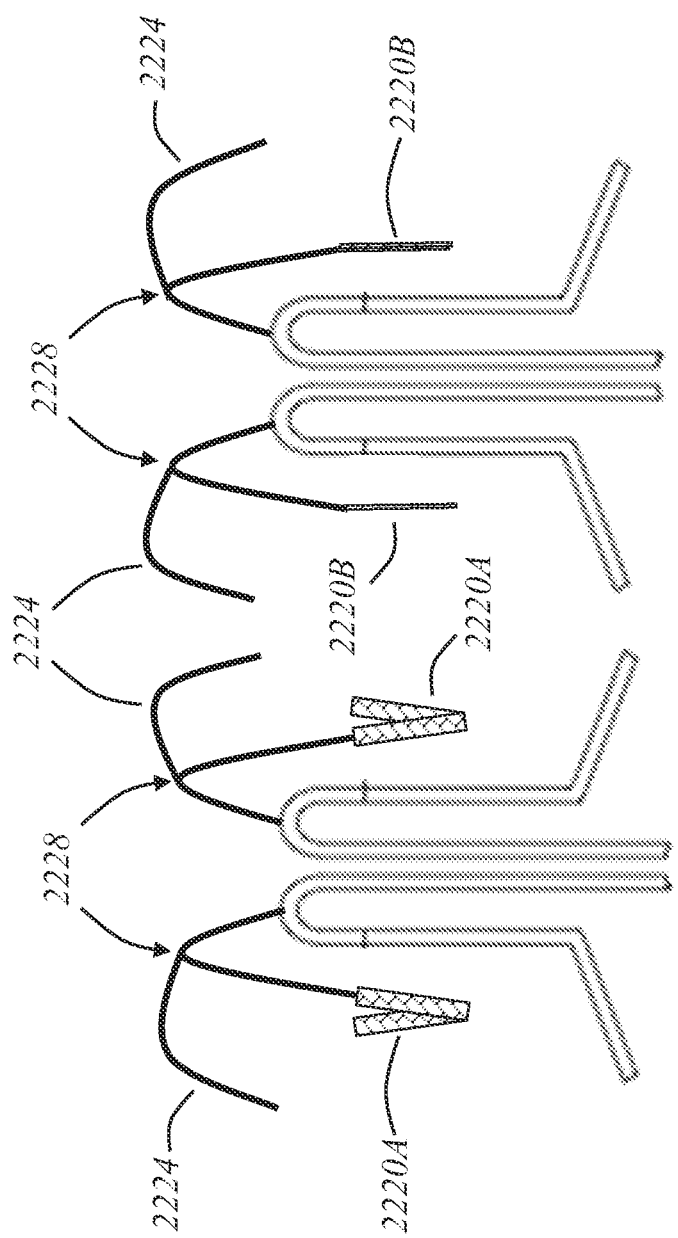
FIG. 22E shows a folded flag and a starting in aid in two different orientations.

Positioning one or more flags at various radial distances from the centerline of the cavity axis enables different flag-field interactions. In one embodiment, illustrated in FIG. 22E, one or more flags are positioned within the burner cavity. A set of one or more first flags 2220A, 2220B may be positioned in proximity to the coupler such that interaction with the electric field driven current is facilitated and release of mercury from the amalgam contained in this flag is optimized. Positioning this set of one or more first flags 2220, in this illustration the folded flag 2220A or 2220B, closer to the coupler may increase the amount of heating by a combination of the electric field and the discharge due to positioning it close to the radial current maximum, which may result in more rapid heating of the flag and release of mercury into the re-entrant cavity One or more starting aid flags 2224 may be located at a distance from the centerline of the cavity axis to facilitate optimization of the product of pressure and distance at the reduced pressure that may be present at lamp start-up. For instance, this starting aid flag 2224 may be used to facilitate the initiation of the plasma by being positioned such that the breakdown voltage for the working gas mixture described by a Paschen-like curve is reduced relative to the location of the first flag 2214. This starting aid flag 2224 may be positioned between the first flag 2214 and the outer wall of the burner envelope. This starting aid flag 2224 may provide a small, pointed surface area such as a wire, the edge of a foil or sheet, or the like to facilitate electric breakdown of the working gas. This starting aid flag 2224 may be mounted to the surface of the re-entrant cavity. This starting aid flag 2224 may be attached to the mount for another flag 2214 such as with a spot weld 2228 or the like. This starting aid flag 2224 may be comprised of a conductive metal that is not reactive with mercury such as steel, stainless steel, nickel, molybdenum, tantalum or the like. It is preferable that the starting aid flag 2224 not comprise materials suitable for amalgam formation, such as indium and the like. FIG. 22E is meant to be illustrative and is not limiting with respect to the presence, type, position or orientation of the second flag.

In some embodiments the flag material may be a solid piece of metal. In other embodiments, a metal mesh may be used for the flag to provide multiple sharp edges that may act as field enhancement points. When high voltage is applied at starting, the flag charges like one electrode of a capacitor and the field is enhanced by the sharp edges, providing enhanced voltage needed for breakdown. In embodiments, a mesh material may also be used in place of a solid material to reduce the mass of the flag, which may lead to more rapid warm-up. The mesh may comprise a cut metal that has been expanded, woven wires, punched metal and the like. The metal of flag, mesh or solid, may comprise steel, stainless steel, nickel, titanium, molybdenum, tantalum and the like.

Coupler

The coupler generates, the AC magnetic field that provides, through magnetic induction, the electric field that drives the discharge. In addition, the voltage across the coupler is used to start the discharge through capacitive coupling.

The AC magnetic field created by the coupler changes in both intensity and polarity at a high frequency, generally between 50 kHz and 50 GHz. In the preferred embodiment, the coupler is a multi-turn coil of electrically conductive wire that is connected to output of the inverter. The AC current produced by the inverter flows through the coil and creates an AC magnetic field at the frequency of the inverter. The coil can optionally be wound on a "soft" magnetic material such as ferrite or iron powder that is chosen for its beneficial properties at the frequency of the AC current. When a soft magnetic material is used it can be formed in numerous shapes; such as a torus or a rod, or other shapes, depending upon the design of the burner. In the preferred embodiment, the coupler is formed from a coil of copper wire wound on a rod-like ferrite tube. The ferrite is tubular in that it has a hole along the axis to allow passage of the exhaust tube of the burner. For the preferred embodiment, the operating frequency is 1 to 10 MHz.

In another embodiment, the frequency is increased to the 10 MHz to 50 MHz range and the ferrite tube is removed and optionally replaced by a rod or tube made from a material that has a magnetic permeability essentially the same as that of free space, and an electrical conductivity of zero, or close to zero. One type of material that satisfies these conditions is plastic. Couplers wound on rods or tubes that satisfy the stated conditions are called 'air-core couplers' or 'air-core coils'. An air-core coil can also be fabricated without the use of any rod-like or tubular coil form if the wire is sufficiently stiff or if the wire is supported by an external structure. The use of an air-core coil may enable the printing of the coupler windings on the air side of the re-entrant, or removal of the reentrant and placement the air coil directly in the bulb with electrical feedthroughs to the outside, and the like.

The burner is designed to provide a discharge path that encircles the time-varying magnetic field. As is known from Faraday's Law of Induction, a voltage will be induced in any closed path that encircles a time varying magnetic field. That voltage will have the same frequency as the frequency of time-varying magnetic field. This is the voltage that drives the induction-coupled discharge.

The ferrite material is chosen for low power loss at the frequency of the AC current and at the magnetic flux density and temperature where it is designed to operate.

The number of turns on the coupler is chosen to provide a good impedance match for the inverter when connected through the matching network. It is generally desirable to have a coupler composed of at least 5 turns of wire to ensure efficient coupling to the discharge, while it is also desirable to have the turns form a single layer winding on the ferrite, if used, or form a single layer coil if an air core is used. These practical considerations set desirable lower and upper limits on the number of turns of the coil.

Management and Control

In embodiments, the induction lamp may include processor-based management and control facilities, such as with a microcontroller, a digital processor, analog processing, embedded processor, microprocessor, digital logic, and the like, and implemented in an integrated circuit, an application-specific integrated circuit, and the like. The methods and systems described herein may be deployed in part or in whole through a machine that executes computer software, program codes, and/or instructions on a processor, and implemented as a method on the machine, as a system or apparatus as part of or in relation to the machine, or as a computer program product embodied in a computer readable medium executing on one or more of the machines. The processor may be at least in part implemented in conjunction with or in communication with a server, client, network infrastructure (e.g. the Internet, WiFi network, local network of bulb nodes), mobile computing platform, stationary computing platform, cellular network infrastructure and associated mobile devices (e.g. cellular phone), or other computing platform.

Management and control facilities may receive inputs from external switches on the induction lamp, from IR/RF remote control inputs from remote controllers, from a networked interface (e.g. a wireless network interface such as WiFi, wireless LAN, Bluetooth, HomeRF, cellular, mesh, and the like, or wired network interface such as through existing home wiring e.g. IEEE Powerline), and the like. For instance, an embedded controller may receive settings via switches mounted on the lower portion of the induction lamp, such as for color control, lumen output control, power savings modes, dimmer compatibility, and the like. In an example, there may be a switch setting to enable-disable dimming functionality, such as to provide a power savings as the result of disabling a dimming functionality. In another instance, a remote control or networked control interface may be used to control functions of the induction lamp, such as power management, light characteristics settings, dimming control, on-off control, networked control settings, timer functions, and the like. In an example, the induction lamp may be controlled through an RF remote control of the known art where the induction lamp includes an RF receiver interfaced to an embedded processor, where the RF remote controller controls lighting levels, such as on-off and dimming control. In another instance, a first induction lamp may be commanded directly by a remote controller (e.g. RF/IR remote control, networked controller, an embedded controller in conjunction with another networked lamp node with a network of lamps), where the first induction lamp also acts as a repeater by sending the command on to at least one of a plurality of other induction lamps. In an example, a plurality of induction lamps may be controlled with a single remote control command, where induction lamps within range of the remote controller respond to the direct command, and where induction lamps not within direct range of the remote controller (such as because of distance, obstructions, and the like) are commanded by commands being repeated by induction lamps that had received the command (such as by any induction lamp repeating the command when received). In embodiments, the processor-based management and control facilities may provide for a control function, such as associated with the operation of the electronic ballast, comprising at least one of control of a startup condition, control of an operating mode, control of a dimming function, control of a color temperature, control of a user interface, control of a remote control interface, control of a network interface, control of a thermal management function, and the like.

Management and control facilities may include a processor-based algorithm that provides at least partial autonomous management and control from parameters determined internal to the induction lamp, such as for color control, lumen output control, power management, and the like. For instance, lumen output control may be implemented at least in part by a processor-based algorithm where inputs to the processor may include feedback signals from the inverter output, and where inputs from the processor include control signals as an input to the inverter. In this way, the processor-based algorithm may at least in part replace analog feedback functionality, such as to provide greater control of the lumen output through internal algorithms utilizing data table mappings of inverter output current vs. luminous output, and the like. The algorithm may also accept control via commands to the induction lamp, such as from a switch setting, a remote control input, a command received from another induction lamp, and the like.

In embodiments, the processor-based management and control facilities may be sized to facilitate packing the electronic ballast components within a portion of the lamp that does not interfere with illumination produced by the lamp. For instance, the electronic ballast may be packed via a control processor such that the induction RF fluorescent lamp provides exterior dimensions similar to that of an ordinary incandescent bulb, as discussed herein. In an example, the electronic ballast may be contained within a tapering portion of the induction RF fluorescent lamp that tapers from a bulbous vitreous portion to the screw base such that the bulbous vitreous portion, the tapering portion, and the screw base taken together provide exterior dimensions similar to that of an ordinary incandescent bulb (e.g. at least one of a member of an A-series, BR-series, PAR-series bulbs).

Thermal

In embodiments, the induction lamp may manage thermal dissipation within the structure, such as through a dynamic power management facility utilizing a processor-based control algorithm, through a closed-loop thermal control system, through thermal-mechanical structures, and the like. Indicators of thermal dissipation, such as temperature, current, and the like, may be monitored and adjusted to maintain a balance of power dissipated within the induction lamp such as to meet predetermined thermal requirements, including for maximizing the life of components within the induction lamp, maintaining safe levels of power dissipation for components and/or the system, maximizing energy efficiency of the system, adjusting system parameters for changes in the thermal profile of the system over a dimming range, and the like. In an example, power dissipation across a dimming range may create varying power dissipation in the system, and the dynamic power management facility may adjust power being dissipated by the ballast in order to maintain a maximum power requirement. In another example, maximum power dissipation for the system or components of the system may be maintained in order to maintain a life requirement for the system or components, such as for temperature sensitive components.

Electrical and Mechanical Connection

In embodiments, the electrical-mechanical connection of the induction lamp may be standard, such as the standard for incandescent lamps in general lighting, including an Edison screw in candelabra, intermediate, standard or mogul sizes, or double contact bayonet base, or other standards for lamp bases included in ANSI standard C81.67 and IEC standard 60061-1 for common commercial lamps. This mechanical commonality enables the induction lamp to be used as a replacement for incandescent bulbs. The induction lamp may operate at AC mains compatible with any of the global standards, such as 120V 60 Hz, 240V 50 Hz, and the like. In embodiments, the induction lamp may be alterable to be compatible with a plurality of standard AC mains standards, such as through an external switch setting, through an automatic voltage and/or frequency sensing, and the like, where automatic sensing may be enabled through any analog or digital means known to the art.

Dimming: Improved Dimming Circuits

Figure 2:
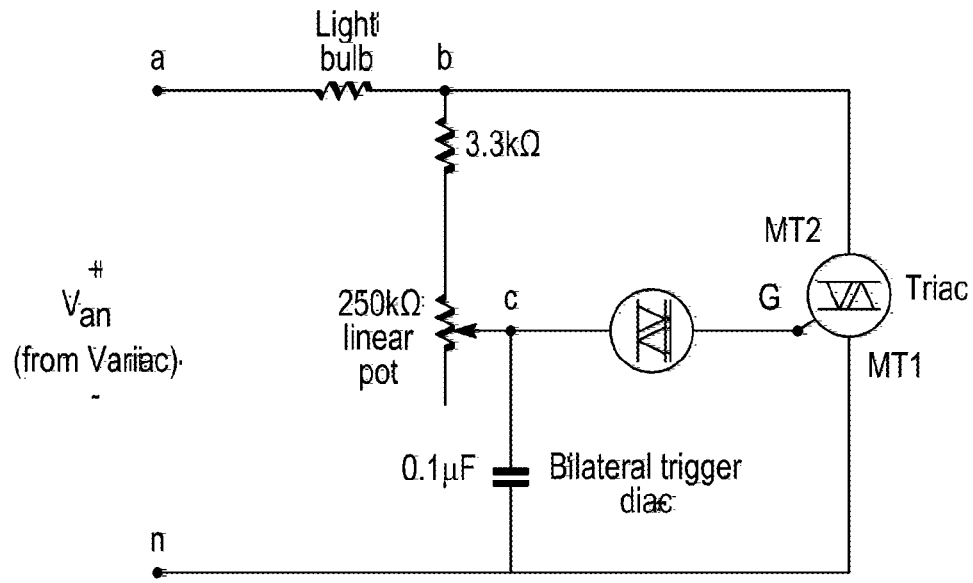
FIG. 2 shows a typical circuit diagram of a TRIAC based dimmer known in the art.

Phase controlled TRIAC dimmers are commonly used for dimming incandescent lamps. A TRIAC is a bidirectional gate controlled switch that may be incorporated in a wall dimmer. A typical dimmer circuit with an incandescent lamp is shown in FIG. 2, where the TRIAC turns "on" every half of the AC period. The turn "on" angle is determined by the position of the dimmer potentiometer and can vary in range from 0 to 180 degrees in the AC period. Typically the lighting dimmer is combined with a wall switch. An incandescent lamp is an ideal load for a TRIAC. It provides a sufficient latching and holding current for a stable turn "on" state. The TRIAC returns to its "off" state when the current drops below a specific "holding" current. This typically occurs slightly before the AC voltage zero crossing. But wall dimmers do not operate properly with most normal single stage ballasts. These ballasts are distinguished by front-end power supplies having a bridge rectifier with an electrolytic storage capacitor and without any additional so-called power factor correction circuits. Since the conduction angle of the bridge rectifier is very short in a conventional ballast that does not have any power factor correction circuitry, neither trigger current nor holding current are provided during the portion of the period when the rectifier is not conducting, and the TRIAC operation becomes unstable, which causes lamp flickering.

Besides holding and trigger currents, the TRIAC should be provided with latching current, that is a sufficient turn "on" current lasting at least 20-30 usec for latching the TRIAC's internal structure in a stable "on" state. A ballast circuit may have an RC series circuit connected across the ballast AC terminals to accommodate the TRIAC. But steady power losses in the resistor could be significant. Other references have similar principles of operation, such as based on drawing high frequency power from the bridge rectifier.

Figure 3:
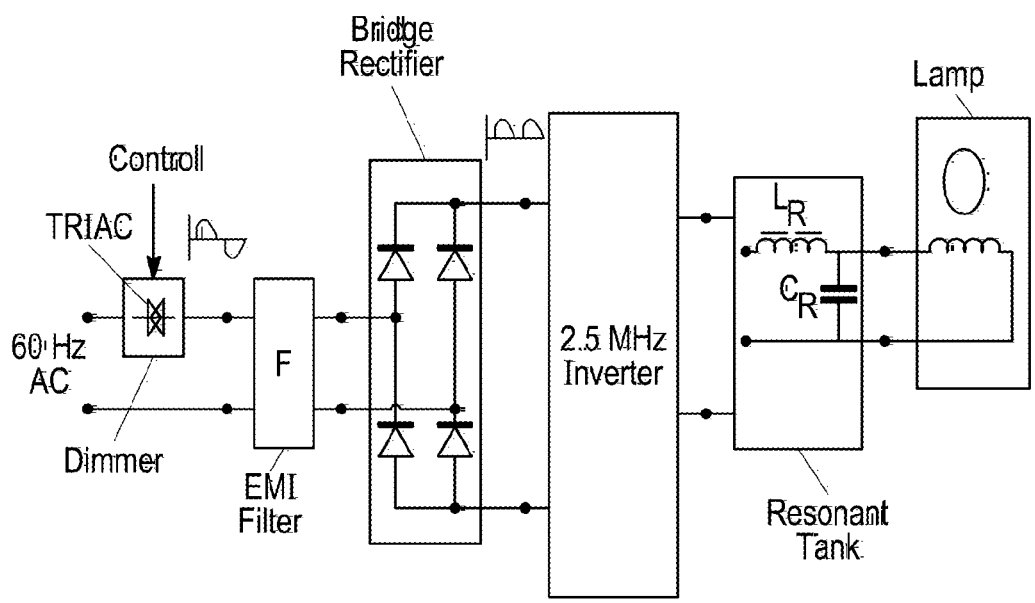
FIG. 3 shows a block diagram of an electronic ballast without an electrolytic smoothing capacitor known in the art.

Other previous work discloses a TRIAC dimmable electrodeless lamp without an electrolytic storage capacitor. In this case the ballast inverter input current is actually a holding current of the TRIAC and is high enough to accommodate any dimmer. The lamp ballast is built as self-oscillating inverter operating at 2.5 MHz. An example block diagram of a dimmable ballast is shown in FIG. 3. It comprises an EMI filter F connected in series with AC terminals, a Bridge Rectifier providing high ripple DC voltage to power a DC-to-AC resonant inverter, and a Resonant Tank loaded preferably by inductively coupled Lamp. The ballast inverter is preferably self-oscillating inverter operating in high frequency range (2.5-3.0 MHz). A TRIAC dimmer is connected in front of the ballast providing phase-cut control of the input AC voltage.

Figure 4:
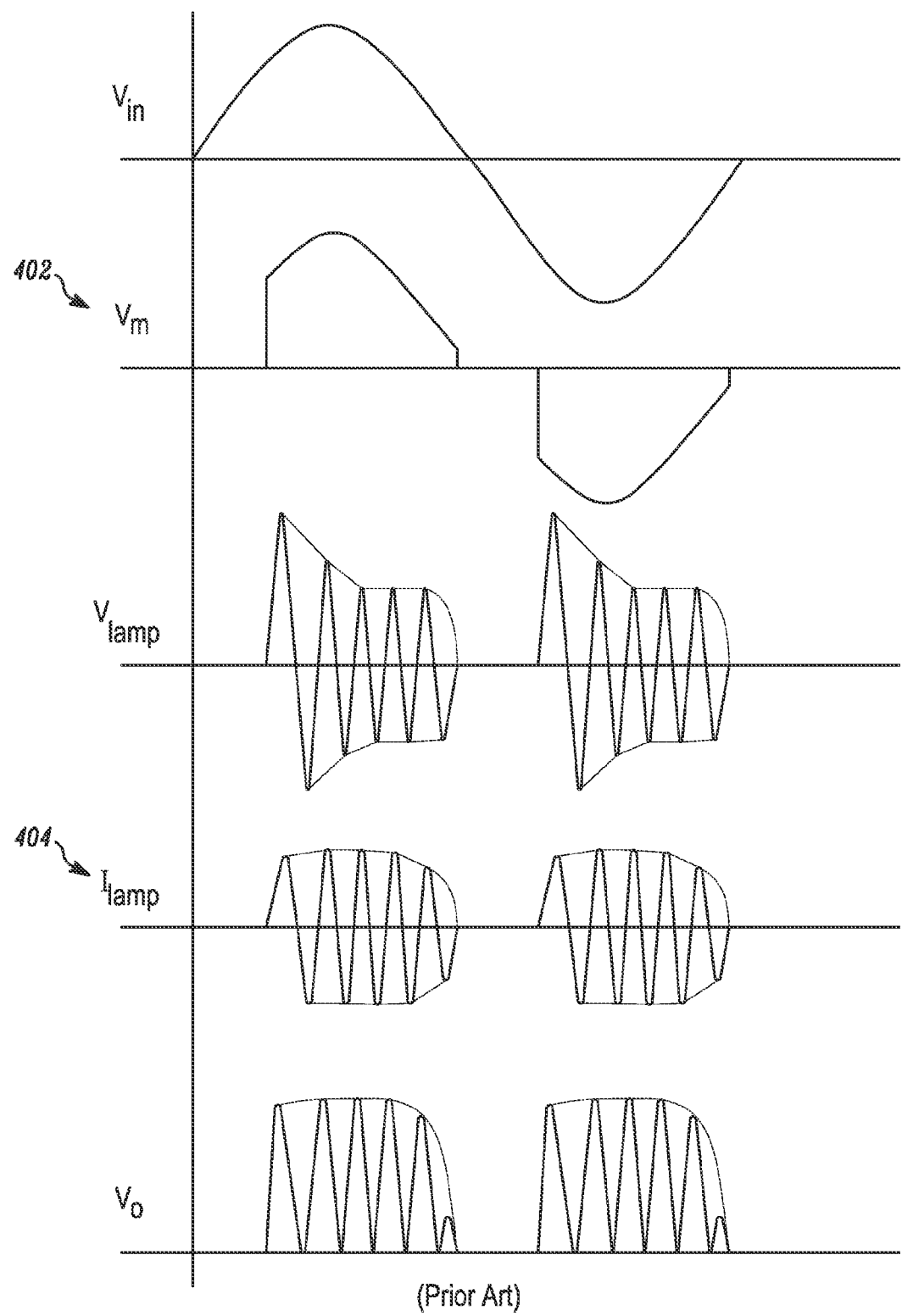
FIG. 4 illustrates dimming operation of the electronic ballast known in the art.

Related art teaches operation from a rectified AC line live voltage that varies from almost zero volts to about 160-170V peak. A self-oscillating inverter may start at some instant DC bus voltage, such as between 80V and 160V, but it will stop oscillating at lower voltage (usually in a range between 20V and 30V). FIG. 4 illustrates a related art dimming method where Vm 402 is a voltage waveform after the TRIAC dimmer. This voltage is rectified and applied to the input of the inverter. Without an electrolytic storage capacitor, the ballast inverter (not shown in FIG. 4) stops its operation during the TRIAC "off" intervals. Accordingly, the electrical discharge in the lamp burner stops and starts, such as illustrated in lamp current $I_{LAMP}$ 404 in FIG. 4.

Other related art discloses a TRIAC dimmed electronic ballast that utilizes a charge pump concept for an inductively coupled lamp. This method requires injecting RF power from the inverter into the full wave bridge rectifier used to convert the 60 Hz AC power into DC power. Accordingly, the 60 Hz bridge rectifier must be constructed using diodes that are rated for the full power line voltage and ballast input current, and are also fast enough to switch at the inverter frequency without excessive power loss.

Therefore, there may be embodiments for operating high frequency electrodeless lamps powered from TRIAC-based dimmers that reduce or eliminate the capacitor(s).

In accordance with an exemplary and non-limiting embodiment, a method for dimming a gas discharge lamp with a TRIAC-based wall dimmer is provided. The method may provide uninterruptible operation of the lamp and the ballast during TRIAC dimming. The method may include powering the ballast without an electrolytic smoothing capacitor, directly from the rectified AC voltage that is chopped by the TRIAC dimmer, and supporting lamp operation during the off time of the TRIAC, such as with a smoothing electrolytic capacitor-less D.C. bus. Implementation of the method may include additional features comprising charging a small low voltage capacitor from the DC bus via a DC-to-DC step down current limiting converter during the TRIAC "on" intervals and discharging this capacitor directly to the DC bus during TRIAC "off" intervals, for maintaining uninterruptable current in the gas discharge lamp.

In another aspect, the invention may feature a DC current charge circuit for charging a low voltage capacitor. In one of disclosure embodiments the charger may be built as charge pump connected to the output of the ballast resonant inverter.

In the other aspect, for dimming of inductively coupled lamps, the invention may feature a secondary series resonant tank for stepping down the DC bus voltage for charging a low voltage capacitor. The secondary resonant tank may be coupled to the switching transistors of the ballast resonant inverter.

Figure 5:
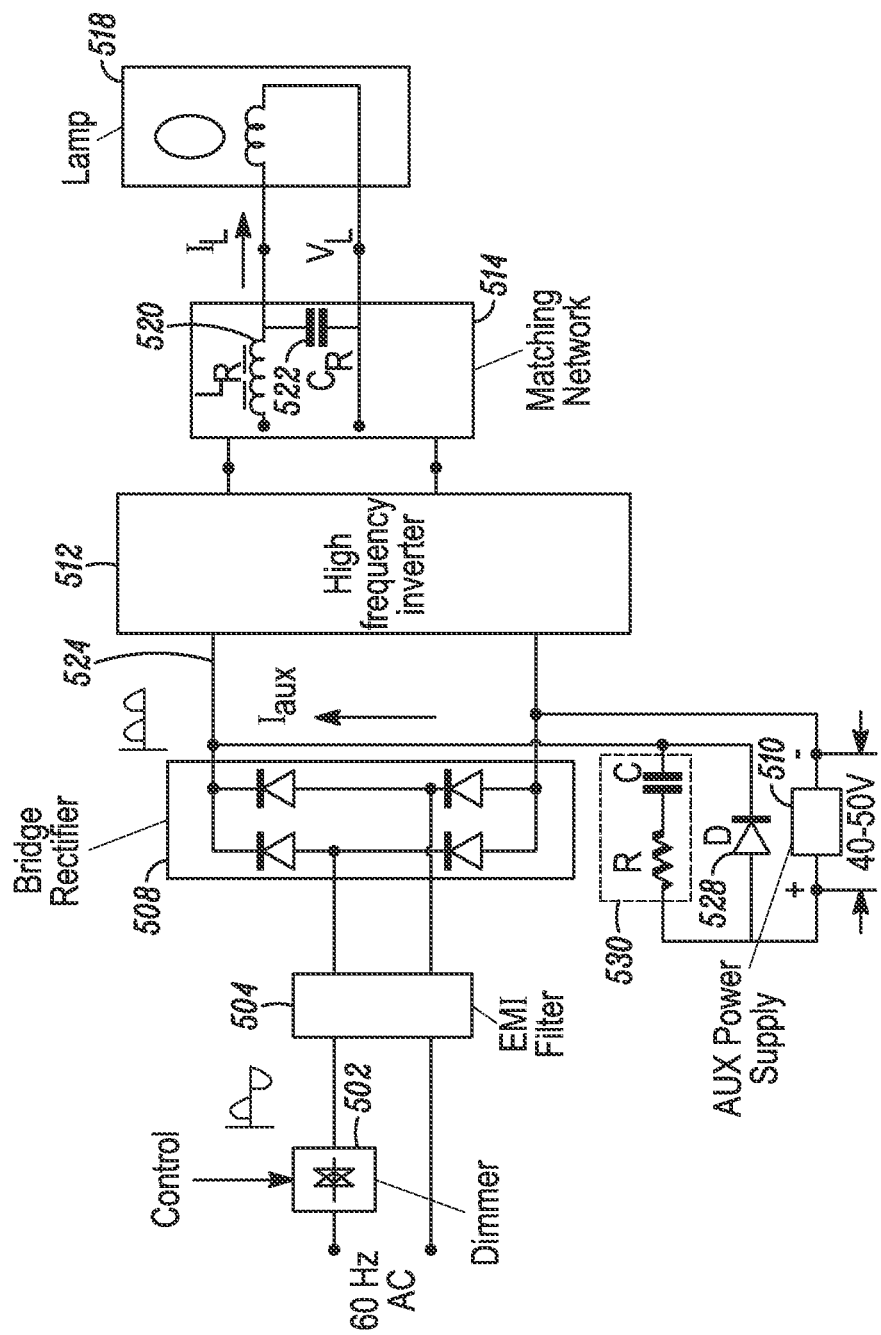
FIG. 5 shows a block diagram of an electronic ballast with a dimming arrangement in accordance with the present invention.

FIG. 5 shows block-circuit diagram of an electronic ballast connected to a TRIAC dimmer 502. The dimmer 502 may be for instance, a wall dimmer aimed for controlling incandescent lamps. The electronic ballast may feature a front-end power supply without a traditional smoothing capacitor, such as with a smoothing electrolytic capacitor-less D.C. bus. It may comprise an EMI filter 504, a Bridge Rectifier 508, a high frequency Inverter 512 (e.g. a 2.5 MHz inverter), and resonant load that includes Matching Network 514 and electrodeless Lamp 518. In accordance with exemplary and non-limiting embodiments, the high frequency inverter may be selected to operate at a very wide frequency range such as tens of KHz to many hundreds of MHz. The Matching Network 514 may utilize a circuit having resonant inductor LR 520 and resonant capacitor CR 522 with the Lamp 518 connected in parallel with the resonant capacitor CR 522. An auxiliary low voltage (40-50V) DC power supply 510 may be connected to the DC bus 524 of the inverter via a backup diode D 528 for filling in rectified voltage valleys. The power supply 510 may be built as a DC-to-DC step down converter powered from the DC bus 524. The auxiliary DC power supply 510 may comprise a small low voltage storage capacitor (which may be electrolytic or tantalum type) for maintaining uninterruptable low power lamp operation during the TRIAC "off" time intervals. The R—C network 530 may be connected across the diode D 528 for providing latching current pulse of very short duration (20-40 usec) to the TRIAC after its triggering. By having a low voltage power supply 510 (40-50V or even lower), a wider dimming range may be achieved.

Figure 6:
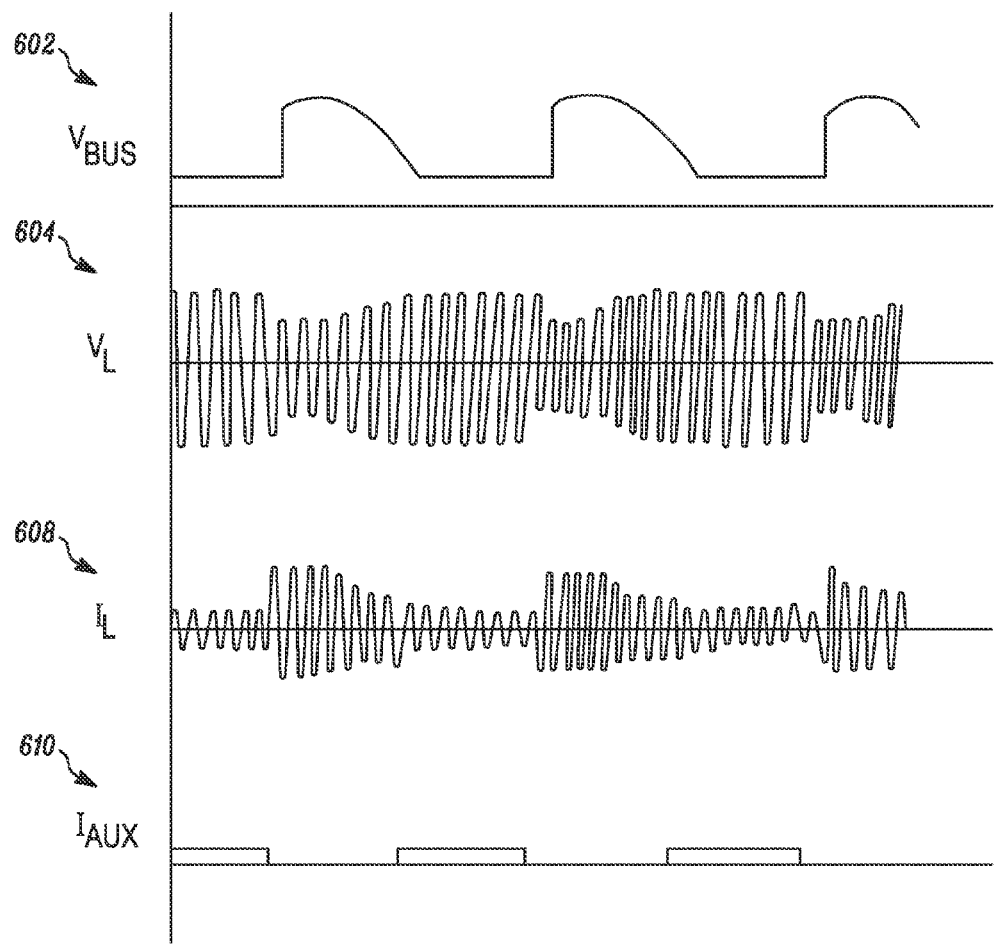
FIG. 6 illustrates the ballast and lamp operation method in accordance with an exemplary embodiment.

In FIG. 6, dimming operation of the lamp and ballast of FIG. 5 is illustrated by showing wave forms of the DC bus voltage $V_{BUS}$ 602, Lamp voltage $V_L$ 604, Lamp current $I_L$ 608, and auxiliary power supply current $I_{AUX}$ 610. In comparison with the prior art method demonstrated in FIG. 3, the lamp current continues during the TRIAC "off" intervals, so that the ballast and the lamp do not need to restart. To keep the Lamp "on" at minimum current only 15-20% of nominal lamp power may be needed. This power may be obtained from an external or internal DC source.

In accordance with exemplary and non-limiting embodiments a method for a dimming gas discharge lamp powered by an electronic ballast with a front-end power supply without an electrolytic smoothing capacitor is provided. Said method may feature uninterruptible lamp operation and comprises steps of charging a low voltage storage capacitor during the TRIAC "on" time intervals and discharging said low voltage storage capacitor to the DC bus during the TRIAC "off" time intervals. Since the low voltage storage capacitor for supporting lamp operation must store only a small amount of energy, its overall size may be substantially less than the size of a storage capacitor in the prior art dimmed ballasts with boosting voltage charge pumps. Since auxiliary voltage $V_{AUX}$ may not exceed 50V, a miniature tantalum capacitor may be used in the ballast.

Figure 7:
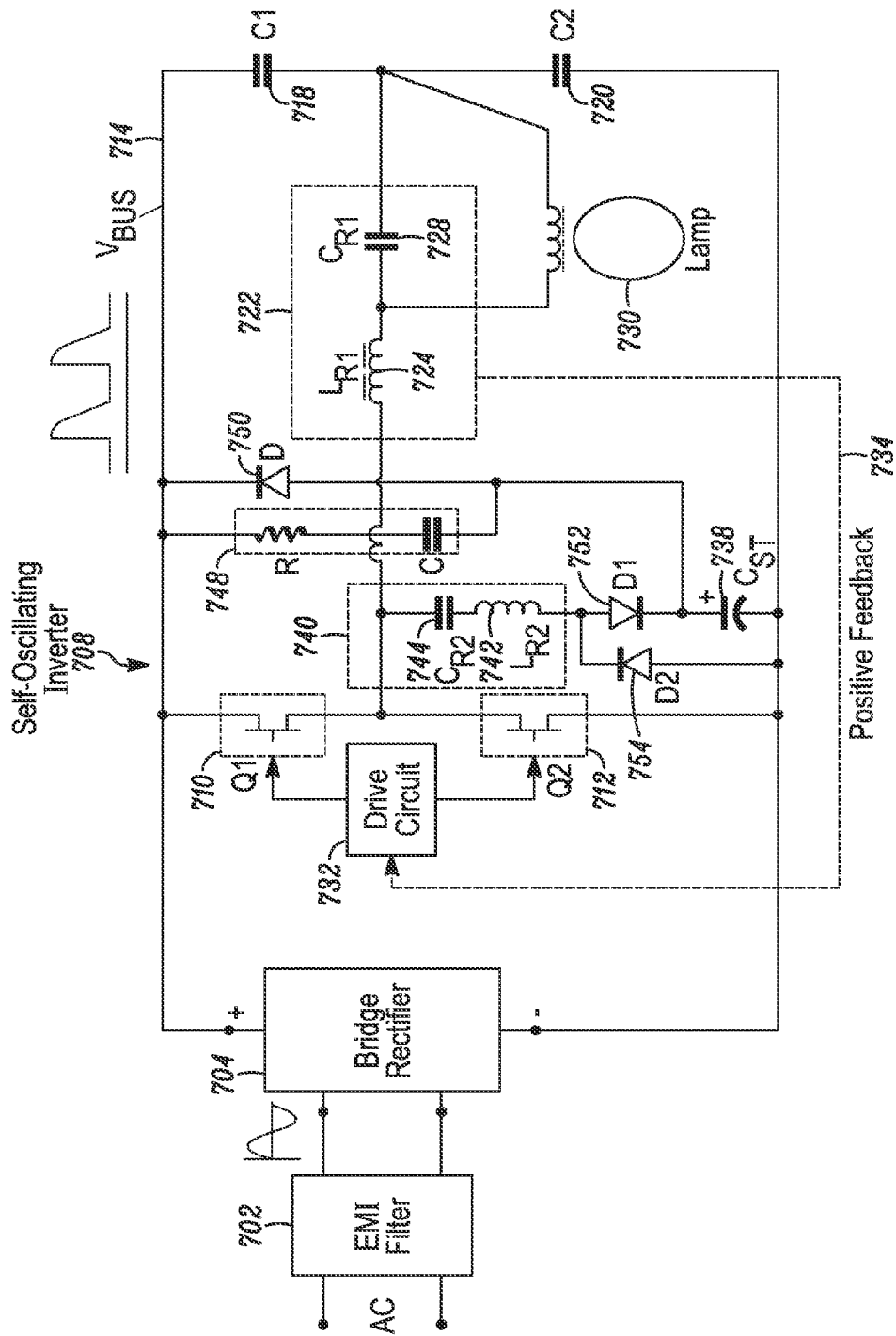
FIG. 7 shows a block-schematic diagram of the TRIAC dimmed ballast according to an exemplary embodiment.

In accordance with exemplary and non-limiting embodiments an electronic ballast is provided without an electrolytic DC bus smoothing capacitor. FIG. 7 illustrates a block-circuit diagram in an embodiment of the disclosure, preferably for RF electronic ballasts. It may comprise a ballast connected to a TRIAC dimmer (not shown). The ballast front-end power supply may comprise an EMI filter 702 and a bridge rectifier 704. There may not be a traditional electrolytic capacitor connected in parallel to the output of the bridge rectifier 704. A self-oscillating inverter 708 may be built with a half bridge topology but other relevant inverter topologies may also be used. The inverter 708 may comprise a pair of series MOSFET switching transistors Q1 710 and Q2 712, connected across DC bus 714, a capacitive divider with capacitors C1 718 and C2 720 across the DC bus 714, parallel loaded matching network 722 having a first series resonant inductor LR1 724 and a first resonant capacitor CR1 728. Inductively coupled Lamp 730 may be connected in parallel to the first resonant capacitor CR1 728. The combination of the matching network and the inductance of the lamp coupler forms a first resonant circuit. Transistors Q1 710 and Q2 712 may be driven by a drive circuit 732 coupled to the inverter 708 via a positive feedback 734 circuit (not shown), for self-excitation of the inverter 708.

In accordance with exemplary and non-limiting embodiments, FIG. 7 shows the auxiliary power supply combined with the inverter power stages, comprising the transistors Q1 710 and Q2 712. The inverter 708 may include a low voltage storage capacitor $C_{ST}$ 738 having a positive terminal connected to DC bus 714 via a backup diode D 750 and a negative terminal connected to DC bus negative terminal. The inverter 708 may also feature a second, series loaded, current limiting resonant tank 740 comprising a second resonant inductor LR2 742 and a second resonant capacitor CR2 744. A secondary high frequency rectifier having diodes D1 752 and D2 754 may be connected in series with the inductor LR2 742 and capacitor CR2 744. Rectified current charges the storage capacitor $C_{ST}$ 738. A ceramic bypass capacitor (not shown) may be connected in parallel to the storage capacitor $C_{ST}$ 738 for RF application. The power of the second resonant circuit may be much less than the first one, so that a tiny Schottky diode array, for instance, BAS70-04 may be used for 752 and 754 in the secondary rectifier circuit. An RC-network 748 may be connected across the diode 750 for conditioning the external TRIAC dimmer. In the ballast of FIG. 7, the storage capacitor $C_{ST}$ 738 may have much less energy storage than a traditional DC bus high voltage capacitor, where its rated voltage may be about 50V. The low voltage storage capacitor $C_{ST}$ 738 may have much smaller dimensions than the traditional high voltage DC bus capacitor in prior art ballasts.

Figure 8:
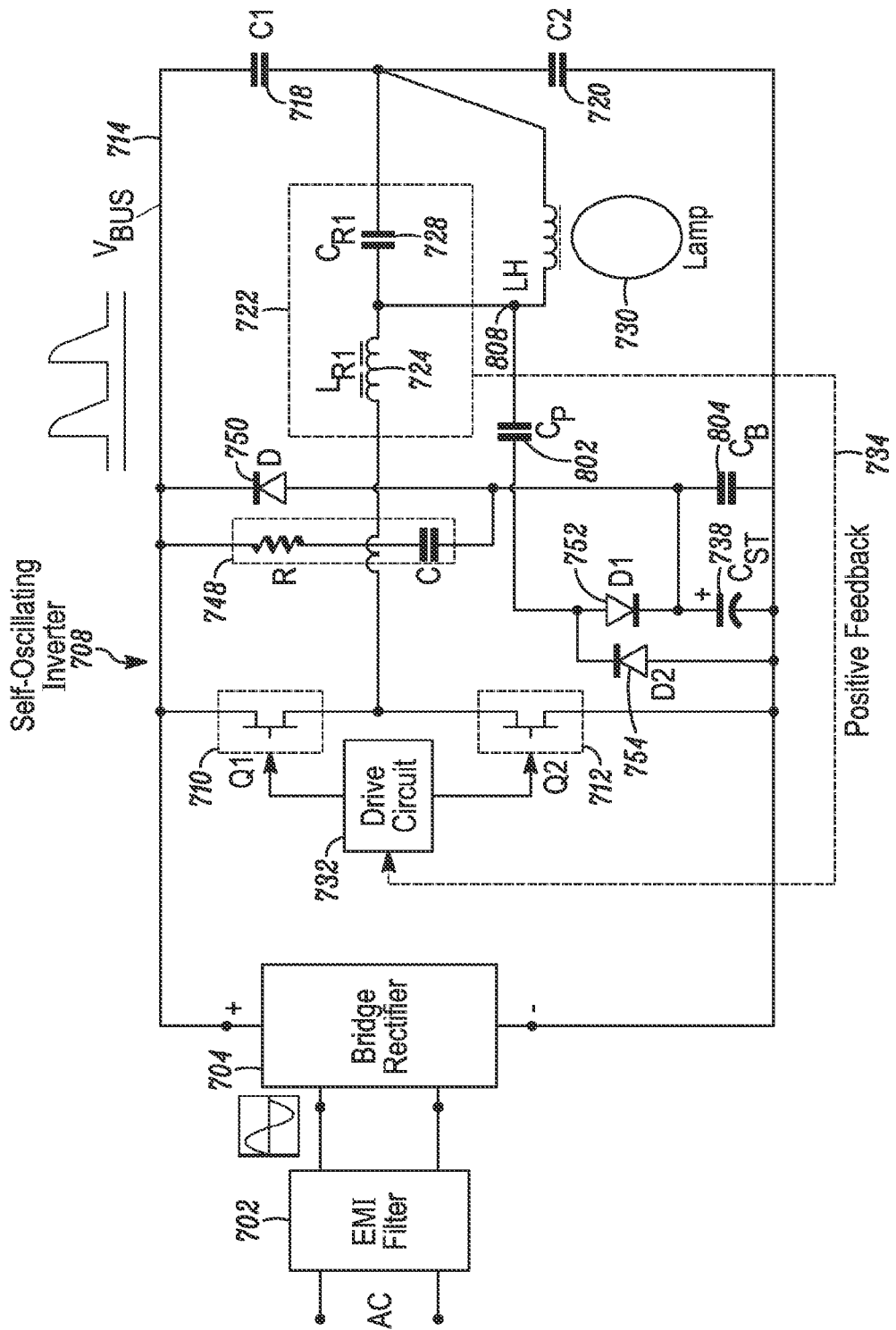
FIG. 8 shows a block-circuit diagram according to an exemplary embodiment.

In accordance with exemplary and non-limiting embodiments, FIG. 8 demonstrates another low cost configuration. This embodiment differs from that presented in FIG. 7 by the way in which the storage capacitor $C_{ST}$ 738 is charged. In the inverter 708 of FIG. 8 $C_{ST}$ 738 is charged by a charge pump from the inverter output. A series capacitor $C_p$ 802 is connected between the inverter high voltage terminal LH 808 and the diode configuration of D1 752 and D2 754. Charge current is determined by value of capacitor $C_p$ 802. A bypass capacitor $C_B$ 804 may be connected across the storage capacitor $C_{ST}$ 738.

Comparatively, the arrangement in FIG. 8 may provide faster low voltage capacitor $C_{ST}$ 738 charging during lamp starting. But it may slow down the starting process of an electrodeless lamp by taking power from the lamp and returning said power to the inverter input. Also, this power feedback may cause system stability problems during steady-state system operation because of the negative incremental impedance of the lamp.

The additional component LR2 742 in FIG. 7 may provide full decoupling from resonant load and the lamp. It may provide reliable starting and high efficiency due to the step down feature of the series load connection. To help guarantee Zero Voltage Switching (ZVS), the second resonant tank should operate in inductive mode, such as when $\omega LR2 > 1/\omega CR2$. In an example, for a 20 W electrodeless lamp operating at 2.75 MHz, the values of secondary resonant circuit components may be the following: LR2=150 uH, CR2=18 pF; Schottky diode array BAS70-04, electrolytic capacitor $C_{ST}$=22 uF, 50V. A bypass capacitor 0.1 uF is connected across the electrolytic capacitor $C_{ST}$.

The lamp may be dimmed because of a variation of the RMS voltage applied to the lamp, with a condition that the minimum required lamp current is sustained. Some minimum DC bus voltage should be provided to ensure continuous ballast and lamp operation. During TRIAC dimming both the TRIAC formed voltage and the DC backup voltage may vary and cause lamp dimming. The lower the minimum backup voltage the wider the dimming range. This minimum voltage depends on many factors determined by the lamp and ballast or combination of both characteristics. For a 2.5 MHz electrodeless lamp the minimum operation voltage for continuation of burning may be about 38-40V at 20° C. ambient temperature.

Figure 9:
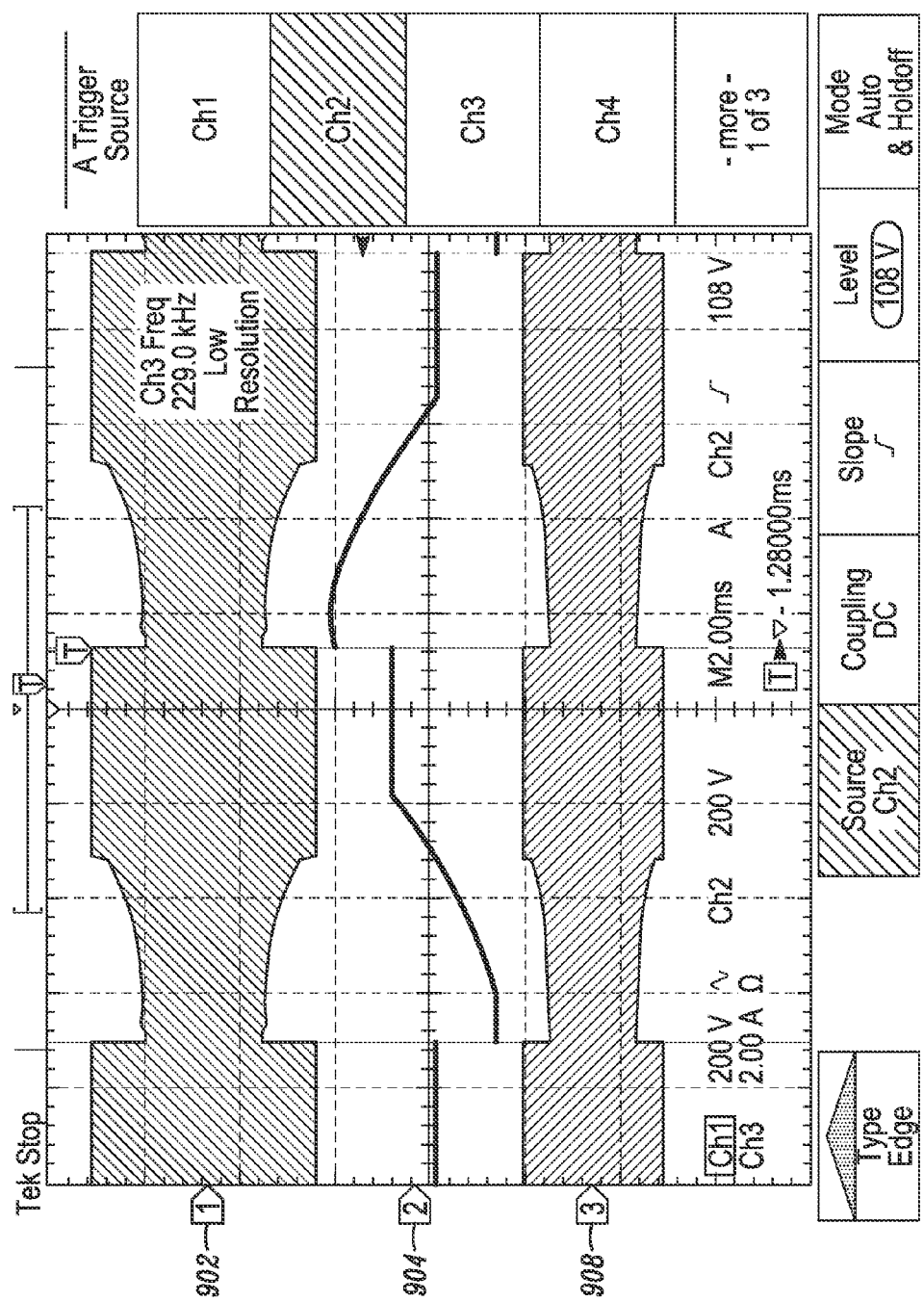
FIG. 9 shows oscillograms of the TRIAC voltage, lamp current and lamp voltage in a dimming mode, according to an exemplary embodiment.

FIG. 9 shows actual oscillograms taken from operation of a 20 W, 2.75 MHz electrodeless lamp using a ballast with the preferred embodiment, when powered with a TRIAC dimmer. Ch2 904 shows the TRIAC dimmer output voltage, Ch1 902 shows lamp voltage, and Ch3 908 shows lamp current. The backup DC voltage is about 45V. As can be seen the lamp and ballast operate continuously with the TRIAC dimmer. In this example, the lamp is dimmed to 60%.

At low bus voltage, lamp voltage (Ch1) is increased, since the gas discharge is characterized by negative impedance. Inductively coupled lamps are distinguished by a significant leakage inductance. That is why lamp voltage increases correspondingly with lamp current (Ch3).

Dimming: Burst Mode Dimming

Burst mode dimming is a method to control the power delivered to the burner, and the light generated by the burner that uses periodic interruptions of the high frequency signal delivered to the coupler from the ballast.

One way to control the power delivered to the burner and hence control the light output of the burner, is to turn the high frequency current delivered by the ballast to the coupler, $I_C$, on and off on a periodic basis at a rate that is much lower than the frequency of the high frequency current itself. That is, if the high frequency current has a frequency of $f_O$ (e.g., in the 1 MHz to 50 MHz region) and the rate of the periodic signal is $f_M$, then $f_M$ would be much lower than $f_O$. In embodiments, $f_M$ may be less than one-tenth of $f_O$ in order to better ensure that the resulting dimming would not produce perceptible flickering.

In embodiments, the dimming signal may be synchronized to the lamp current waveform, so that lamp drive current is always provided in full half-cycles of the lamp operating frequency. This is intended to reduce the generation of RF energy at frequencies other than the lamp operating frequency, since such energy could interfere with RF communication devices operating at frequencies other than the operating frequency of the lamp. Further, the drive current $I_C$ may be a sinusoidal, or near sinusoidal, drive current.

The time duration of each On period and each Off period of $I_C$ will be less than $1/f_M$, and the sum of the time duration of the On period and the time duration of the Off period will equal $1/f_M$. Since $f_M$ is much lower than $f_O$, each On period of $I_C$ will ideally have more than 10 cycles of $I_C$.

In some embodiments it may be desirable that the Off period time of $I_C$ be shorter than the time required for the electron density of the discharge to substantially decrease. For the exemplar induction coupled lamp, this time is believed to be about 1 msec.

In other embodiments it may be desirable that the Off period time of $I_C$ be longer than the time required for the electron density of the discharge to substantially decrease. For the exemplar induction coupled lamp, this time is believed to be about 1 msec.

In some embodiments it may be desirable that $f_M$ be higher than 20 kHz, so that the circuits used to generate this signal do not create audible noise, while in other embodiments it may be desirable that $f_M$ be lower than 20 kHz so that the Off period time duration of $I_C$ can be longer than the time required for the electron density to substantially decrease.

For example, if $f_M$ is set to 25 kHz the Off time will always be less than 0.04 msec. In addition, if $f_M$ is set to 25 kHz, and the On time is set to 1% of the time rate of the modulation frequency, 1/25 kHz, the On time will be 0.4 μsec, and this time period will contain 10 cycles of IC when $f_0$ is 25 MHz. In this manner periodic bursts of current at a frequency of $f_0$ and controllable duration can be applied to the coil that is driving the lamp or discharge.

This power control method may be used to reduce the power delivered to the lamp when less light is required and less power consumption is desired. This is known in the art as dimming.

The dimming function can be controlled by a circuit that senses the firing angle of a TRIAC-based phase cut dimmer installed in the power supply for the lamp, or it may be controlled by a control means mounted on the lamp itself, or by radio waves or by infrared control, or any other suitable means.

The power control method can also be used to provide accurate operation of the lamp without the use of precision components in the high frequency oscillator. The circuit could be designed to produce somewhat more than the rated power of the lamp, and then the burst mode power control could be used to reduce the power to the rated value.

The power control could also be used to provide shorter run-up times for mercury-based lamps. When used in this manner, the circuit providing $I_C$ would be designed to produce 20% to 50% more current than necessary for steady state operation. When the lamp is cold and the mercury vapor pressure is low, the extra current would provide more light and facilitate faster heating of the mercury, which would, in turn, provide a faster rise in mercury vapor pressure from its value at room temperature toward the optimum mercury vapor pressure, which occurs at temperatures higher than 20° C. As the lamp warms up to its normal operating temperature, the power control would reduce the power gradually to its normal value. The lamp would not overheat when operated at higher than normal power to implement this feature because the higher power would be applied only when the lamp is at a temperature lower than its normal operating temperature.

TRIAC Holding and Trigger Current: Pass-Through Current

It is desirable for all types of lighting, especially screw-in light bulbs, to be compatible with TRIAC-based phase cut dimmers due to the low cost and ubiquitous presence of these dimmers in lighting installations. These dimmers are wired in series with the AC line voltage and the lighting load. Accordingly, any current drawn by the dimmer circuit needs to pass through the load. In particular, these dimmers include a timing circuit in which the applied line voltage charges a capacitor through a variable resistor. Each half-cycle of the line frequency, the capacitor is charged up to a threshold voltage at which a semiconductor break-over device (typically a 32 volt DIAC), conducts a pulse of trigger current into the gate terminal of the TRIAC to put the TRIAC into a conductive state.

A resistive load like an incandescent light bulb naturally conducts the current required by the timing circuit for triggering the TRIAC into the on-state. In contrast, electronic circuits, such as used with fluorescent lamps, may not conduct current at low input line voltages. Typically, they include an energy storage capacitor to hold up the supply voltage for the load continuously throughout the line cycle. In the case of a fluorescent ballast, this energy storage capacitor typically supplies an inverter circuit that converts the DC voltage on the storage capacitor to an AC current for powering the fluorescent lamp. When the instantaneous line voltage is low, the rectifier or other circuit that charges the energy storage capacitance will not draw current from the line. Even without an energy storage capacitor, there will be a minimum voltage required for the inverter or other electronic circuit to operate.

In addition to the timing circuit of the dimmer, some dimmers may contain one or more indicator LED's or other electronics that require the load to pass current for proper operation.

A resistor placed across the input of the electronic ballast might draw the required pass-through current prior to the dimmer TRIAC switching to the on-state; however, the full line voltage would be applied to this resistor while the TRIAC is on, therefore dissipating too much power and generating too much heat for this to be a practical solution.

In embodiments, a circuit may be provided with a resistor load that is switched relative to at least one threshold level. For instance, the resistor load may be switched on when the applied line voltage falls below a relatively low threshold, and off when the applied line voltage exceeds the threshold. In this way, a load is presented to the TRIAC to provide the required pass-through current when the voltage is low (e.g., when the ballast is in a state that does not provide a sufficient path for such current), and removes the resistor load when the voltage is high, thus eliminating the power dissipated in the resistor at a time when the resistor is not needed to provide pass-through current. In another instance, there may be multiple threshold levels, such as to provide hysteresis for rising verses falling voltage levels. In embodiments, rather than completely switching out the resistor during the entire time the line voltage is high, the resistor may be switched in and out as a pulsed current load, thus providing a way to modulate the load resistor's effect. For example, the resistor may be switched (e.g., by way of a transistor circuit) at a 100% duty cycle when the line voltage is below the set threshold, and at a reduced duty cycle, such as a 10% duty cycle, when the line voltage is above the set threshold.

Figure 10:
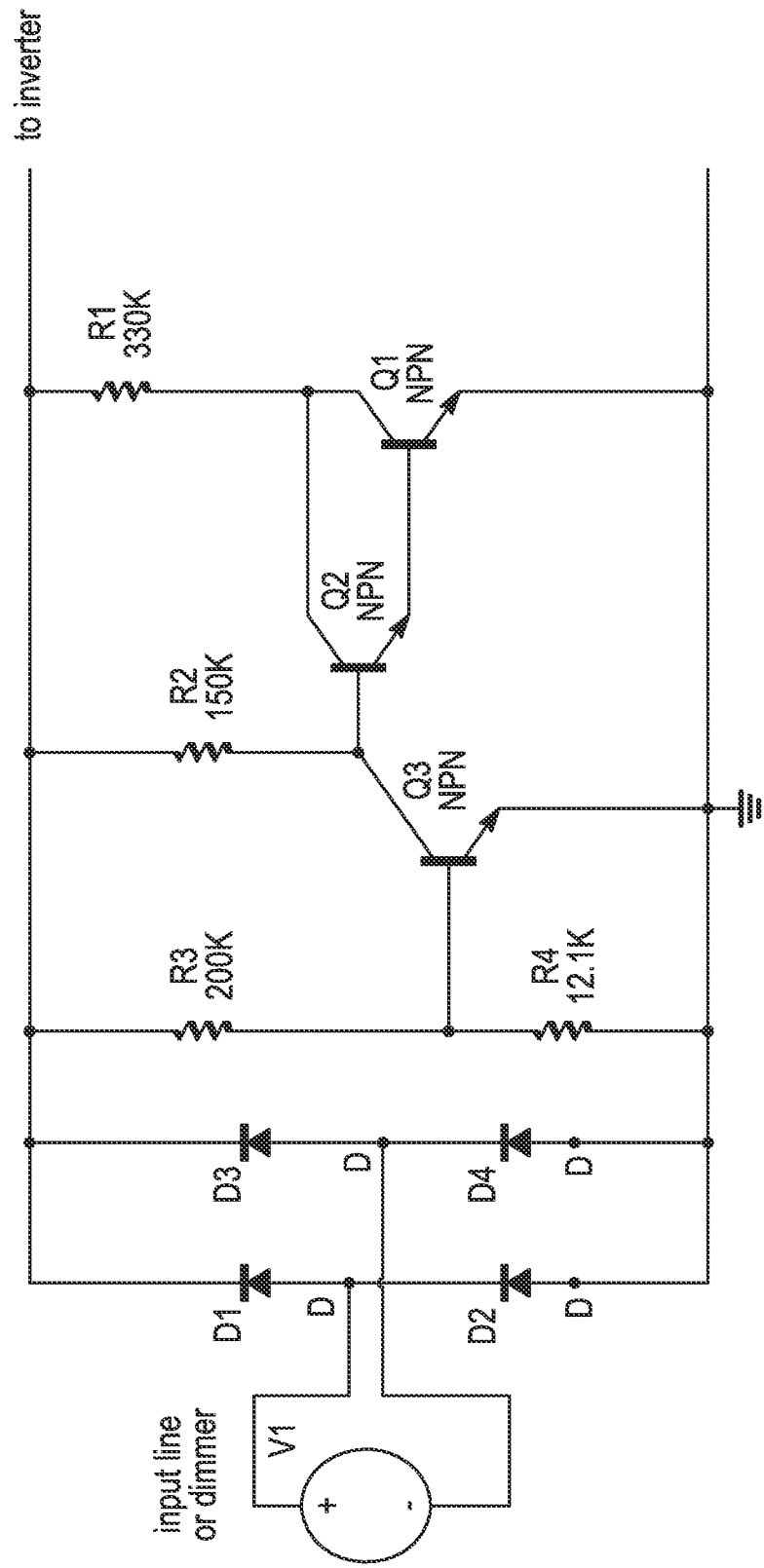
FIG. 10 shows an embodiment for a pass-through circuit.

Referring to FIG. 10, an example circuit is illustrated where the threshold is set for 10 volts. V1 represents the input line voltage presented by the dimmer. Q1 and Q2 form a Darlington transistor pair for switching load resistor R1, and these transistors must be rated about 200V or higher for a 120 VAC line. Resistor R2 provides base drive to Q2. With a net current gain (beta) value of at least 500, Q2 will, for example conduct approximately 15 mA (pass-through/trigger current) with 6V on the input line. When the input voltage exceeds approximately 10V, resistors R3 and R4, bias Q3 into the active region where it conducts enough current to cut off the base drive to Q1/Q2.

The value of R1 is selected here such that, even if the maximum of 10 volts were applied to the circuit continuously, power dissipation would be only about ¼ watt. Normally, the power dissipation would be much less than this because the series resistance in the dimmer is normally 10 kiliohms or larger, resulting in less than 3.5% of the line voltage appearing across the pass-through circuit, and once the TRIAC is triggered, the applied voltage would exceed the 10 volt threshold, thereby blocking current flow in the load resistor R1.

Besides varying resistor values and resulting threshold voltages, other embodiments of this invention, may replace the combination of Q1/Q2 with a switch such as a MOSFET (with a zener diode to protect its gate), or under some conditions, a single bipolar transistor may provide sufficient gain. Q3 can also be implemented by some other switch or its function may be incorporated into an integrated circuit.

This discrete circuit can operate with very low voltages across the ballast input and begin to draw current when the supply voltage exceeds a small threshold voltage, approximately 1.2V in the embodiment of FIG. 10. This feature allows the circuit to operate when the TRIAC is off, giving smoother operation during startup and at very low dimmer settings where the TRIAC does not turn on. An LED on the dimmer, for example, could still be lit by this pass-through circuit at such low dimmer settings.

The load resistor will not be connected all the time, either continuously or pulsed, while the resistor in this invention will be disconnected when the voltage is higher than the set point.

Other Dimming, TRIAC Holding, and Trigger Current Circuits:

Other circuits and/or components associated with dimming, TRIAC holding, and trigger current may provide benefits, such as a charge pump, a voltage boost, an AC load capacitance, a constant current load, a circuit for limiting electrolytic capacitor current with a current source, a circuit for providing frequency dimming, a circuit for providing amplitude dimming, a shutdown circuit, and the like. For instance, the induction lamp may be dimmed through a plurality of methods, such in embodiments described herein. Each method has advantages and disadvantages that depend on the embodiments implemented in the induction lamp, such as load characteristics, ballast circuit characteristics, and the like. For example, as an alternative to other dimming methods described herein, shifting the frequency operating point at which the electric ballast operates may reduce the load current, and thus dim the induction lamp. This is referred to as frequency dimming. Another embodiment includes a method of reducing the power level provided to the load, such as by reducing the supply voltage, which then reduces the load current, thus providing a dimming of the induction lamp. This is referred to as amplitude dimming. Selection of a dimming method may also include combinations of these methods, as well as with the various methods described herein.

EMI

The issue of electromagnetic interference (EMI) inflicted by any industrial and consumer product utilizing RF power is the subject of strict domestic and international regulations. According to these regulations, the EMI level emanating from RF light sources must not exceed some threshold value that may interfere with operation of surrounding electronic devices, communication, remote control gadgets, medical equipment and life supporting electronics. The permitted EMI level for consumer lighting devices is relaxed at frequencies from 2.51 MHz to 3.0 MHz, but the increase in allowable EMI is limited and EMI still has to be addressed to comply with the regulations.

EMI generated by the electronics, such as from the ballast of the induction lamp, may be mitigated through the use of shielding around the electronics, such as with a solid or mesh conductor surrounding the electronics (e.g. the ballast electronics), around the electronics compartment, around the interface between the power coupler and the electronics, and the like, thus creating a Faraday cage around the electronics and keeping electromagnetic radiation from emanating from the electronics portion of the induction lamp. A very thin conductive foil may be selected because of resulting savings in weight and/or cost of materials. This thin foil may be in contact with or supported by a non-conductive material to help maintain dimensional integrity of the thin conductive foil. A mesh may be selected rather than a solid because of the resulting savings in weight and/or cost of materials, increased flexibility in accommodating the packaging of the electronics, and the like. When a mesh is selected, any holes of the mesh are made to be significantly smaller than the wavelength of the radiation. To be effective, holes resulting from connections of the shield to the electronics enclosure and connectors may also need to be made smaller than the wavelength of the radiation, whether a solid or mesh conductor is utilized. The holes in the mesh may allow for the passage of wires between the power coupler and the electronics. Thus EMI from the electronics portion of the induction lamp may be contained. EMI sourced from the power coupler may require other means as described herein.

The conductive EMI of an RF light source (also referred herein as an RF lamp or lamp) is originated by the lamp RF potential $V_p$ on the lamp surface inducing an RF current $I_g$ to the ac line as displacement RF current through the lamp capacitance C to outer space (ground) according to the expression:

$$I_g = V_p 2\pi f C$$

where: $V_p$ is the lamp surface RF potential, and f is the lamp driving frequency. The lamp capacitance can be evaluated in the Gaussian system as equal to the lamp effective radius R, C=R in cm or in the SI system as 1.11 R in pF. For an RF lamp size of A19 this capacitance is estimated as about 4 pF; that results in $V_p$=1 V corresponding to existing regulation limit at 2.65 MHz.

The value of the lamp RF potential $V_p$ is defined by capacitive coupling between the RF carrying conductors (mainly the winding of the lamp coupler and associated wire leads) and the lamp re-entrant cavity housing the lamp coupler.

The EMI compliance is especially problematic for integrated, self-ballasted compact RF lamps. The requirements for these compact RF lamps are much stronger, since they are connected to ac line directly through a lamp socket and have no special dedicated connection to earth ground, as is the case for powerful RF lamps having remote grounded ballasts.

One effective way to reduce the RF lamp potential is to use a bifilar coupler winding consisting of two equal length wire windings wound in parallel, and having their grounded ends on the opposite sides of the coupler.

The essence of this technique is the RF balancing of the coupler with two non-grounded wires on the coupler ends having equal RF potential but opposite phase. Such balancing of the coupler provides compensation by means of opposite phase voltages induced on the re-entrant cavity surface, and thus, on the plasma and the lamp surface.

Although this technique for reduction of conductive EMI has significantly reduced the lamp RF voltage and has been implemented in many commercial RF induction lamps, it appeared that is not enough to comply with the regulation. Some additional means are needed to farther reduce the EMI level to pass the regulations.

In embodiments, a variety of EMI suppression means may be implemented, such as including a segmented electrostatic shield between the coupler and re-entrant cavity to reduce conductive EMI, a light transparent conductive coating placed between the lamp glass and phosphor, an external metal conductive coating for lamp RF screening, and the like.

An alternative (to bifilar winding) way to balance RF coupler has been proposed for RF balancing the coupler by winding on it two wires in the azimuthally opposite directions and to optionally drive such coupler with a symmetrical (push-pull) output ballast.

In embodiments, a combination of a bifilar symmetric winding with screening of the RF wire connecting the coupler with the ballast by a braided shield may provide an EMI reduction of inductive RF fluorescent lamps.

The exemplary embodiments that follow provide an RF induction lamp with simple and low cost means for suppressing electromagnetic interference. This goal may be achieved by a bifilar winding of the lamp coupler having unequal winding wire lengths. Further, an effective grounding of the coupler ferromagnetic core may be made with a conductive shell in conductive contact with the coupler ferromagnetic core. These relatively inexpensive solutions may reduce the conductive electromagnetic interference (EMI) level sufficiently to pass all existing regulations on such interference with significant reserve. In embodiments, the conductive shell may be a foil, a mesh, and the like. The conductive 'shell' may be implemented as one or of a plurality of conductive strips. The conductive shell, in contact with the coupler ferromagnetic core, may be located inside the ferromagnetic core (e.g. inserted into a cavity within the ferromagnetic core), located between the ferromagnetic core and the coupler windings, located such that a portion of the conductive shell wraps over the coupler windings on the side of the windings opposite the ferromagnetic core, and the like, or any combination thereof.

Figure 21:
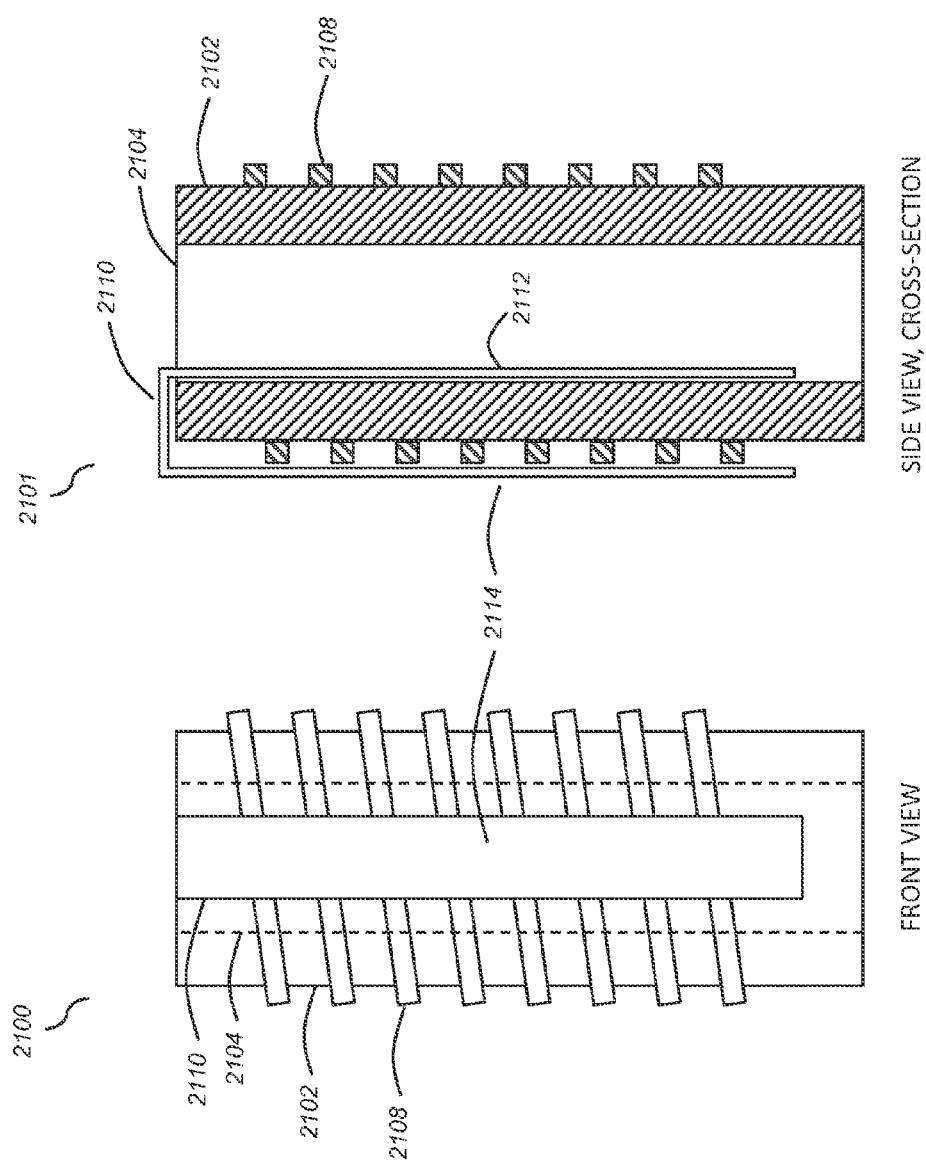
FIG. 21 provides an EMI reduction embodiment where a conductive material in contact with the ferromagnetic core of the power coupler is wrapped from the inside of the core to the outside of the windings on the core.

For example, the conductive shell may be a sheet of conductive foil located between the windings and the ferromagnetic core, with the conductive foil having a strip that wraps over the windings and down along the top of the windings, such as axially down the power coupler. FIG. 21 shows a front view 2100 and a cross-sectional side view 2101 of a power coupler with a representative conductive material (e.g., a conductive foil) 2110 located with an inner portion 2112 inside a hollow interior 2104 of the ferromagnetic core 2102, and wrapped over and around to the exterior of the power coupler such that an outer portion 2114 is located across at least one of the windings 2108. In this example, the outer portion 2114 is configured as a single strip of conducting foil, but one skilled in the art will appreciate that there are many different configurations that satisfy spirit of the embodiment, such as with a plurality of strips, a thin strip, a wire or plurality of wires, and the like, with the length of the outer portion being across one, more than one, or all of the windings. Further, the size and shape of the inner portion 2112 may similarly be a wire, a strip, a plurality of strips, a sheet, a slotted sheet, and the like. In embodiments, the conductive material 2110 may not need to be in direct electrical contact with the ferromagnetic core, where a relatively large overlapping surface of the conductive sheet and the ferromagnetic core may provide a sufficient interface to ground, as described herein.

In view of the limitations now present in the related art, a new and useful RF inductive lamp with simplified and effective means for conductive EMI suppression without lamp RF screening and shielded RF wiring is provided.

In accordance with exemplary and non-limiting embodiments, the lamp coupler may be wound with a bifilar winding having an unequal number of turns, in such a way that additional turns of the passive winding compensate the capacitive coupling (to the lamp re-entrant cavity) of the RF connecting wire of the active winding. Due to opposite phases of RF voltages on the non-grounded ends of active and passive windings, the compensation takes place when the induced RF capacitive currents of opposite phase on the re-entrant cavity are equal or approximately equal to each other.

In accordance with exemplary and non-limiting embodiments, a grounded foil shell (tube) may be inserted into the ferromagnetic core of the coupler to reduce the coupler uncompensated common mode RF potential, where the ferromagnetic core may be a tubular ferromagnetic core. Due to the large shell surface contacting with the core and the very large dielectric constant (or large electrical conductivity) of ferromagnetic materials, the RF potential of the coupler and thus the conductive EMI created by RF lamp may be significantly reduced.

In accordance with exemplary and non-limiting embodiments, the radial position of the coupler may be fixed inside the re-entrant cavity to prevent its direct mechanical contact to the coupler, which tends to dramatically increase capacitive coupling and thus, conductive EMI. To provide a minimal capacitive coupling to the re-entrant cavity, the air gap between the coupler and re-entrant cavity may need to be fixed and equal over all surface of the coupler. Such fixation may be realized by means of an increased coupler diameter on its ends with an additional bonding, a ring spacer set on the coupler ends, and the like.

In accordance with exemplary and non-limiting embodiments, a spatially stable position of the connecting RF wire in the volume outside of the ballast compartment may be provided by mechanical fixing the wires on the inside of the lamp body. Such measure would keep the capacitance of the RF connecting wire to the re-entrant cavity at a fixed value during lamp assembling and reassembling.

FIG. 11 illustrates a cross-section view of an inductive RF lamp in accordance with an exemplary and non-limiting embodiment. The RF lamp 1110 comprises of a glass envelope 1112 with a glass re-entrant cavity 1114 sealed into the envelope 1112 and forming a gas discharge vessel (burner) between them. The lamp burner is filled with a working gas mixture of a noble gas such as Argon, Krypton or others and Mercury vapor. The inner surface of burner, both the envelope 1112 and the re-entrant cavity 1114, are covered with a phosphor. With plasma discharge maintained in the burner, the UV radiation from plasma excites the phosphor, which converts UV light to visible light.

The plasma within the burner is maintained by the electric field created by time-varying magnetic field created by the RF lamp coupler 110 sitting inside the re-entrant cavity 1114. The coupler 110, comprising a core 1118 and winding(s) 1120, 1122, is energized by an RF power source (RF ballast) 1136 placed in the ballast cap 1134 and electrically connected to the local ground (buss), where the ballast cap 1134 may be either non-conductive or conductive with a non-conductive coating on the outside to prevent electrical shock. In this embodiment, the coupler 110 consists of a ferromagnetic core 1118 that may be a ferrite with high magnetic relative permeability $\mu_r \gg 1$, such as where $\mu_r$ is between 20 and 2000. For the frequency of 2.51 MHz to 3.0 MHz allocated for RF lighting, the preferred material may be Ni—Zn ferrite with relative permeability $\mu_r$ around 100 having high Curie temperature $T_c > 300°$ C.

Two windings 1120 and 1122 may be bifilarly wound either directly on the core 1118 of the coupler 110, or with any form or spool between them. The first active winding 1120 is connected to the ballast 1136 with its RF end 1126 and its grounded end 1130. RF current in this winding creates RF magnetic induction in the core that in turn creates the time-varying electric field that maintains the discharge plasma in the lamp burner.

The second, passive, winding 1122 has the function only of inducing the opposite (reference to the first winding 1120) phase voltage on the coupler 110, (thereby reducing the lamp conductive EMI). The passive winding 1122 may be connected to the ballast 1136 only with its grounded end wire 1132, leaving its RF end free.

In embodiments, the number of turns of the passive winding 1122 may not be equal to that of the active winding 1120. Excess turns 1124 (it could be one or more turns, or a fraction of a turn) may be added to the passive winding. The purpose for addition of these excess turns 1124 is to create some additional (opposite phase) RF capacitive current to the re-entrant cavity, to compensate that induced by the RF leads 1126 of the active winding.

The general condition of such compensation (the equality of RF current induced with opposite phase) is:

$$\int_0^{L1} C_1(x)V_1(x)dx = \int_0^{L2} C_2(x)V_2(x)dx$$

Here, the integration is along the wire path x. $C_1$ and $C_2$ are the distributed capacitances correspondingly along the active winding connecting wire 1126 and the passive additional winding 1124; $V_1$ and $V_2$ are correspondingly, the distributed RF potentials along the wires, and $L_1$ and $L_2$ are correspondingly, the length of the connecting and additional winding wire.

Note that due to the three-dimensional structure of the RF lamp, with arbitrary RF wire positions, it is extremely difficult to calculate the functionalities $C_1(x)$ and $C_2(x)$. Therefore, the proper number of turns in the additional passive winding 1124 may have to be found empirically for a specific RF lamp embodiment.

To further reduce the common mode RF potential of the coupler 110 due to its imperfect balancing, a grounded conductive foil shell (tube) 1128 may be inserted into the tubular ferrite core 1118 of the coupler 110. Due to the shell's large surface, its close contact to the inner surface of the core 1118, and a very high ferrite core dielectric constant (or/and its high conductivity), the coupler RF potential reference to local ground is considerably reduced, and thus, conductive EMI in the RF lamp.

The shell 1128 inserted into the core 1118 may be made of a conductive foil, such as copper foil, aluminum foil, and the like. It may be made as a closed tube, have a slot along its axial direction, and the like. In the latter case, the shell may operate as a spring assuring a good mechanical contact with the inner surface of the core. The length of the shell may be equal, or somewhat longer or shorter than the length of the coupler. A larger contacting surface between the shell and the coupler will provide better grounding. On the other hand, a shell length shorter than that of coupler may be enough for adequate coupler grounding.

Grounding of the coupler with the inserted conductive shell has a certain advantage compared to grounding with an external conductive patch. Contrary to an external patch, the internal shell may not increase inter-turn capacitance and may not induce eddy current in the shell. Both these effects diminish the coupler Q-factor and consequently increase power loss in the coupler. The absence of an eddy current in the inserted shell is due to the fact that RF magnetic lines in the coupler are parallel to the shell and are diverging on the coupler ends, thus they are not crossing the foil surface.

To prevent the coupler 110 from touching the re-entrant cavity 1114, and thereby increasing conductive EMI, the coupler may need to be fixed in the approximate center and approximately equidistant of the walls of the re-entrant cavity as it is shown in FIG. 12. This may be done with a pair of spacers 1140 and 1142 placed correspondingly on the bottom open end and the upper closed ends of the coupler 110. The spacers may be made of an electrically non-conductive material, such as a fiber-reinforced polymer, fiberglass, ceramic fiber, high-temperature plastic, silicon rubber, and the like. In the case of a fiber-reinforced polymer, the fiber may be glass, carbon, basalt, aramid, asbestos, and the like, and the polymer may be epoxy, vinylester, polyester thermosetting plastic, phenol formaldehyde resins, and the like. The spacers may be rated for high-temperature, such as rated to 200° C. The top spacer 1142 may better assure axial symmetry between the coupler and reentrant cavity along with providing a cushioned secure fit of the coupler assembly against the closed end of the glass reentrant cavity. To accommodate this, the spacer 1142 may be made from a pliable material and have a shape that provides a secure mechanical interface between the coupler and the re-entrant cavity. The pliable spacer 1142 may have a shape that both provides structural support to prevent movement of the power coupler axially with respect to the re-entrant cavity and to provide axial alignment of the power coupler to the re-entrant cavity. Such a shape may include a cylinder, a cylinder with a beveled edge, a hemispherical shape, and the like. The spacer 1142 may also have a hole through the top, such as smaller than the core. In an example, as shown in FIG. 12, the spacer 1142 may be a beveled spacer 1150 with a hole through it and with a beveled edge 1154 facing into the corner of the re-entrant cavity 1114. More generally, the beveled spacer may be described as a conical frustum shape (e.g. a circular disk-like shape with a trapezoidal cross-section) where the conical frustum has two parallel surfaces of unequal surface area, and in this instance, where the smaller of the two parallel surfaces faces the closed innermost end of the re-entrant cavity. The beveled or conical frustum shaped spacer 1150 may provide a fit to the inside corner of the re-entrant cavity, thus providing greater position stability in maintaining the alignment of the coupler with respect to the re-entrant cavity. The beveled spacer 1150 may provide cushioning between the coupler and the re-entrant cavity along with an additional spacer component 1152 that aids in the alignment of the coupler and the re-entrant cavity. Alternatively, a single beveled spacer 1158 may be provided that provides both cushioning and alignment, where the single beveled spacer 1158 provides cushioning against the closed innermost end of the re-entrant cavity and position alignment from the sides of the re-entrant cavity. The bevel 1154 may provide an especially good fit to the corner of the re-entrant cavity due to the fact that the inside 'corner' of the re-entrant cavity may be concave in shape and where the bevel 1154 seats the spacer 1142 into this concave corner much better than would a sharp edged spacer. In embodiments, the spacer 1142 may also have a lip facing the innermost end of the coupler so as to mechanically secure the position of the power coupler with respect to the re-entrant cavity. The use of spacers 1140 and 1142 may allow for the coupler to be maintained in an axially aligned position with respect to the re-entrant cavity, thus improving EMI performance, and at the same time reducing the need for the coupler to be designed to be a stand-alone structurally rigid component, thus potentially reducing the cost of the coupler's manufacture.

It may be advantageous to have an air gap between the coupler 110 and re-entrant cavity 1114 rather than filling this space with some capsulation material having a high dielectric constant, e>>1. In the latter case, the capacitive coupling of the coupler winding to the re-entrant cavity would increase by e times. Since in practice, it is impossible to reach the ideal RF balancing of the coupler, its residual common mode potential (and so EMI level) would be e times larger than that with air gap. It is found empirically that the gap between coupler windings and inner surface of re-entrant cavity of approximately 0.5-1.5 mm is enough for embodiments of the RF lamp to pass EMI regulations. Although, increasing of the air gap reduces conductive EMI, the inductive coupling efficiency and lamp starting would be deteriorated.

It was found in many experiments with non-shielded RF wire 1126 connecting the coupler 110 to ballast 1136, the conductive EMI level is extremely sensitive to the spatial position of this wire within the lamp body. An arbitrary position of this wire after the lamp assembling may diminish the effect of the measures described above towards EMI reduction in the RF lamp. Therefore, fixing the position of the wire to some lamp inner elements may be necessary. Note that wire may be needed to be fixed in position only in the space between the coupler 110 and the grounded ballast case 1134. The position of the wires inside the ballast case may not be important for conductive EMI.

As it seen in FIGS. 11 and 12, four wires 1126, 1130, 1132 and 1138 may be connected between the coupler and the ballast. Indeed, in this embodiment, three of them, 1130, 1132 and 1138 are grounded within the ballast case, and the forth is connected to the output of the RF ballast 1136. Practically, only the positioning of the RF wire 1126 is important for the EMI issue, but the grounded wires 1130 and 1132 being positioned on both side of the RF wire 1126 (as it shown in FIGS. E1 and E2) partially perform a shielding function reducing the sensitivity of the conductive EMI level to the position of the RF wire. For this purpose, the wires 1130, 1132 and between them wire 1126 may be fixed together (touching each other with minimal distance between them) on the inner lamp body, such as with some painting, a sticky tape, and the like.

Numerous experiments conducted in the laboratory showed that the exemplary embodiments considered herein are effective and inexpensive ways to address conductive EMI in an RF lamp.

Evaluation of conductive EMI levels of the exemplary embodiments described herein has been done by measurement of the lamp surface voltage Vp, which is proportional to EMI level. For instance, the maximum value of Vp corresponding to the regulation threshold for RF lamp of size A19 at 2.65 MHz, is 2.8 Volt peak-to-peak.

Figure 13:
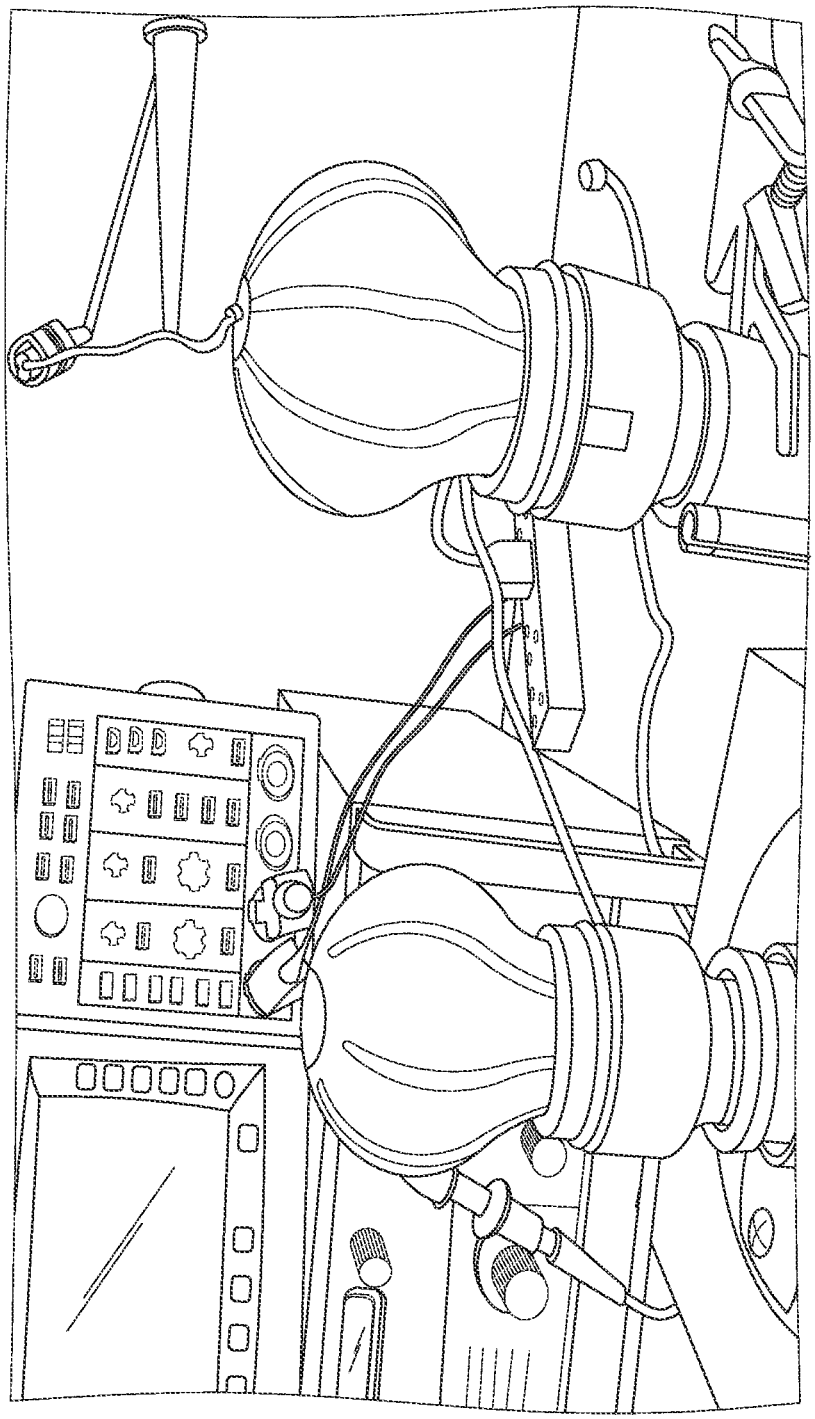
FIG. 13 shows an exemplary experimental and commercial lamp covered with copper foil for purposes of an experiment.

To measure the Vp values, the lamp glass envelope was entirely covered with thin copper foil as it shown in FIG. 13 The foil jacket had eight meridian slots to prevent its interaction with the lamp RF magnetic field. The capacitance between the foil and the plasma inside the lamp burner was estimated as a few hundred pF, which was much larger than the input capacitance (8 pF) of the RF probe connected between the foil and a scope.

Figure 14:
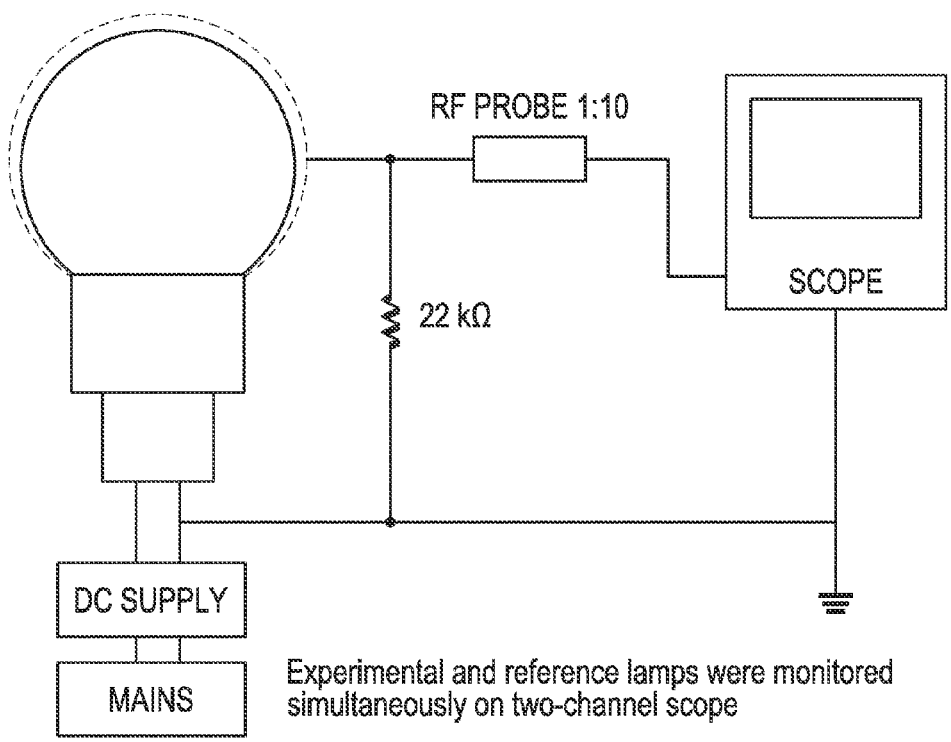
FIG. 14 illustrates an exemplary experimental set-up for measurement of the lamp surface voltage.

Concurrently, a similar measurement has been done with a commercial lamp having the same size of A19 (6 cm diameter), where the intent was to compare the EMI performance of the commercial lamp to a lamp constructed consistent with exemplary embodiments described above. Since the results of the measurements were dependent on lamp run-up time, the measurements for both lamps were performed at the same time with a two-channel oscilloscope. The experimental set-up for measurement of the lamp surface voltage Vp is shown in FIG. 14. The 22 kΩ resistor is used to prevent line frequency interference with the measurement of small RF voltages. The overall test set up was provided by the international standard on EMI test equipment, CISPR 16. Power was provided to the test lamp through a Line Impedance Stabilization Network (LISN). This network collected the EMI noise on each power line (120V and Neutral) and routed the collected EMI to a measurement analyzer. In this case, a spectrum analyzer that was specifically designed for EMI measurements was used.

In the U.S., the Federal Communications Commission (FCC) writes the rules for EMI compliance. These lamps are required to comply with FCC Part 18. There are several compliance requirements including technical and non-technical requirements, but only the FCC-specified residential market limits for EMI were used in this coupler comparison. Testing of the noise on the power line was done over the range of frequencies from 450 kHz to 30 MHz in accordance with FCC Part 18 requirements. The lamps were mounted in an open-air fixture with their bases oriented downward. The warm up times from a cold turn-on were kept the same at one hour. A peak detector (PK) was used to speed up the testing. The plots of measured data show limit lines that apply when a quasi-peak detector (QP) is used. For this lamp, QP data is typically 3 dB lower than the PK data. So if the PK data is below the limit line, the QP data will be even lower and doesn't need to be measured. Typically in EMI testing, PK data is recorded initially, and QP data is measured if the PK data is near or over the limit line. For this comparison task, measuring PK data allows the two couplers to be compared.

Figure 15:
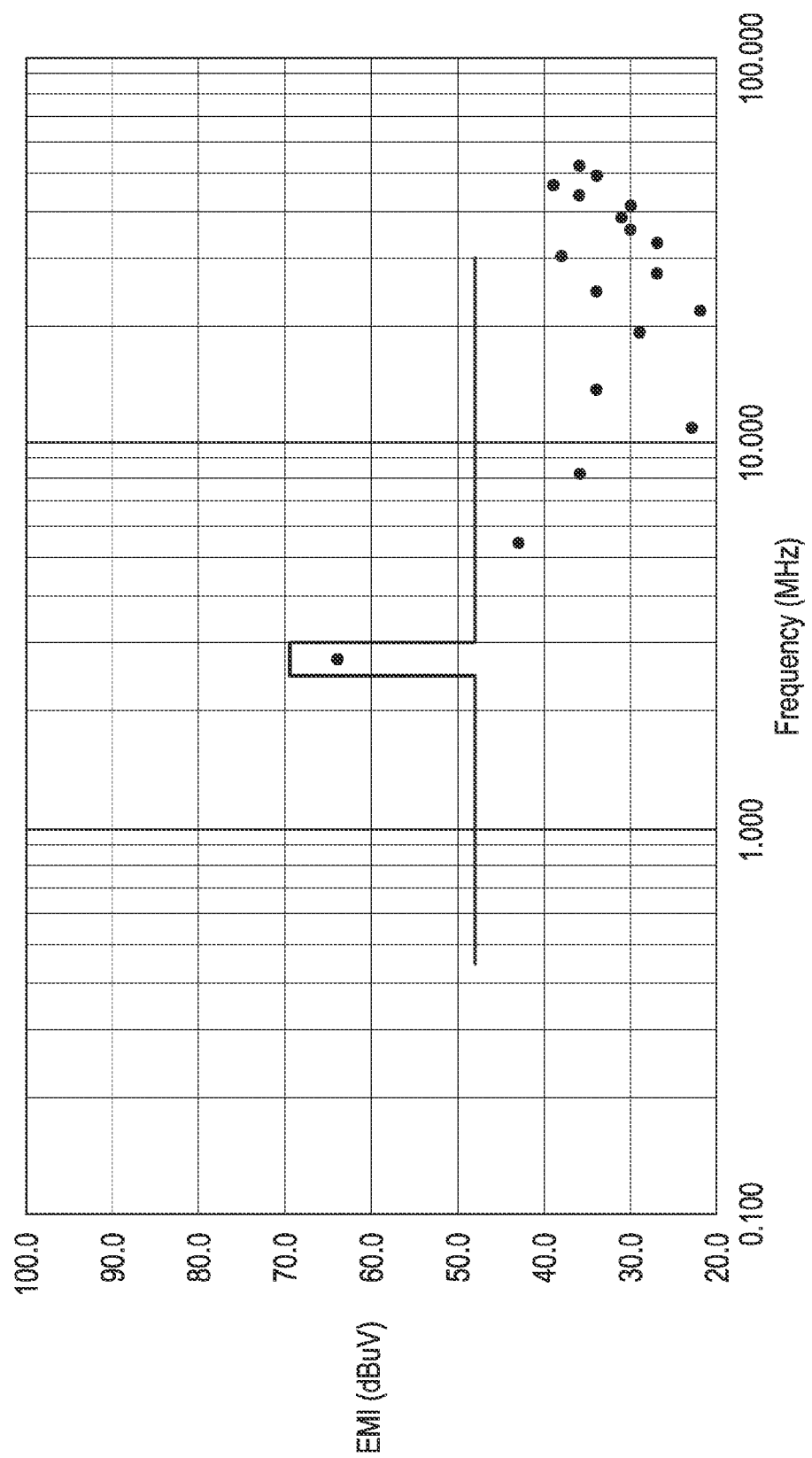
FIG. 15 provides experimental data of conductive EMI (points) and the allowed limits (lines) taken with a related art lamp using a LISN set up.
Figure 16:
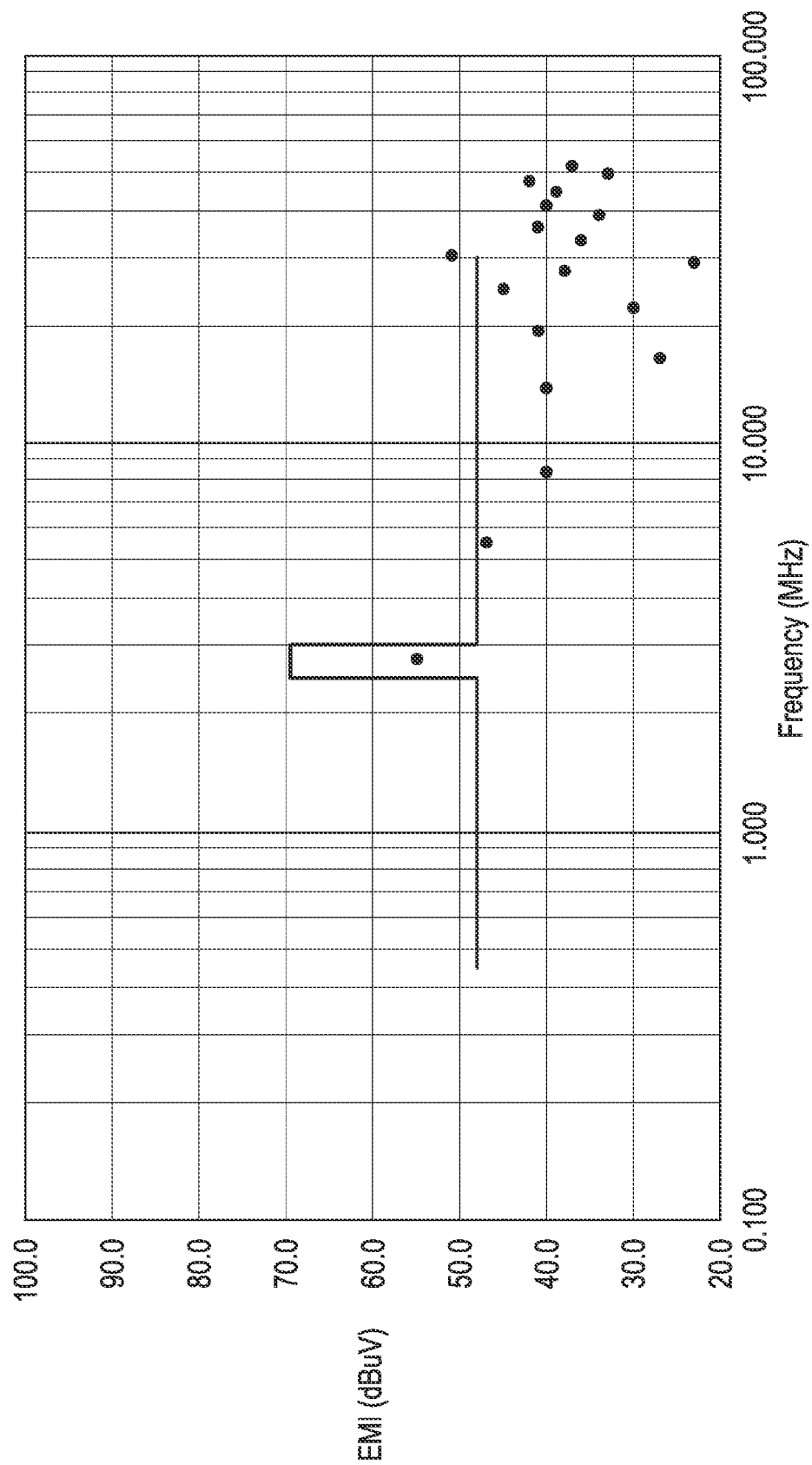
FIG. 16 provides experimental data of conductive EMI (points) and the allowed limits (lines) taken with the test lamp accordance to an exemplary and non-limiting embodiment.

FIGS. 15 and 16 show the FCC Part 18 limit line on plots of measured data for the two lamps. The horizontal axes are frequency in MHz and the vertical axes are the amplitudes of the measured EMI on a log scale in units of dBuV, or dB above 1 uV. The construction of couplers impacts the response vs. frequency, and the two different couplers were not expected to have identical EMI patterns vs. frequency. What is important is that both couplers have relatively low EMI that is capable of complying with the FCC's technical limits for Part 18 EMI. Although not shown, couplers without EMI reducing features will exceed the FCC's limits considerably. The main operating frequency of the electronic circuit powering the coupler is near a frequency of 2.75 MHz. As shown there is a "chimney" on the limit line between 2.51 and 3.0 MHz. where increased EMI is allowed. It should be noted that in this chimney, the generated EMI could be quite large. Exemplary embodiments lower the EMI in this chimney, as shown in FIG. 16 relative to that shown in FIG. 15.

The results of different steps discussed above were separately tested on this set-up, and confirmed for their effectiveness. When these steps were incorporated together in the final RF lamp embodiment, its EMI level was similar to that of the commercial lamp, and both were considerably lower than the regulation threshold. Thus, the measured values of the lamp surface voltage, for the newly invented lamp and commercial one were 0.58 V and 0.48 V peak-to-peak respectively, values well under the required limitations from the FCC for conductive EMI.

Referring to FIGS. 12A and 12B, in certain situations it may be desirable to connect the coupler 110 to RF ground through a capacitor 1144 that has a low impedance at the operating frequency of the lamp, but a high impedance at the frequency of the AC power line. This would prevent electrical shock if a human came in contact with an exposed coupler 110 while the lamp was connected to an AC power line, even if the high frequency converter in the ballast was not operating. The term "RF ground" is understood to mean any node of the ballast that has a low RF potential with respect to the circuit common node. In a typical ballast, both the circuit common, which is typically the negative DC bus, and the positive DC bus, are RF ground nodes. Referring to FIG. 12A, in embodiments, the coupler 110 may include a ferromagnetic core 18, and the connection of the capacitor 1144 may be made to the coupler 110 or to any component associated with the coupler 110, such as a ferromagnetic core, a conductive foil or shell inserted within or around the core, and the like. Referring to FIG. 12B, in embodiments, the coupler 110 may include an air-core, and the connection of the capacitor 1144 may be made to the coupler 110, such as directly to the winding return 1130, and the like. In embodiments, there may be two capacitors connected to the winding, such as one capacitor connected at one location (e.g. at a first end of the winding) and a second capacitor connected at a second location (e.g. at the second end of the winding). The coupler 110 of FIG. 12B is shown with a dotted line to indicate, as described herein, that an air-core coupler may optionally include a non-magnetic and non-conductive supporting material, such as a plastic form, to support the conductor coil, or, if the coil is self-supporting, with no additional support at all.

The potential for electrical shock may arise when an electronic circuit is powered from an AC power line by means of a full wave bridge rectifier because the magnitude of the voltage difference between the positive output terminal of the full wave bridge rectifier, which is normally connected to the positive DC bus of the high frequency converter, and each of the two AC power lines will periodically be equal to the peak of the AC input voltage between those two power lines. In like manner, the magnitude of the voltage difference between the negative output terminal of the full wave bridge rectifier, which is normally connected to the negative DC bus of the converter, often labeled circuit common, and each of the two AC power lines will also periodically be equal to the peak of the AC input voltage between those two power lines. Due to this characteristic of circuits powered from AC power lines through full wave bridge rectifiers, the potential for electric shock exists if users are allowed to come in contact with circuit common or other node of the circuit that does not have a high impedance to circuit common at a frequency of 60 Hz. For instance, and without limitation, if the conductive foil shell 1128 shown in FIG. 11 is connected directly to any point in the ballast circuit, a potential for electrical shock is created if users come in contact with the ferrite core 1118 of coupler 110.

In order to remove such a shock hazard, the low resistance connection between the coupler 110 and ballast circuitry should be removed and replaced with a capacitor 1144 that has a low impedance at the operating frequency of the lamp and a high impedance at the power line frequency.

In a non-limiting example, and referring to FIG. 12A, for a lamp operating frequency of 2.65 MHz with a ferromagnetic core with conductive foil shell inserted, and operated from a 60 Hz power line, the isolation capacitor should have a value between 0.6 nF and 13 nF, where we want the 60 Hz leakage current from the ferrite core 1118 to earth ground be no greater than 1 mA, and the magnitude of the impedance from the conductive foil shell to circuit common, or to the positive DC bus, at the lamp operating frequency of 2.65 MHz to be no higher than 100 Ohms. The magnitude of the impedance of a 0.6 nF capacitor is 100 Ohms at 2.65 MHz and 4.4 Meg Ohms at 60 Hz. The magnitude of the impedance of an 11 nF capacitor is 4.62 Ohms at 2.65 MHz and 200 K Ohms at 60 Hz. Different capacitor values can be used if these boundary conditions are relaxed.

In a different non-limiting example, and referring to FIG. 12B, for a lamp operating frequency of about 27 MHz with an air-core coupler, and operated from a 60 Hz power line, the isolation capacitor should have a value between 60 pF and 13 nF, where we want the 60 Hz leakage current from the coupler 110 to earth ground be no greater than 1 mA, and the magnitude of the impedance from the coupler to circuit common, or to the positive DC bus, at the lamp operating frequency of about 27 MHz to be no higher than 100 Ohms. The magnitude of the impedance of a 60 pF capacitor is 98 Ohms at 27 MHz and 44 Meg Ohms at 60 Hz. The magnitude of the impedance of an 11 nF capacitor is 0.453 Ohms at 27 MHz and 200 K Ohms at 60 Hz. Different capacitor values can be used if these boundary conditions are relaxed.

Optics

In embodiments, optical coatings may be used to optimize the performance of the induction lamp, such as to maximize visible light emitted, minimize light absorbed by the power coupler, and the like. Optical coatings may at least partially reflect, refract, and diffuse light. For instance, a reflection coating may be used to reflect light impinging on the re-entrant cavity back into the burner, as otherwise that light may be absorbed by the coupler and thus not converted to visible light emitted to the external environment. Further, light absorbed by the coupler may contribute unwanted heat to the coupler, thus affecting its performance, life, and the like. In another instance, optical coatings may be used on the outside envelope of the burner, such as between the phosphor coating and the glass, where this optical coating may enhance the transfer of light through the glass, such as though index matching. Further, the coating may be used to help decrease absorption of the mercury into or onto the glass envelope. Optical coatings may also be used to create or enhance aesthetic aspects of the induction lamp, such as to create an appearance for the lower portion of the induction lamp to substantially look like the glass upper portion of the induction lamp. In embodiments, coatings on the upper and lower portions of the induction lamp may be applied so as to minimize the difference in the outward appearance of the upper and lower portions of the induction lamp, such as to minimize the differences in the outward appearance of the induction lamp to that of a traditional incandescent lamp, thus creating a more familiar device to the consumer along with a resulting increase in usage acceptance with respect to being used for replacement of incandescent lamps.

In embodiments, optical components may be provided to enhance a lighting property of the induction lamp. Optical components may include reflectors, lenses, diffusers, and the like. Lighting properties affected by optical components may include directionality, intensity, quality (e.g. as perceived as 'hard' or 'soft'), spectral profile, and the like. Optical components may be integrated with the induction lamp, included in a lighting fixture that houses the induction lamp, and the like. For instance, reflectors and lenses may be used in a lighting fixture in conjunction with the induction lamp to accommodate a lighting application, such as directional down lighting, omnidirectional lighting, pathway lighting, and the like. In an example, a lighting fixture may be created for a directional down light application, where reflectors proximate to the sides of the induction light direct side light from the induction lamp to a downward direction, where a lens may further direct the light reflected from the reflected side light and directly from the induction lamp within a desired downward solid angle.

Electronic Ballast Having Improved Power Factor and Total Harmonic Distortion

Figure 17:
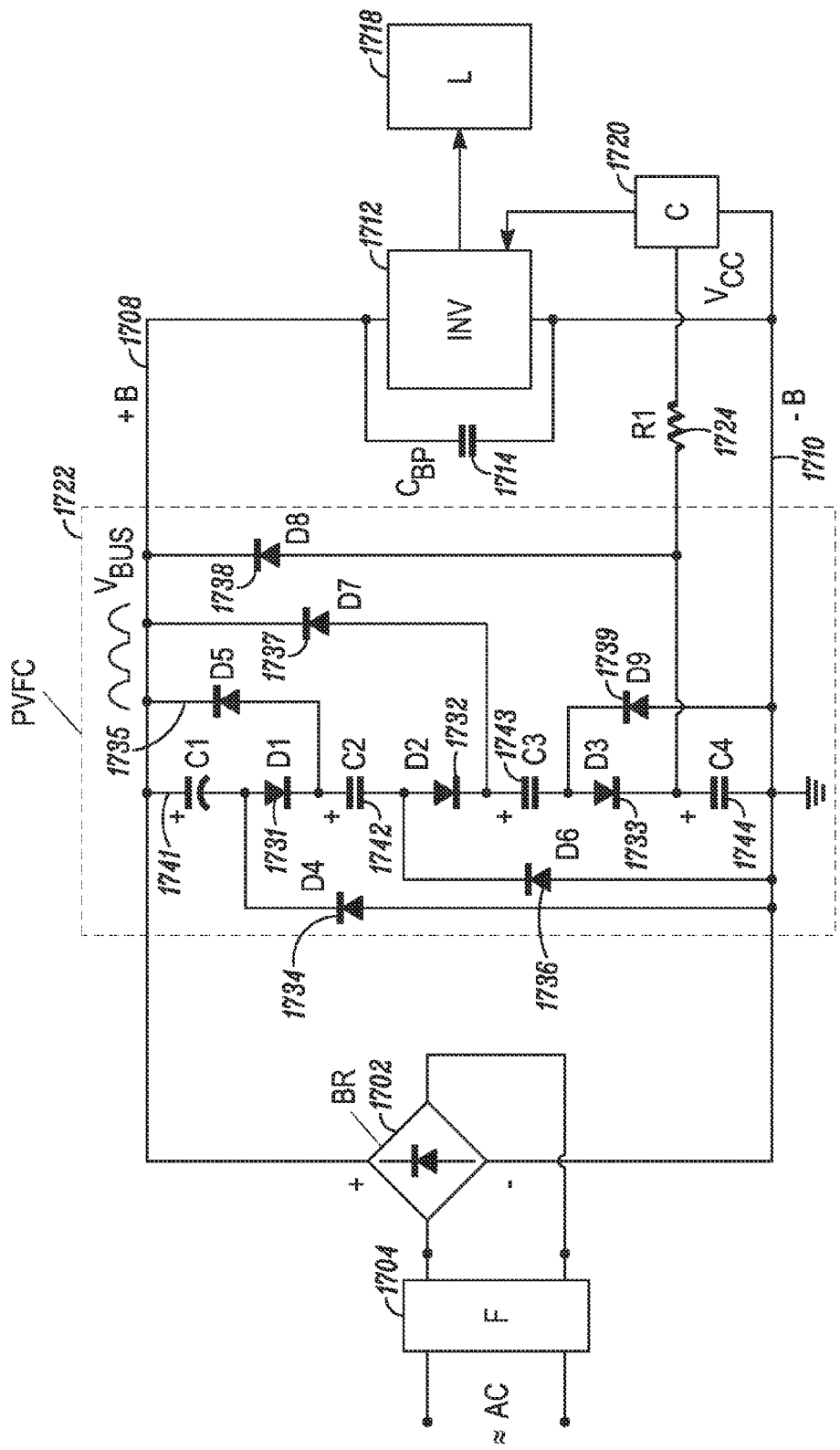
FIG. 17 shows a block-circuit diagram of electronic ballast comprising a Passive Valley Fill PF correction circuit accordingly to the present invention.

In embodiments, as shown in FIG. 17, a source of AC voltage 120V, 60 Hz is applied to the full wave bridge rectifier BR 1702 via EMI filter F 1704, the DC output voltage of BR is applied directly between the positive rail +B 1708 and negative rail −B 1710 of the DC bus which is coupled to the output of BR. There is no traditional energy-storage electrolytic capacitor across DC bus. A DC backup voltage generated by the Passive Valley Fill Circuit (PVFC) 1722 is superposed on the rectified voltage and results in Vbus voltage for powering a high frequency resonant inverter INV 1712. A small bypass capacitor Cbp 1714 is connected to the input of the DC inverter to smooth out high frequency voltage ripple generated by the resonant inverter INV. The resonant inverter INV powers a fluorescent lamp 1718. Multiple lamps may be powered from a single inverter INV (not shown in FIG. 17). The inverter INV may have a control circuitry C 1720 for driving power stages and other needs. This circuitry needs an auxiliary power supply. In FIG. 17 the auxiliary power is obtained from the 4-capacitor 9-diode (4C9D) PVFC via a resistor R11724. The PVFC is a network built with four small capacitors, each having a voltage rating substantially below the voltage of the DC bus, and 9 diodes for generating a backup DC voltage that is about $\frac{1}{4}^{th}$ of the peak rectified voltage. For a 120V AC line this DC voltage will be about 40V. This voltage is sufficient to support continuous lamp operation. The PVFC comprises first, second, third, and fourth capacitors, designated C1 1741, C2 1742, C3 1743, and C4 1744, each having a positive terminal designated as "+" and also having a negative terminal. These capacitors are connected in series via first, second and third charge diodes designated as D1 1731, D2 1732, and D3 1733, each having an anode and a cathode. The diodes D1, D2, and D3 allow capacitors C1, C2, C3 and C4 to charge in series, but prevent those same capacitors C1, C2, C3, and C4 from discharging in series. Passive Valley Fill Circuit PVFC also comprises fourth, fifth, sixth, seventh, eighth and ninth discharge diodes designated in FIG. 17 as D4 1734, D5 1735, D6 1736, D7 1737, D8 1738, and D9 1739, each having an anode and a cathode. These discharge diodes provide parallel discharge paths to the DC bus for capacitor C1, C2, C3, and C4. The first charge capacitor C1 has its positive terminal connected to DC bus positive rail +B and has its negative terminal connected to the anode of the first diode D1. The second capacitor C2 has its positive terminal connected to the cathode of the first diode D1 and its negative terminal connected to the anode of the second diode D2. The third capacitor C3 has its positive terminal connected to the cathode of the second diode D2 and its negative terminal connected to the anode of the third diode D3. The fourth capacitor C4 has its positive terminal connected to the cathode of the third diode D3 and its negative terminal connected to the DC bus negative rail, −B. The cathode of the forth diode D4 is connected to the negative terminal of the first capacitor, C1, and its anode is connected to DC bus negative rail −B. The cathode of the fifth diode D5 is connected to the DC bus positive rail, +B, and its anode is connected to the positive terminal of the second capacitor C2. The cathode of the sixth diode D6 is connected to the negative terminal of the second capacitor C2 and its anode is connected to the DC bus negative rail −B.

The anode of the seventh diode D7 is connected to the positive terminal of the third capacitor C3 and its cathode connected to the DC bus positive rail, +B. The anode of the eighth diode D8 is connected to the positive terminal of the fourth capacitor C4 and its cathode is connected to the DC bus positive rail, +B. The anode of the ninth diode D9 is connected to the DC bus negative rail −B and its cathode is connected to the negative terminal of the third capacitor C3.

Figure 19:
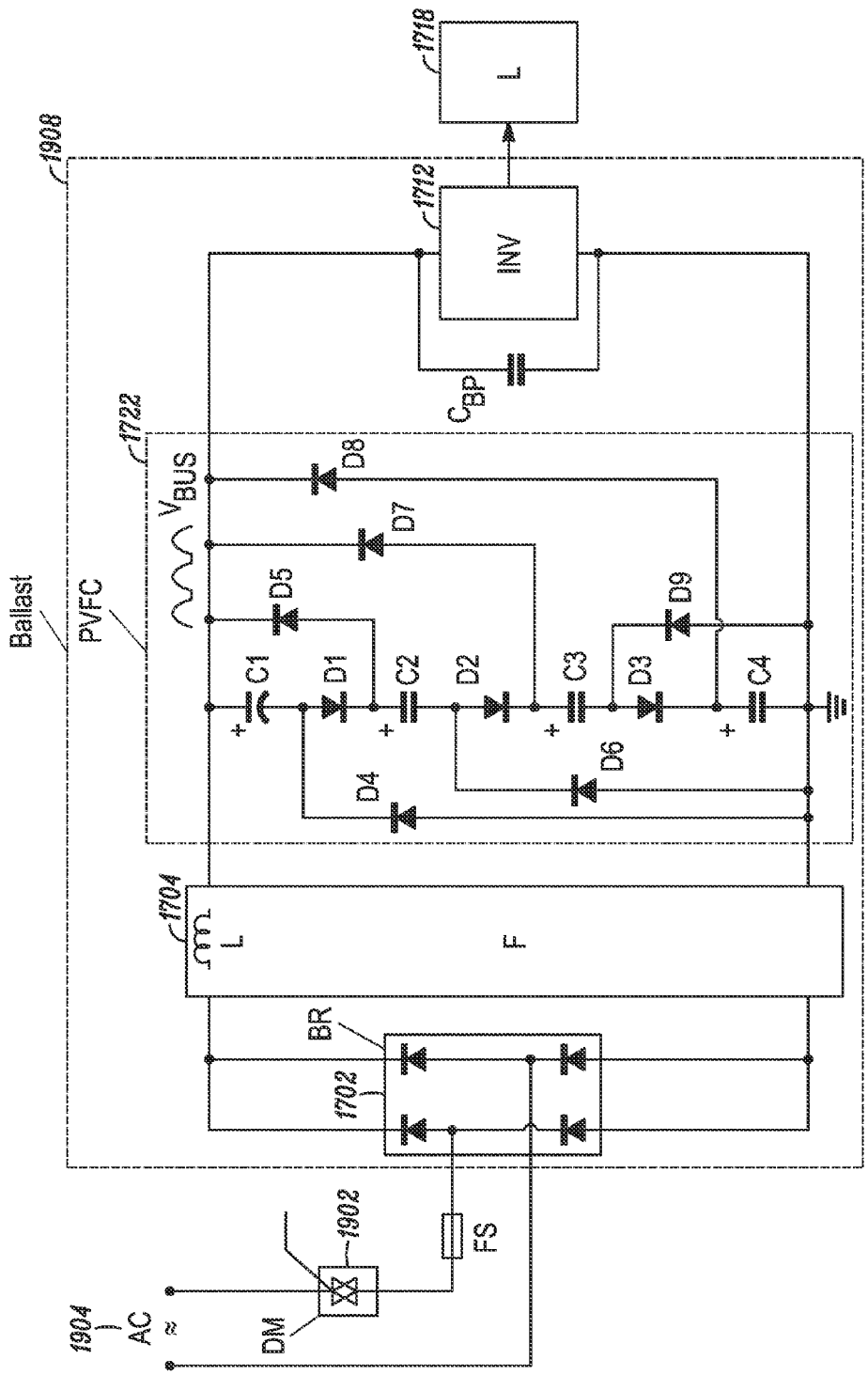
FIG. 19 shows a block-circuit diagram of electronic ballast with a Passive Valley Fill Circuit dimmed by TRIAC based dimmer.

In embodiments, as illustrated in FIG. 19, the 4C9D PVFC 1722 (comprising C1 1741, C2 1742, C3 1743, C4 1744, D1 1731, D2 1732, D3 1733, D4 1734, D5 1735, D6 1736, D7 1737, D8 1738, and D9 1739) is utilized in combination with a TRIAC dimmer DM 1902, which is connected between the AC line 1904 and the input of the ballast 1908. The special features of the 4C9D PVFC is that this circuit eliminates interruptions of current flow from the AC line that cause flicker in the lamp.

With reference to FIG. 17, the operation of the ballast 1908 may be explained as follows. When the AC switch (not shown) is turned "on", AC power is applied directly to the bridge rectifier BR 1702. There is no traditional electrolytic capacitor at the output of the rectifier, so that the inverter INV 1712 is powered from unsmoothed rectified voltage. However, the inverter INV may provide a significant lamp starting voltage when the DC bus voltage is near the peak of the AC line voltage and thereby start the lamp 1718 for at least 1-2 msec. Series capacitors C1-C4 are charged from the DC bus directly through diodes D1 to D3. Inrush current is limited by the impedance of EMI filter F 1704 and series resistance of the series capacitors C1-C4. In a quarter of the power line voltage cycle, each of capacitors C1 to C4 is charged to a DC voltage that is about of ¼th of AC peak voltage (40V DC at 120V AC power line). Current to the inverter INV will be provided either from the AC line or from capacitors C1-C4 when they discharge in parallel, depending on which of the instantaneous voltages is higher. When the instantaneous AC line voltage is above 40-45V, current will be drawn from the AC line. The current conduction angle in the bridge rectifier BR of the ballast is higher than in prior art Passive Valley Fill circuits.

Figure 18:
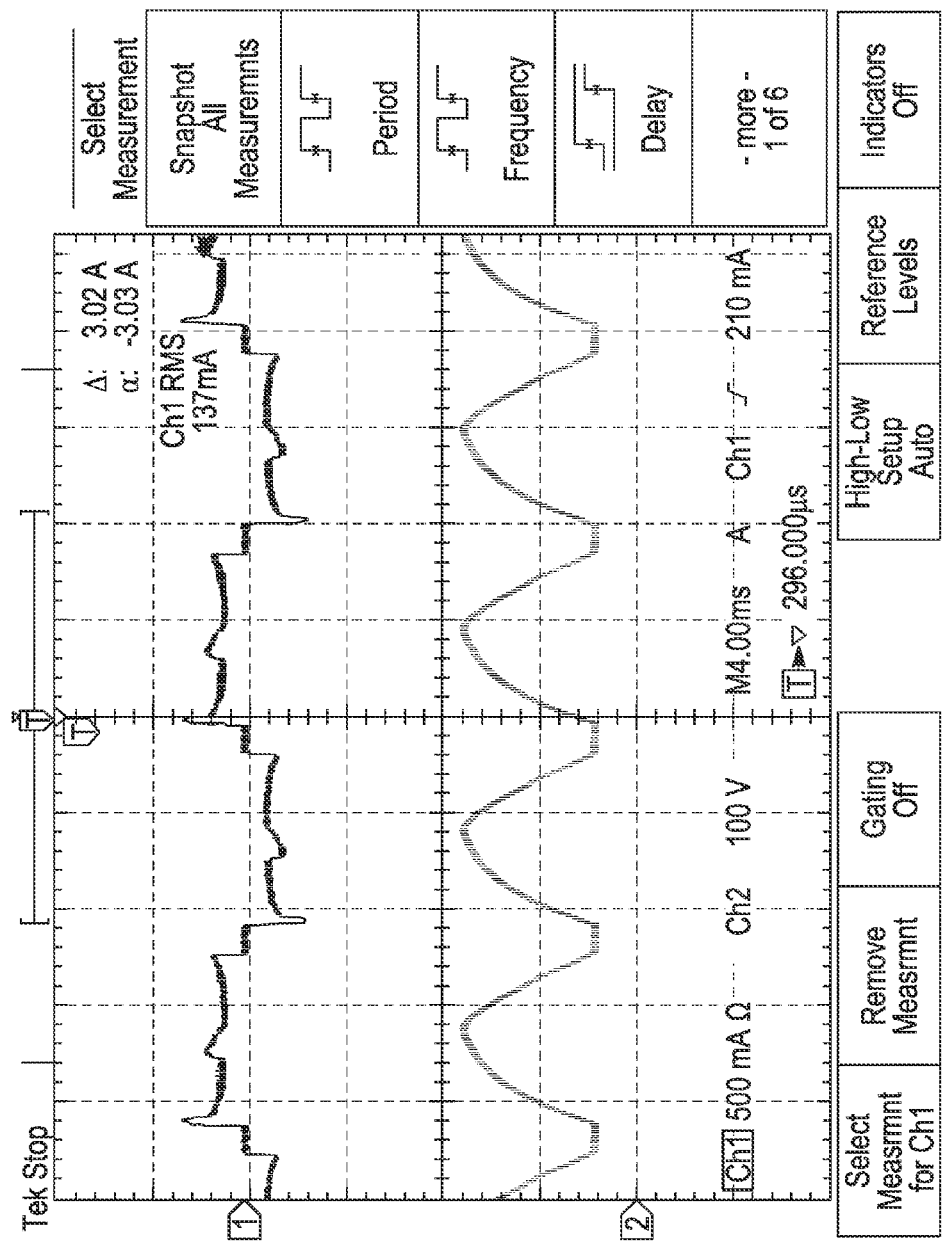
FIG. 18 shows waveforms of the input current and DC bus voltage of the ballast in FIG. 17.

FIG. 18 demonstrates actual oscillograms of the input AC line current and DC bus voltage in the ballast circuit of FIG. 17 after starting in steady-state mode. A power factor PF=0.96-097 can be achieved for ballasts driving gas discharge lamps.

Figure 20:
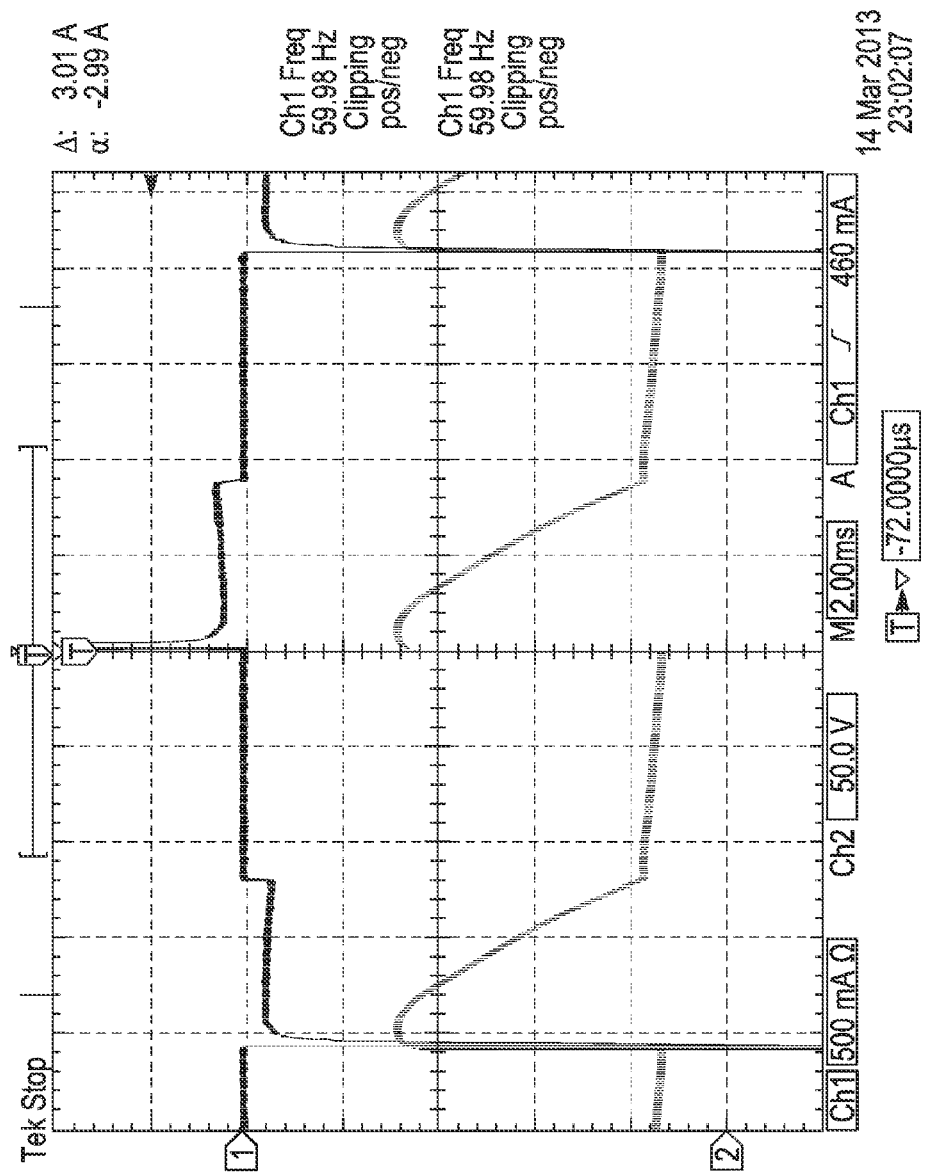
FIG. 20 shows waveforms of the input current and DC bus voltage of the ballast in FIG. 19.

Referring to FIG. 19, a system is provided that includes an electronic ballast with the 4C9D PVFC and TRIAC dimmer (such as a wall dimmer) placed in between the power line and the input terminal of the ballast. When the dimmer TRIAC turns on, all four capacitors C1-C4 are charged in series. Therefore, in the absence of an electrolytic capacitor directly connected to the DC bus, the inverter INV consumption current provides for the TRIAC holding current. This current can satisfy a commercial dimmer to keep it in the "on" position. Thus, light flickering caused by turning on and off the dimmer TRIAC is avoided. When the instant AC voltage becomes lower than the capacitor voltage, the Bridge Rectifier BR is backed up and the inverter INV is supplied by discharge current of capacitors C1-C4. The TRIAC loses its holding current and automatically turns off until the next half period. But the gas discharge in the lamp continues at a reduced power, so that with new pulses coming from the dimmer, the lamp does not need to restart. FIG. 20 demonstrates input AC current and DC bus voltage waveforms with the TRIAC dimmer at 50% "on". The system in FIG. 19 features a wider dimming range than prior art ballasts. For 16-20 W gas discharge lamps, 22 uV, 63V capacitors values for C1-C4 may provide a dimming range down to approximately 10%.

Diodes D1-D9 may be selected to be the same type. Small signal diodes and diode arrays may be used for cost and space saving.

While only a few embodiments of the present invention have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

All documents referenced herein are hereby incorporated by reference.

What is claimed is:

1. An induction RF fluorescent lamp, comprising:
    a bulbous vitreous portion of the induction RF fluorescent lamp comprising a vitreous envelope filled with a working gas mixture;
    a power coupler comprising at least one winding of an electrical conductor for receiving an alternating voltage and current to generate an alternating magnetic field and thereby inducing an alternating electric field within the vitreous envelope; and
    an electronic ballast providing appropriate voltage and current to the power coupler and operating at a frequency greater than 5 MHz wherein the electronic ballast comprises an EMI filter, an AC-to-DC converter, a DC bus, an input choke inductor and a DC-to-AC inverter comprising one or more inductive components;
    wherein the input choke inductor is located between the DC bus and the switching transistor of the DC-to-AC inverter and has a value approximately inversely proportional to the product of the square of the operating frequency of the electronic balance and the capacitance of the switching transistor.

2. The lamp of claim 1 wherein the DC-to-AC inverter comprises a series-connected inductor and capacitor pair connected in parallel with the two output terminals of a switching transistor.

3. The lamp of claim 2 wherein the series-connected inductor and capacitor pair regulates the peak voltage across the switching transistor.

4. The lamp of claim 2 wherein at least one of an inductor and a capacitor forming a part of the DC-to-AC inverter are configured to achieve low impedance at the 2nd harmonic of the operating frequency and relatively higher impedance at the fundamental frequency of operation at the output of the switching transistor when said transistor is in its off state.

5. The lamp of claim 2 wherein at least one of an inductor and a capacitor forming a part of the DC-to-AC inverter are further configured to achieve at the output of the switching transistor in its off state a capacitive impedance at the 3rd harmonic of the operating frequency that has a magnitude between the magnitude of the impedance at the fundamental frequency and the magnitude of the impedance at the 2nd harmonic of the operating frequency.

6. The lamp of claim 1 wherein one or more inductors forming a part of the DC-to-AC inverter use non-ferromagnetic components.

7. The lamp of claim 1 wherein the power coupler further comprises an air core.

8. The lamp of claim 1 wherein the power coupler further comprises a ferromagnetic core.

9. The lamp of claim 1 wherein the DC-to-AC inverter operating frequency is approximately 27.1 MHz.

10. The lamp of claim 1 wherein the DC-to-AC inverter operating frequency is approximately 40.7 MHz.

11. The lamp of claim 1 wherein the DC-to-AC inverter operating frequency is approximately 13.6 MHz.

* * * * *